(12) United States Patent
Beaston et al.

(10) Patent No.: US 12,476,294 B2
(45) Date of Patent: Nov. 18, 2025

(54) BATTERY MODULE AND BATTERY RACK WITH ENHANCED FIRE SAFETY FEATURES, AND APPLICATIONS THEREOF

(71) Applicant: VLTRU Systems, LLC, Vestal, NY (US)

(72) Inventors: Virgil L Beaston, Vestal, NY (US); Michael Allen, Phelps, NY (US); David Middleton, Skaneateles, NY (US); Howard Scott Ryan, Skaneateles, NY (US)

(73) Assignee: VLTRU SYSTEMS LLC, Vestal, NY (US)

( * ) Notice: Subject to any disclaimer, the term of this patent is extended or adjusted under 35 U.S.C. 154(b) by 0 days.

(21) Appl. No.: 18/541,020

(22) Filed: Dec. 15, 2023

(65) Prior Publication Data

US 2024/0170756 A1  May 23, 2024

Related U.S. Application Data

(63) Continuation of application No. 17/531,378, filed on Nov. 19, 2021, now Pat. No. 11,901,532.
(Continued)

(51) Int. Cl.
*H01M 10/61* (2014.01)
*H01M 10/613* (2014.01)
*H01M 50/24* (2021.01)

(52) U.S. Cl.
CPC ......... *H01M 10/613* (2015.04); *H01M 50/24* (2021.01); *H01M 2220/10* (2013.01)

(58) Field of Classification Search
CPC ......... H01M 10/4214; H01M 10/4235; H01M 10/613; H01M 10/63; H01M 10/488;
(Continued)

(56) References Cited

U.S. PATENT DOCUMENTS 9,331,497 B2   5/2016   Beaston
9,847,654 B2  12/2017   Beaston
(Continued)

FOREIGN PATENT DOCUMENTS

CN   103403993 A   11/2013
CN   105939035 A    9/2016
(Continued)

OTHER PUBLICATIONS

Machine-generated translation of CN 207664114) Min et al., Battery Pack Shell, Jul. 27, 2018.*
(Continued)

*Primary Examiner* — Raymond Alejandro
(74) *Attorney, Agent, or Firm* — Sterne, Kessler, Goldstein & Fox P.L.L.C.

(57) ABSTRACT

Provided is a battery module and battery rack having enhanced fire safety features. The battery module includes an applied pressure assembly with integrated sensor that detects swelling of a battery cell. An output signal of the sensor is used to halt operation of a battery system containing the battery module and an output signal of the sensor is used to halt charging and discharging of the battery module. In an embodiment, the battery module uses an AC-to-AC power supply to provide audio frequency power for balancing battery cells of the battery module. In an embodiment, the battery rack includes a directed water fire suppression system that provides battery cooling after a fire to ensure the fire does not reignite.

9 Claims, 98 Drawing Sheets

Related U.S. Application Data

(60) Provisional application No. 63/211,732, filed on Jun. 17, 2021, provisional application No. 63/170,600, filed on Apr. 5, 2021, provisional application No. 63/164,502, filed on Mar. 22, 2021, provisional application No. 63/125,958, filed on Dec. 15, 2020, provisional application No. 63/123,458, filed on Dec. 9, 2020.

(58) Field of Classification Search
CPC .... H01M 10/445; H01M 10/52; H01M 50/24; H01M 50/242; H01M 2220/10
See application file for complete search history.

(56) References Cited

U.S. PATENT DOCUMENTS

| | | |
|---|---|---|
| 9,882,401 B2 | 1/2018 | Beaston |
| 9,923,247 B2 | 3/2018 | Beaston et al. |
| 10,040,363 B2 | 8/2018 | Beaston et al. |
| 10,122,186 B2 | 11/2018 | Nystrom et al. |
| 10,153,521 B2 | 12/2018 | Beaston |
| 10,254,350 B2 | 4/2019 | Beaston |
| 10,263,436 B2 | 4/2019 | Beaston et al. |
| 10,270,266 B2 | 4/2019 | Beaston |
| 10,536,007 B2 | 1/2020 | Beaston et al. |
| 10,637,108 B1 | 4/2020 | Kaplan et al. |
| 10,699,278 B2 | 6/2020 | Beaston et al. |
| 11,611,114 B2 | 3/2023 | Song et al. |
| 11,901,532 B2 | 2/2024 | Beaston et al. |
| 2003/0047366 A1* | 3/2003 | Andrew ............... B60R 16/04 180/68.5 |
| 2006/0093896 A1 | 5/2006 | Hong et al. |
| 2008/0185994 A1 | 8/2008 | Altemose |
| 2011/0089897 A1 | 4/2011 | Zhang et al. |
| 2012/0059527 A1 | 3/2012 | Beaston et al. |
| 2012/0286739 A1 | 11/2012 | O'Brien et al. |
| 2013/0328530 A1 | 12/2013 | Beaston |
| 2014/0015469 A1 | 1/2014 | Beaston et al. |
| 2015/0171410 A1 | 6/2015 | Shin |
| 2015/0349390 A1 | 12/2015 | Aiba et al. |
| 2016/0111900 A1 | 4/2016 | Beaston et al. |
| 2016/0141894 A1 | 5/2016 | Beaston |
| 2016/0336556 A1 | 11/2016 | Okutani et al. |
| 2017/0038433 A1 | 2/2017 | Beaston |
| 2017/0040646 A1 | 2/2017 | Beaston |
| 2017/0077558 A1 | 3/2017 | Nystrom et al. |
| 2017/0077559 A1 | 3/2017 | Beaston |
| 2017/0106764 A1 | 4/2017 | Beaston et al. |
| 2017/0126032 A1 | 5/2017 | Beaston |
| 2017/0324122 A1 | 11/2017 | Poirier et al. |
| 2017/0345101 A1 | 11/2017 | Beaston |
| 2018/0123357 A1 | 5/2018 | Beaston et al. |
| 2018/0181967 A1 | 6/2018 | Beaston et al. |
| 2018/0233931 A1 | 8/2018 | Beaston |
| 2020/0101335 A1 | 4/2020 | Liu et al. |
| 2020/0139178 A1 | 5/2020 | Olivo et al. |
| 2020/0365956 A1 | 11/2020 | Jeon et al. |
| 2021/0083329 A1 | 3/2021 | Beaston |
| 2021/0083505 A1 | 3/2021 | Beaston |
| 2021/0218094 A1 | 7/2021 | Grenier et al. |
| 2022/0181713 A1 | 6/2022 | Beaston et al. |
| 2022/0271357 A1 | 8/2022 | Beaston et al. |
| 2022/0344738 A1 | 10/2022 | Beaston et al. |
| 2023/0060396 A1 | 3/2023 | Beaston et al. |

FOREIGN PATENT DOCUMENTS

| | | | | |
|---|---|---|---|---|
| CN | 106154178 A | 11/2016 | | |
| CN | 106199447 A | 12/2016 | | |
| CN | 106961114 A | 7/2017 | | |
| CN | 107394296 A | 11/2017 | | |
| CN | 107808988 A | 3/2018 | | |
| CN | 207664114 U | * | 7/2018 | ............. H01M 2/10 |
| CN | 209071439 U | 7/2019 | | |
| CN | 209104213 U | 7/2019 | | |
| CN | 110299574 A | 10/2019 | | |
| CN | 110945710 A | 3/2020 | | |
| CN | 111916596 A | 11/2020 | | |
| JP | 2006-24445 A | 1/2006 | | |
| KR | 20180049651 A | 5/2018 | | |
| KR | 102034771 B1 | 10/2019 | | |
| TW | 202017228 A | 5/2020 | | |
| WO | WO 2017/87807 | * | 5/2017 | ............... B60L 3/04 |
| WO | WO 2017/087807 | 5/2017 | | |
| WO | WO-2019/146999 A1 | 8/2019 | | |

OTHER PUBLICATIONS

"Practical Strain Gage Measurements," Application Note 290-1, Agilent Technologies Inc., 1999.

International Search Report and Written Opinion of the International Searching Authority directed to related International Patent Application No. PCT/US2022/013290, mailed Apr. 18, 2022; 19 pages.

Ma et al., "Sensor and Signal Detection and Conversion Technology," with machine translation attached, Oct. 2016, pp. 33-36.

* cited by examiner

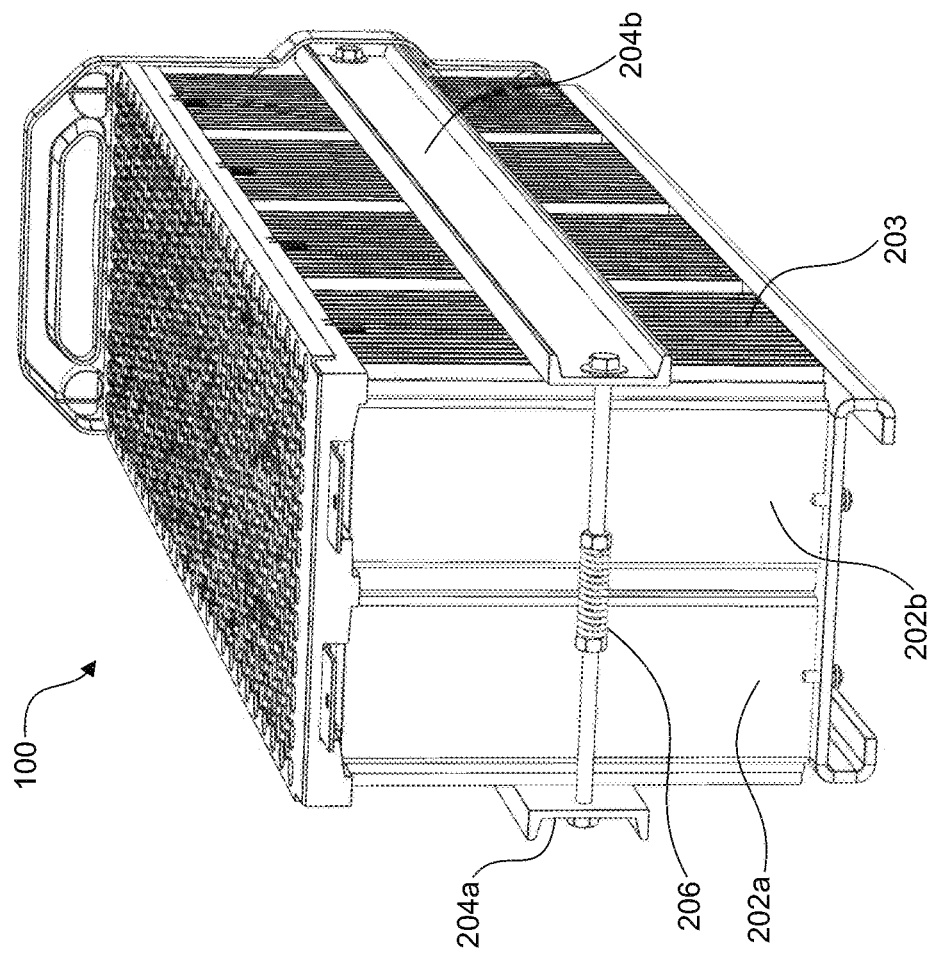
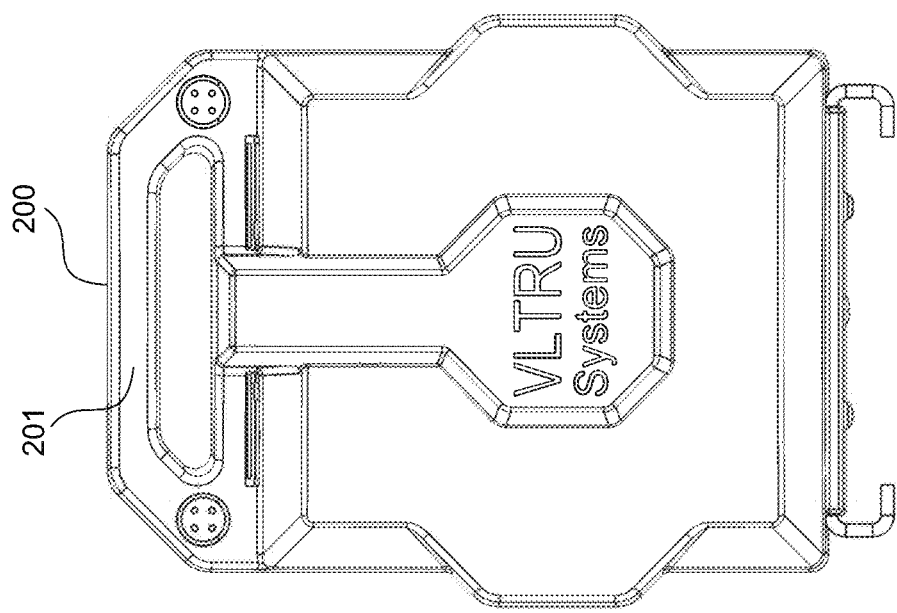
FIG. 2B
FIG. 2A

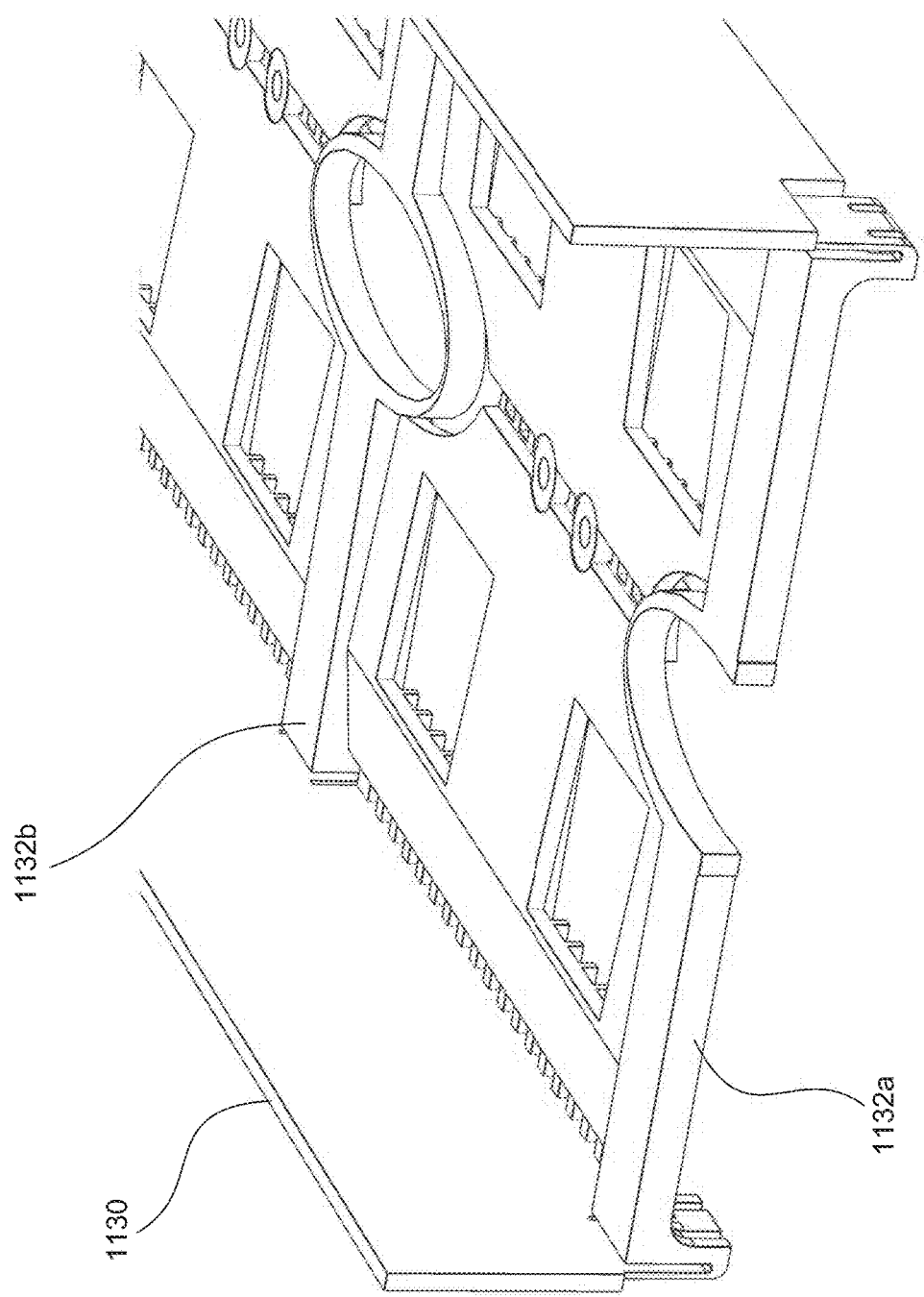

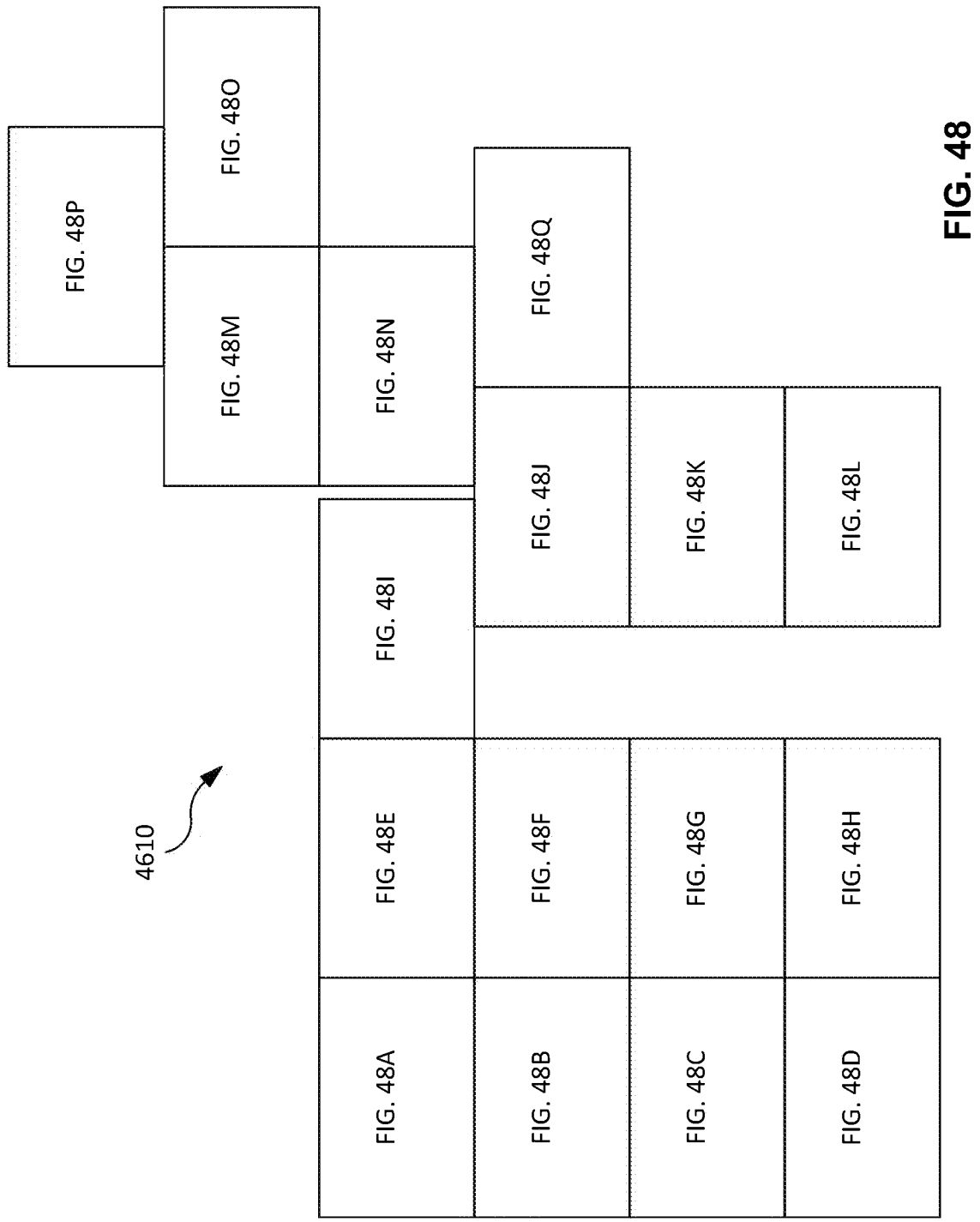

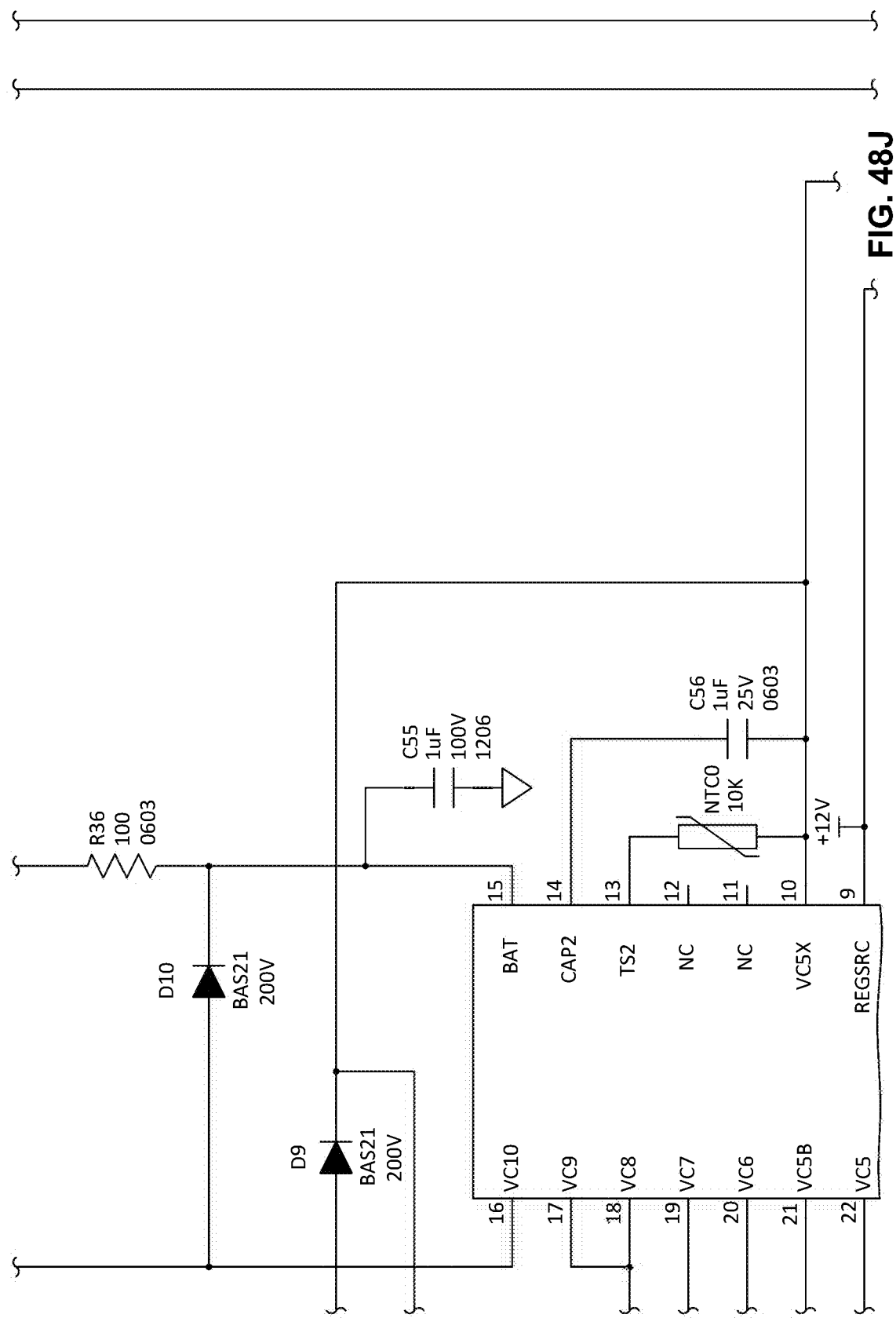

BATTERY MODULE AND BATTERY RACK WITH ENHANCED FIRE SAFETY FEATURES, AND APPLICATIONS THEREOF

CROSS-REFERENCE TO RELATED APPLICATIONS

This application is a continuation of U.S. patent application Ser. No. 17/531,378, filed Nov. 19, 2021, now U.S. Pat. No. 11,901,532, which claims the benefit of U.S. Provisional Patent Application 63/211,732, filed Jun. 17, 2021; U.S. Provisional Patent Application 63/170,600, filed Apr. 5, 2021; U.S. Provisional Patent Application 63/164,502, filed Mar. 22, 2021; U.S. Provisional Patent Application 63/125,958, filed Dec. 15, 2020; and U.S. Provisional Patent Application 63/123,458, filed Dec. 9, 2020; each of which is herein incorporated by reference as if fully reproduced below.

TECHNICAL FIELD

The present disclosure relates to battery energy storage systems.

BACKGROUND

Battery energy storage systems use a lot of batteries, which present a fire hazard if not properly managed. Conventional battery management systems typically just monitor battery cell voltages and temperatures. They do not monitor or indicate the internal state of the battery cells. Battery cell voltages as well as cell temperatures are not in themselves good indicators of changing conditions/pressure inside the cells that can lead to a battery fire.

SUMMARY

The embodiments featured herein help solve or mitigate the above-mentioned issues as well as additional shortcomings relating to battery storage systems.

Under certain circumstances, an embodiment of the invention includes a battery module having a sensor that detects swelling of a battery cell. An output signal of the sensor is used to halt operation of a battery rack/system containing the battery module and thereby halt charging and discharging of the battery cell until the battery module containing the battery cell can be replaced and the battery rack/system inspected to verify it is safe to operate.

In an embodiment, high frequency AC power is used as a power source for balancing the battery module cells. Using high frequency AC power permits the use of isolation transformers as a part of the cell balancing circuit.

In an embodiment, battery modules according to the invention include a top cover that collects water and directs this water to plates of the battery module to cool the battery.

In an embodiment, battery racks according to the present invention include a water fire suppression system having a cascading water flow among the battery modules, which provides cooling in the event of a battery cell fire and thereby controls and prevents the spread of a battery cell fire to neighboring cells and racks.

In an embodiment, battery racks according to the present invention include an exhaust duct to remove gases and/or heat and direct these gases and/or heat outside of the room, container, building, etc. that houses the battery rack.

Further features and advantages of the disclosure, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Together with the following detailed descriptions, the accompanying drawings illustrate a number of exemplary embodiments in addition to describing and demonstrating various aspects and/or principles set forth in the present disclosure. The accompanying drawings and the brief descriptions are provided to enable one of ordinary skill in the art to practice the various aspects and/or principles set forth in the present disclosure.

FIG. 2A illustrates the front cover of the battery module of FIG. 1.

FIG. 2B illustrates the battery module of FIG. 1 with the front cover removed.

FIGS. 11C-H illustrate an example top tray with integrated swelling/pressure sensors according to embodiments of the present invention.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein as well as modifications thereof. Accordingly, various modifications and equivalents of the methods, apparatuses, and/or systems described herein will be apparent to those of ordinary skill in the art. Descriptions of well-known functions and constructions may be omitted for increased clarity and conciseness.

Figure 1:
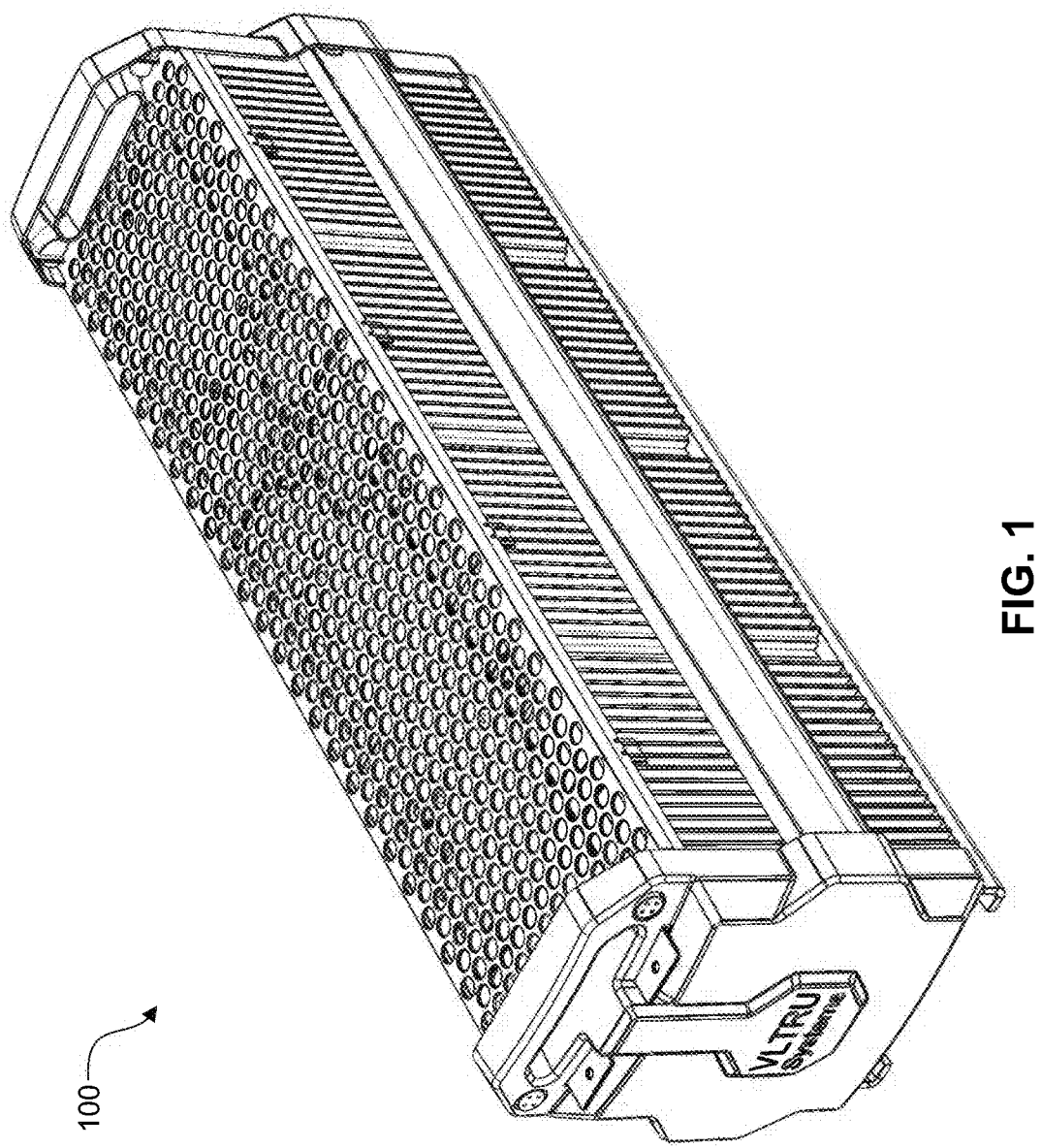
FIG. 1 illustrates an example battery module according to an embodiment of the present invention.

FIG. 1 illustrates an example battery module 100 according to an embodiment of the present invention. As shown more clearly in FIG. 3A, battery module 100 includes several features that enhance fire safety and can prevent a battery fire.

Over time, a battery cell within a battery module may become damaged and begin to swell. This swelling is a very good indication of a change in the internal pressure of the cell and is a very good indicator that the cell might catch on fire if not replaced. The swelling can be caused, for example, by the formation of flammable and explosive gases inside the cell due to changes in the electrolyte and other active materials inside the battery cell. Cell swelling occurs before a cell vents and/or catches on fire.

As described herein, a new swelling/pressure sensor is designed and installed on battery modules according to embodiments of the present invention that can detect and quantify the amount of swelling/pressure in the battery cells. When swelling/pressure beyond normal cycling changes is detected using firmware/software and data from the sensors, an alarm/warning is generated by the firmware/software so that action can be taken whereby the battery cells having the abnormal swelling/pressure can be replaced before the cells vent or can progress to a point where a fire is likely to occur. The alarm/warning can also be used to automatically disconnect, for example, the battery rack containing the battery cells having the abnormal swelling/pressure so that the battery cells are not further charged or discharged and thus further damaged, which could lead to the venting of the battery cells and/or a battery cell fire.

In one embodiment, as described in more detail below, one swelling/pressure sensor can be used to monitor several cells at once by attaching the sensor to plates of a battery assembly or battery module. In another embodiment, the swelling/pressure sensor(s) is/are attached to the battery cell(s) directly. As described herein, the detection of abnormal swelling/pressure in a battery cell can be used to shut down the battery system and make it safe until a cell having an issue is replaced and the system is inspected to make sure it is safe to operate again.

FIG. 2A illustrates a front cover 200 of battery module 100. Front cover 200 includes a handhold 201 for lifting and for carrying battery module 100.

FIG. 2B illustrates battery module 100 with front cover 200 removed. As shown in FIG. 2B, battery module 100 includes battery cells 202a and 202b. These battery cells have a predetermined amount of pressure applied to them using side plates 203, side bars 204a and 204b, and a spring 206. Applying a predetermined amount of pressure to battery cells 202 can increase the cycle life of battery cells 202. By using spring 206 to apply this pressure, the side plates 203 are still free to move due to swelling/expansion of battery cells 202. As described in more detail below, the movement of side plates 203 can be monitored and measured using sensors according to embodiments of the present invention.

Figure 3A:
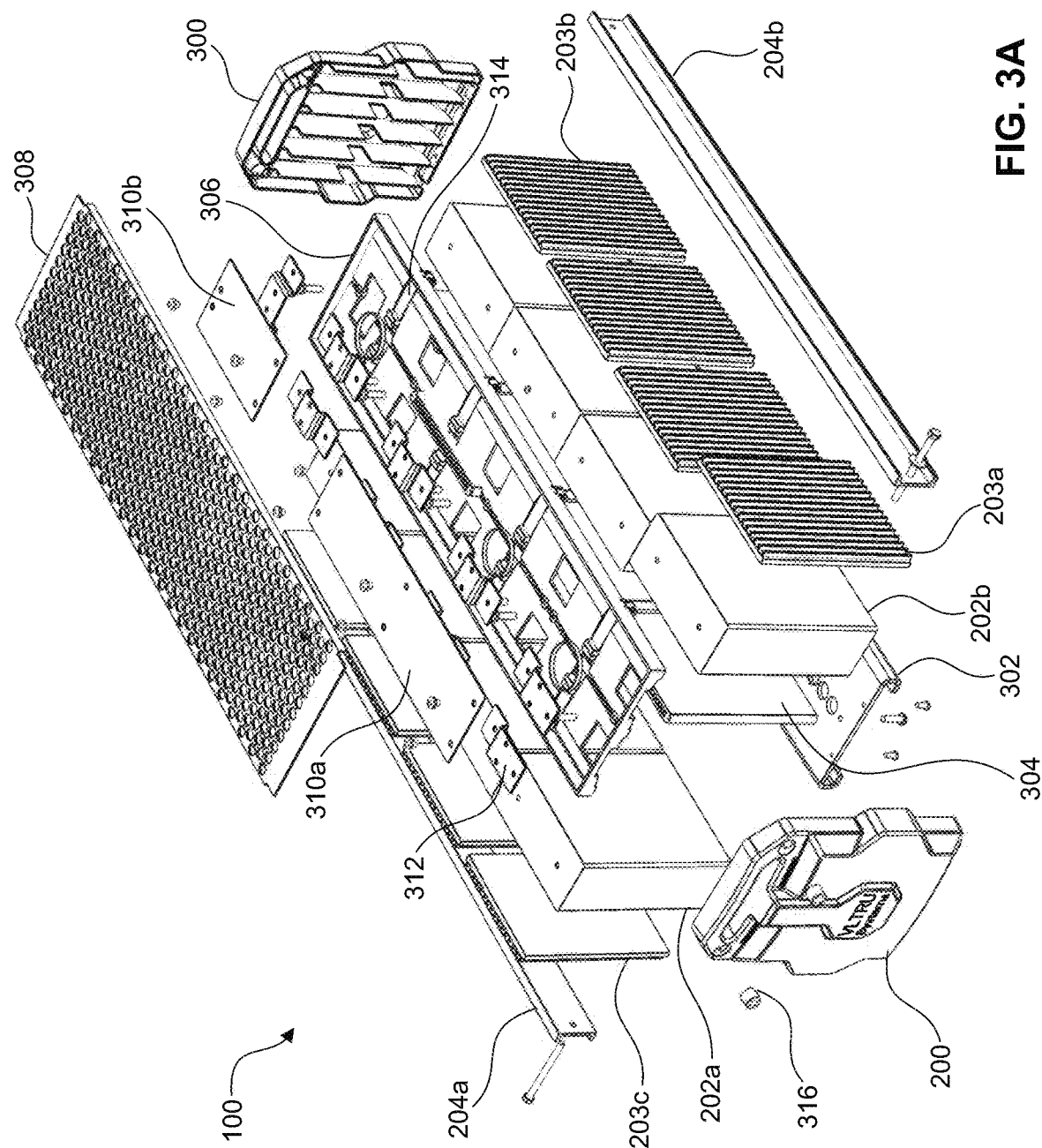
FIG. 3A illustrates an exploded view of the battery module in FIG. 1.

FIG. 3A illustrates an exploded view of battery module 100. As shown in FIG. 3A, battery module 100 includes front cover 200, a back cover 300, battery cells 202 (e.g., 202a, 202b), side plates 203 (e.g., 203a, 203b, 203c), side bars 204 (e.g., 204a, 204b), a bottom plate 302, center plates 304, top tray 306, and a cover 308. Also included in battery module 100 are battery module controller circuit boards 310a and 310b, busbars 312, sensors 314, and connectors 316.

In an embodiment, battery module 100 includes eight battery cells 202. However, fewer or more battery cells may be included in battery module 100, such as two, four, six, ten, twelve, fourteen, sixteen, etc. Battery cells 202 are used for storing electrical energy. The eight battery cells 202 are connected in series using busbars 312. A predetermined amount of pressure is applied to battery cells 202 using side plates 203, center plates 304, and side bars 204. Side plates 203 and center plates 304 also provide cooling for battery cells 202. Top tray 306 fits on top of battery cells 202 and provides several functions including providing a protective space for sensors 314 and battery module controller circuit boards 310a and 310b. Other functions of top tray 306 are described below. Cover 308 fits on top of top tray 306. Front cover 200 and back cover 300 are used, for example, to lift and carry battery module 100. Front cover 200 includes connectors 316 that allow for several battery modules 100 to be easily wired together to form larger battery systems. Battery module controller circuit boards, described in more detail below, provide battery management functions for battery module 100 such as, for example, monitoring the voltage, temperature, and pressure of battery cells 202.

Figure 3B:
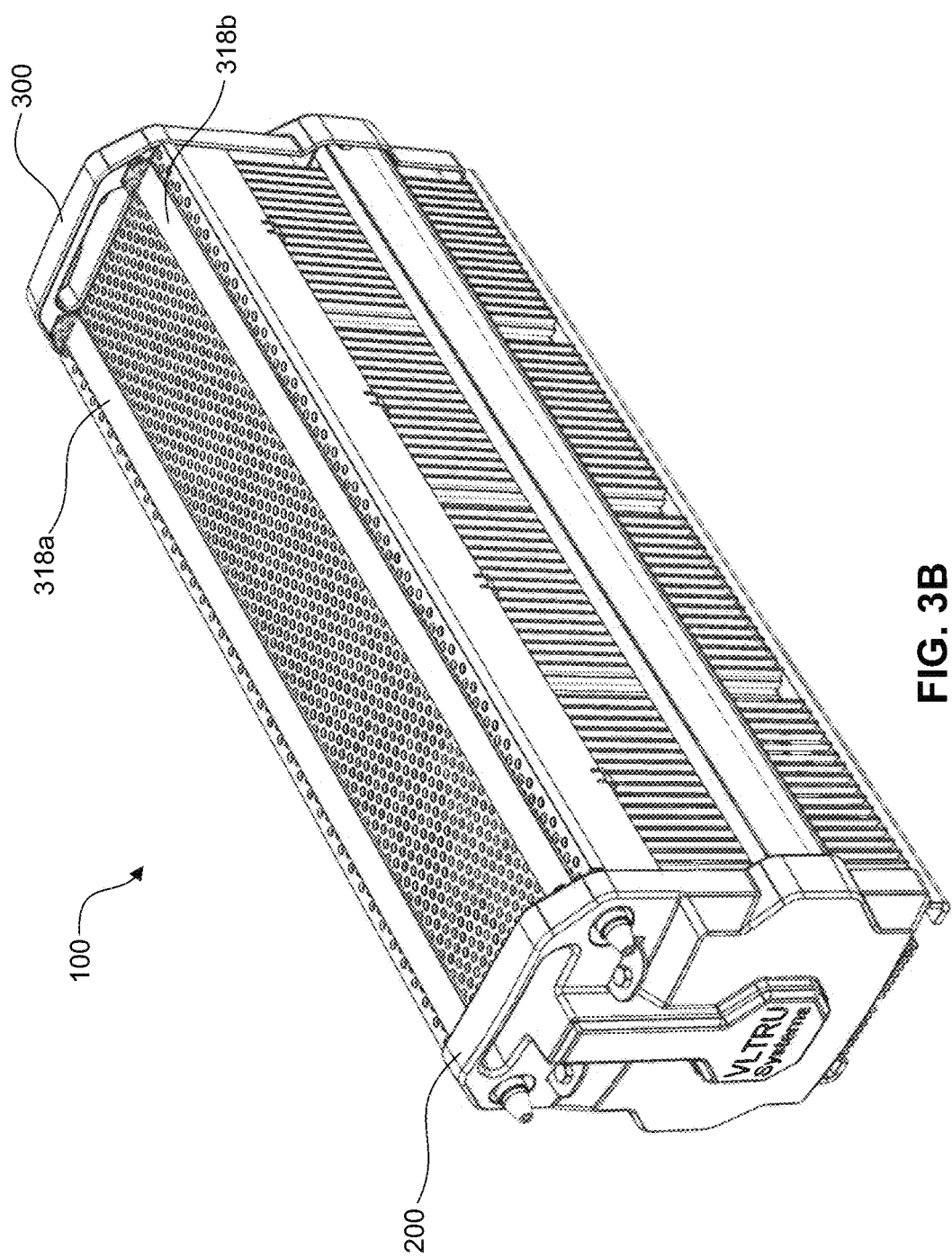
FIG. 3B illustrates the battery module of FIG. 1 with handle straps installed.

FIG. 3B illustrates battery module 100 with handle straps 318a and 318b installed. As shown in FIG. 3B, handle straps 318a and 318b connect the tops of front cover 200 and back cover 300 together for added support when battery module 100 is lifted and carried.

Figure 4B:
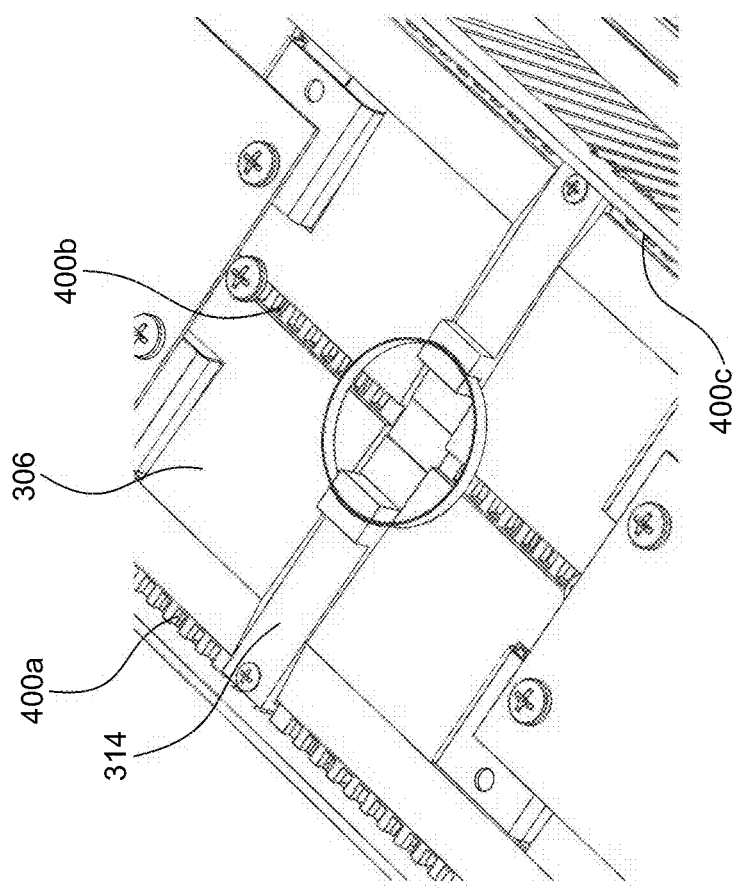
FIG. 4B illustrates an example of a swelling/pressure sensor for the battery module of FIG. 1.
Figure 4A:
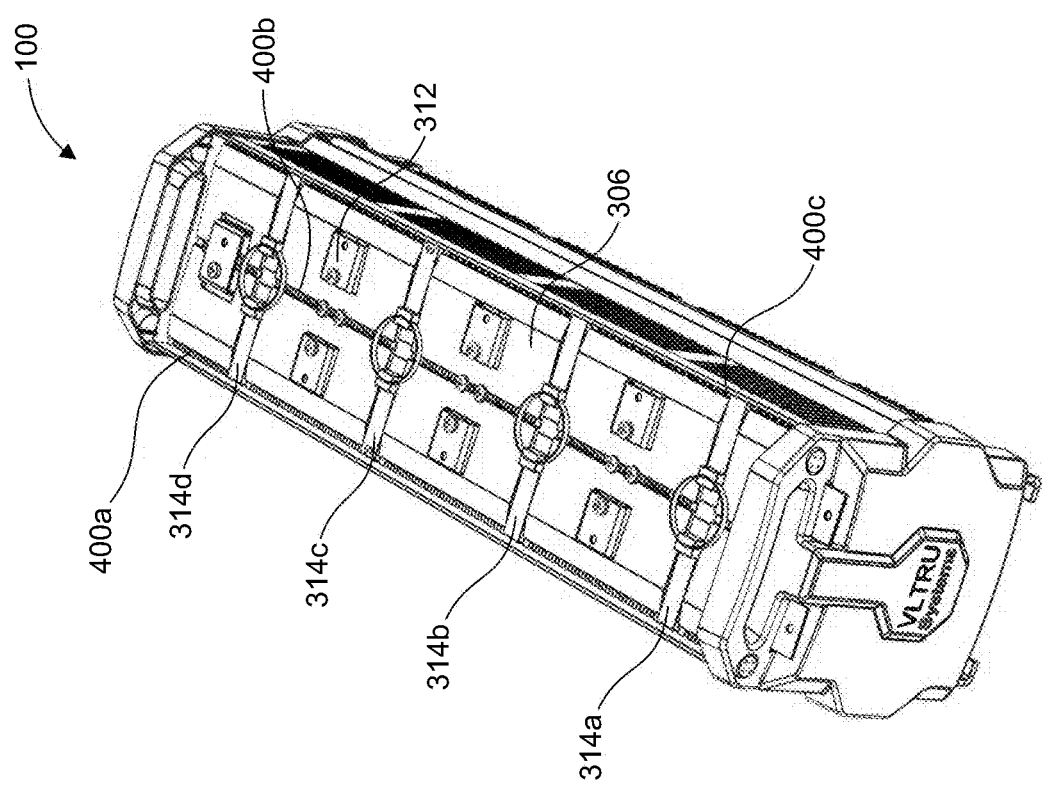
FIG. 4A illustrates the battery module of FIG. 1 with the top cover removed.

FIG. 4A illustrates battery module 100 with top cover 308 and battery module controller circuit boards 310a and 310b removed. Thus, top tray 306, busbars 312, and sensors 314a-d are more clearly visible in FIG. 4A. As can be seen in FIG. 4A, top tray 306 includes holes 400a, 400b, and 400c. Holes 400a and 400c are on the sides of top tray 306. Holes 400b are in the center of top tray 306. Holes 400 allow air to flow over the side plates and through the center plates of battery module 100 for cooling of the battery cells. As described in more detail below, the holes 400 also allow for water collected in top tray 306 from a water fire suppression system to be channeled to flow over the side plates and through the center plates of battery module 100. The water flow can be influenced by the slope of the bottom of top tray 306.

FIG. 4B illustrates one example of a swelling/pressure sensor 314 for the battery module 100. Other swelling/pressor sensors are described below and can be used with battery modules according to embodiments of the present invention. FIG. 4B also shows in more detail the holes 400 of top tray 306.

Figure 5:
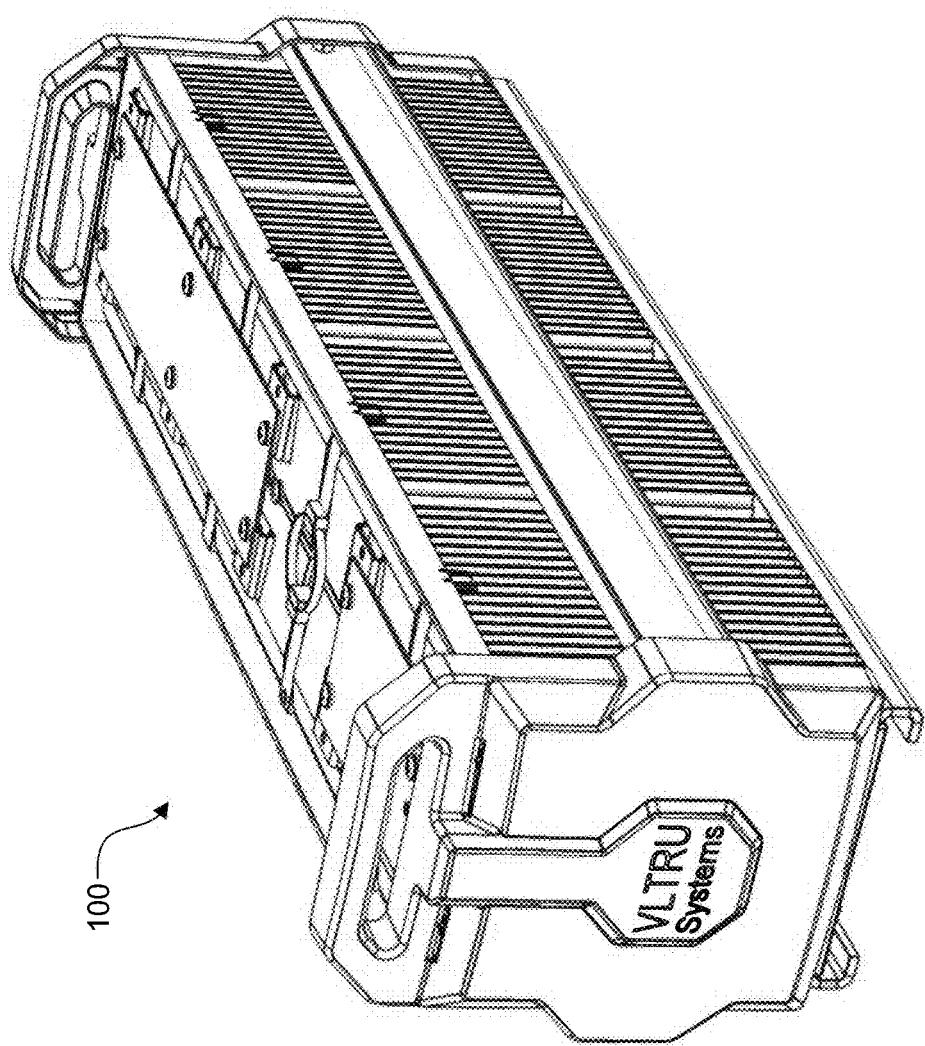
FIG. 5 illustrates a rear view of the battery module of FIG. 1 with the top cover removed.

FIG. 5 illustrates a rear view of battery module 100 with cover 308 removed. Many of the features of battery module 100 described herein can be seen in FIG. 5.

Figure 6:
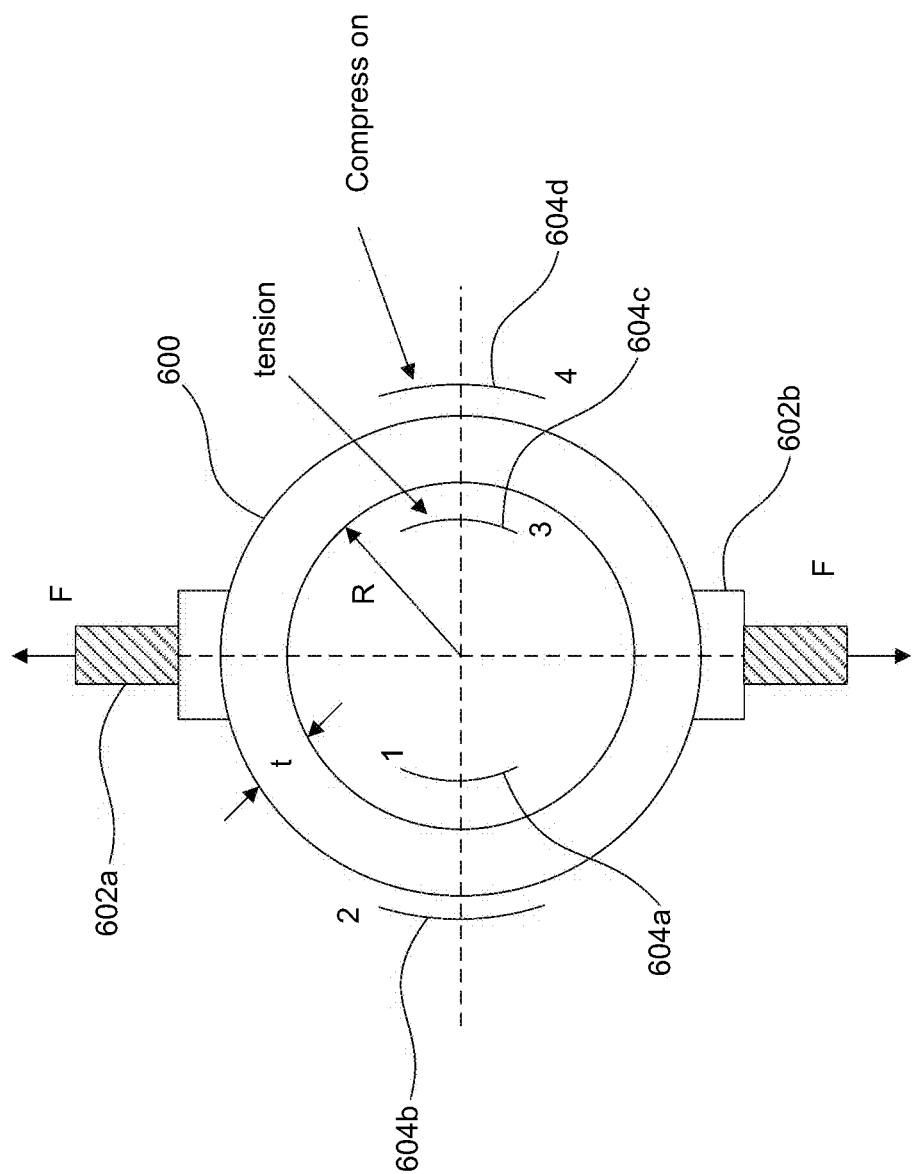
FIG. 6 illustrates an example swelling/pressure sensor that may be used according to embodiments of the present invention.

FIG. 6 illustrates the working principles of an example swelling/pressure sensor 314 that may be used according to embodiments of the present invention. As shown in FIG. 6, in an embodiment a sensor 314 according to the present invention has a ring 600, which may be metal or plastic or any other suitable material. Ring 600 includes two attachment points, 602a and 602b, at which a force can be applied. When a force is applied at attachment points 602, ring 600 experiences tension and compression at locations 604a-d as shown in FIG. 6. In embodiments, one or more strain gauges are attached to ring 600 at one or more of these locations and used to measure the tension and/or compression at these locations. How this is done is explained in more detail below.

Figure 7B:
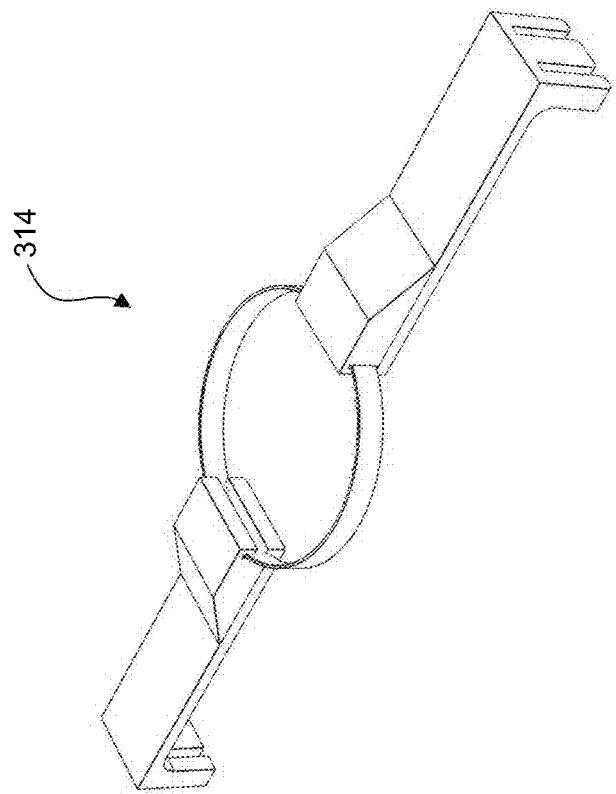
FIGS. 7A-B illustrate an example swelling/pressure sensor that may be used according to embodiments of the present invention.
Figure 7A:
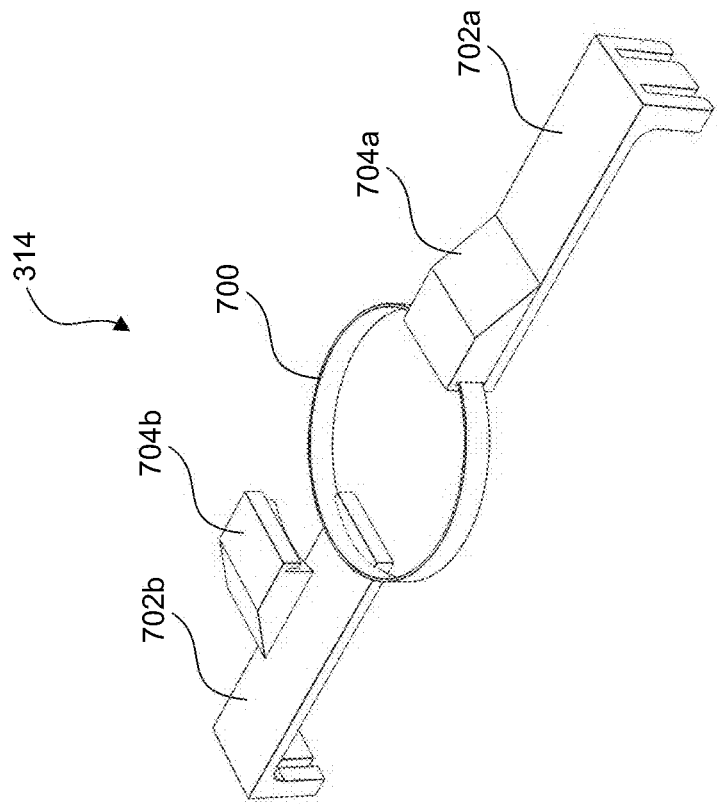

FIGS. 7A-B further illustrate an example swelling/pressure sensor 314 that may be used according to embodiments of the present invention. As shown in FIG. 7A, sensor 314 includes a metal ring 700 and two plastic attachments 702a and 702b. The metal ring 700 is securely held on attachments 702a-b by plastic caps 704a and 704b. In an embodiment, plastic caps 704a and 704b are coupled to attachments 702a and 702b to securely hold metal ring 700 in place. This coupling may be achieved using an adhesive or glue. FIG. 7B shows an assembled sensor 314. One or more strain gauges (not shown) are attached to metal ring 700 as described herein.

Figure 8B:
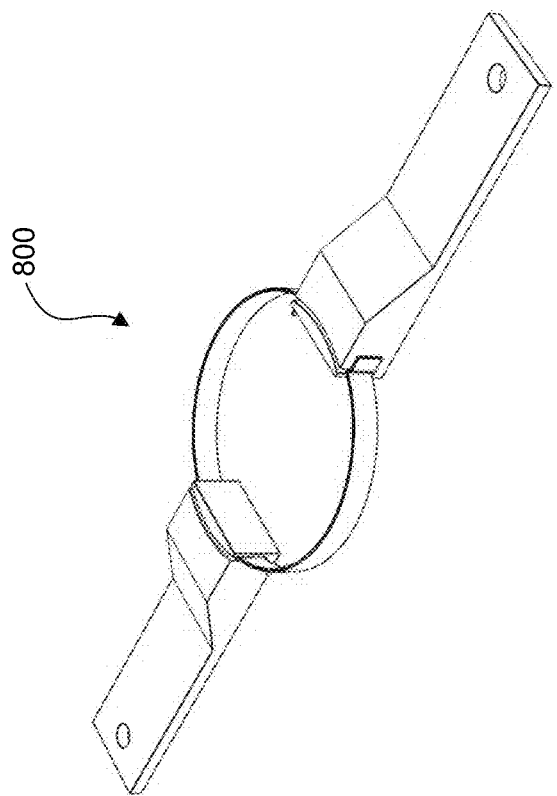
FIGS. 8A-B illustrate an example swelling/pressure sensor that may be used according to embodiments of the present invention.
Figure 8A:
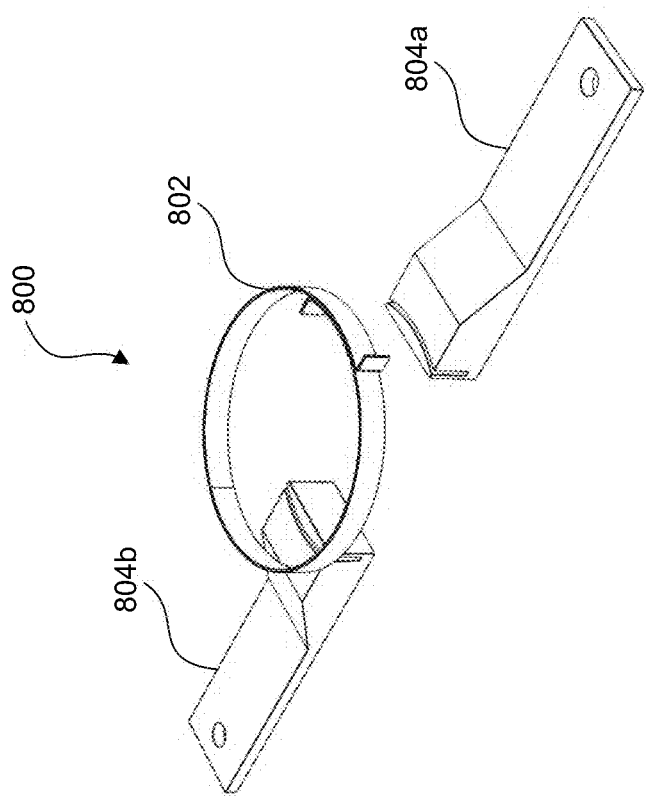

FIGS. 8A-B illustrate an example swelling/pressure sensor 800 that may be used according to embodiments of the present invention. As shown in FIG. 8A, sensor 800 includes a metal ring 802 and plastic attachments 804a and 804b. In an embodiment, after metal ring 802 is inserted into slots in plastic attachments 804a-b, a small amount of glue or adhesive may be applied to firmly secure metal ring 802 to plastic attachments 804a-b. FIG. 8B shows an assembled sensor 800. One or more strain gauges (not shown) are attached to metal ring 802 as described herein.

Figure 9B:
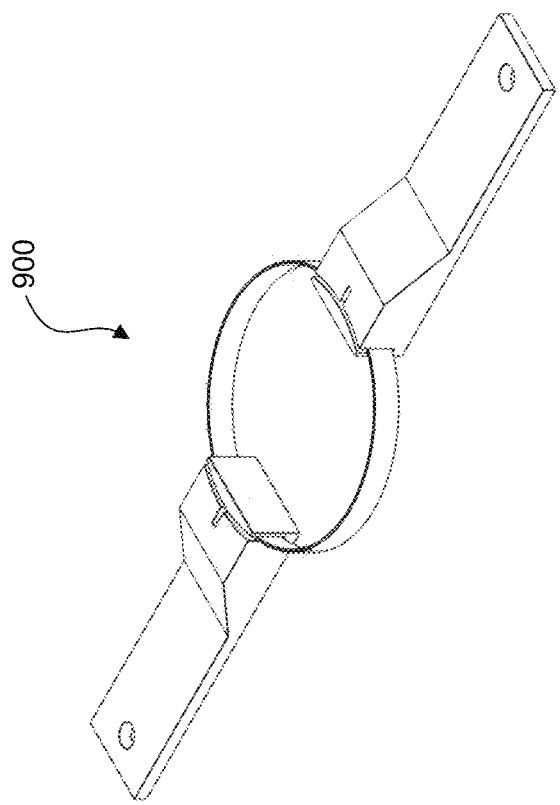
FIGS. 9A-B illustrate an example swelling/pressure sensor that may be used according to embodiments of the present invention.
Figure 9A:
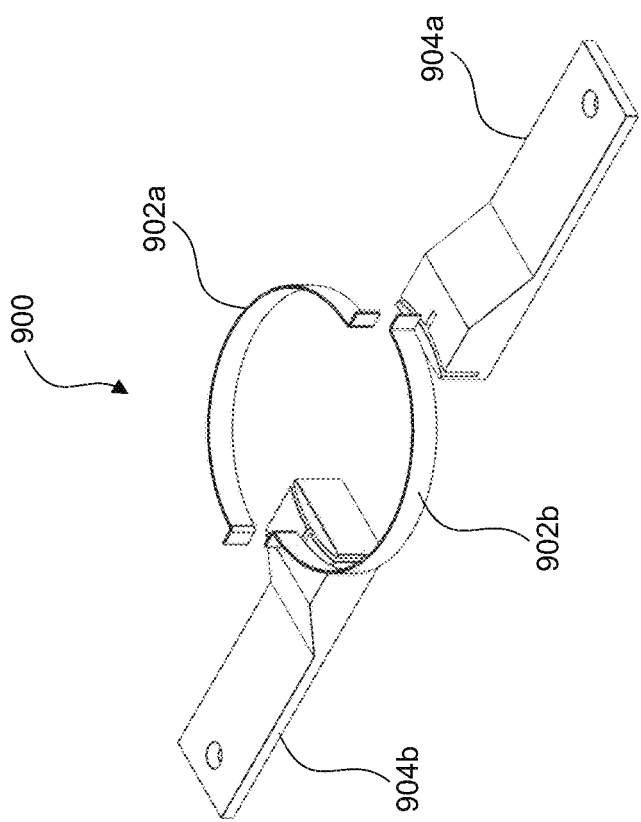

FIGS. 9A-B illustrate an example swelling/pressure sensor 900 that may be used according to embodiments of the present invention. As shown in FIG. 9A, sensor 900 includes two half metal rings 902a and 902b and two plastic attachments 904a and 904b. In an embodiment, after metal half rings 902 are inserted into slots in plastic attachments 904a and 904b, a small amount of adhesive or glue may be applied to firmly secure metal half rings 902a-b to plastic attachments 904a-b. FIG. 9B shows an assembled sensor 900. One or more strain gauges (not shown) are attached to metal half rings 902 as described herein.

Figure 10:
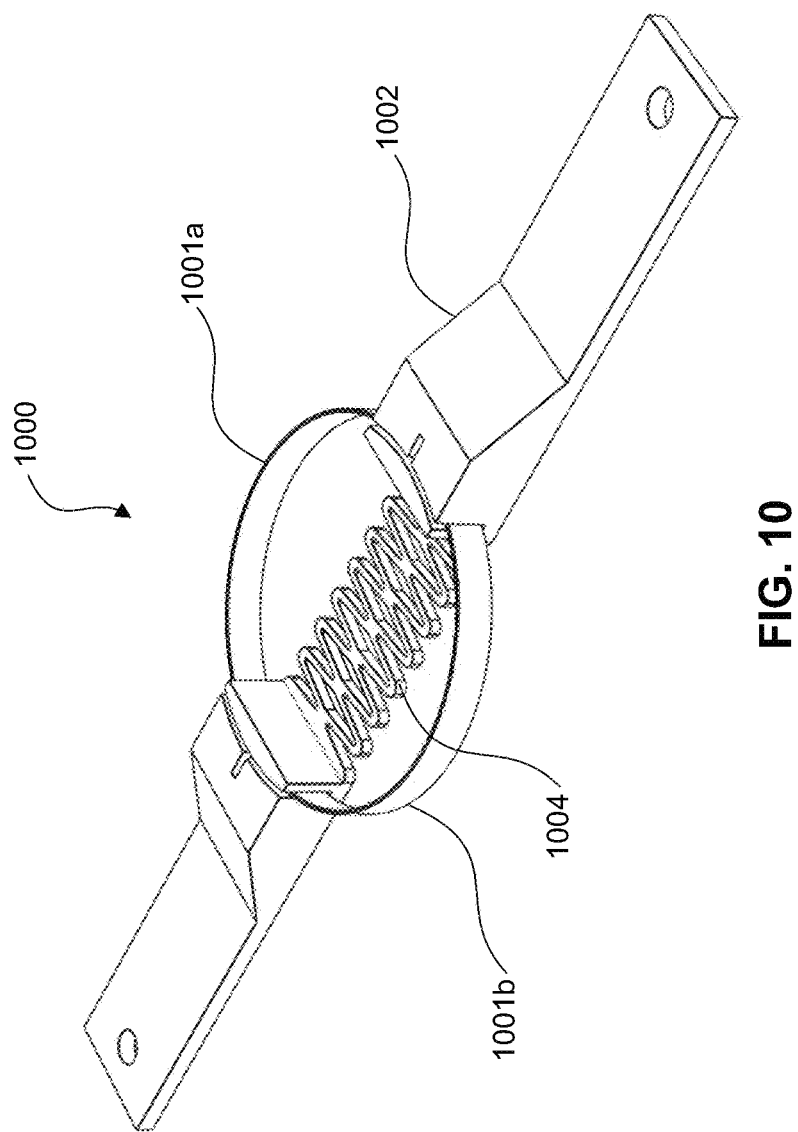
FIG. 10 illustrates an example swelling/pressure sensor that may be used according to embodiments of the present invention.

FIG. 10 illustrates an example swelling/pressure sensor 1000 that may be used according to embodiments of the present invention. Sensor 1000 includes two metal half rings 1001a and 1001b, and a plastic attachment 1002 with a flexible center piece 1004 (which may be plastic or any other suitable material). The flexible center piece 1004 can help with the assembly of sensor 1000. One or more strain gauges (not shown) are attached to metal half rings 1002 as described herein.

Figure 11A:
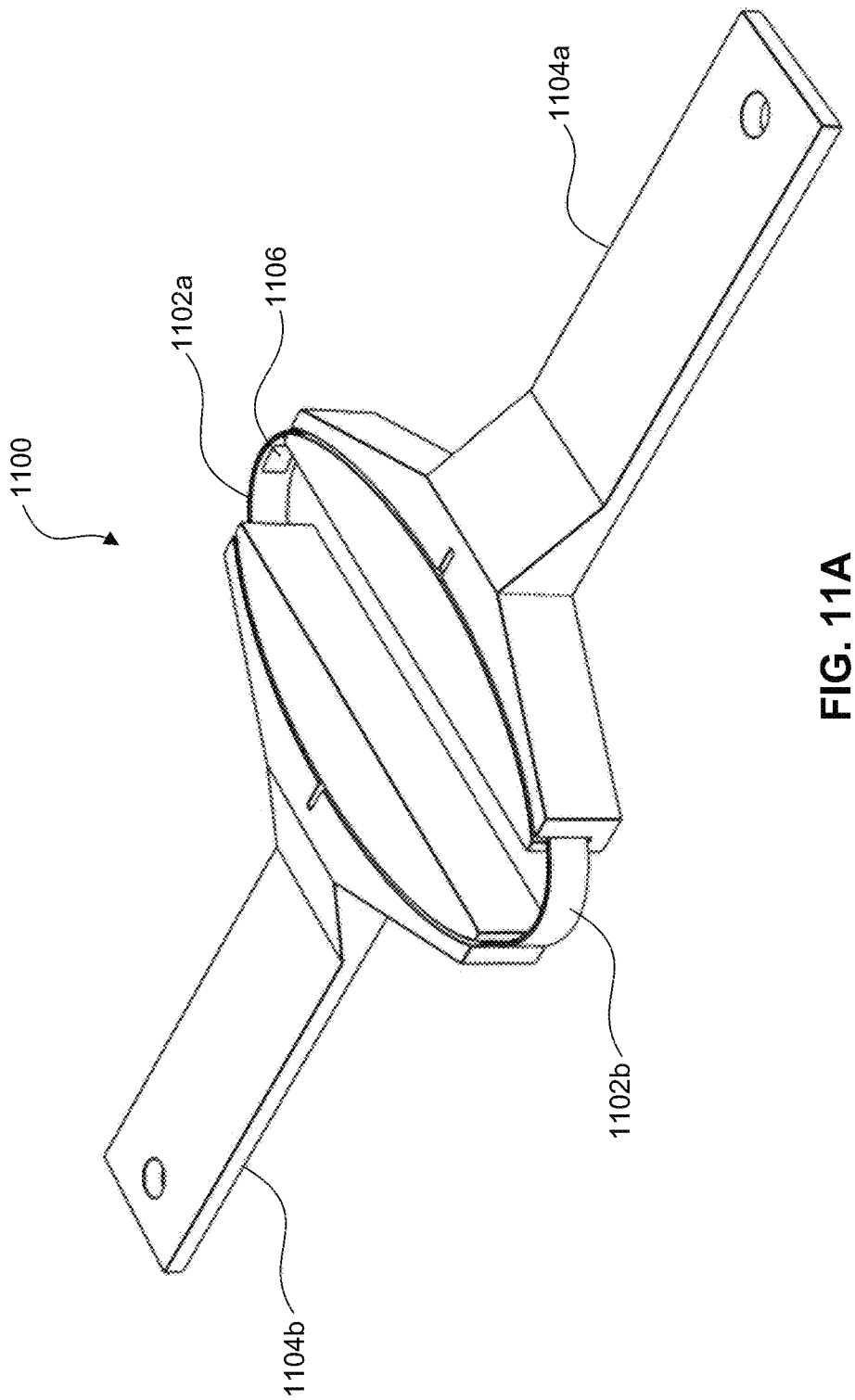
FIG. 11A illustrates an example swelling/pressure sensor that may be used according to embodiments of the present invention.

FIG. 11A illustrates an example swelling/pressure sensor 1100 that may be used according to embodiments of the present invention. As shown in FIG. 11A, sensor 1100 includes two oval-shaped half metal rings 1102a and 1102b and two plastic attachments 1104a and 1104b. In an embodiment, after oval-shaped metal half rings 1102 are inserted into slots in plastic attachments 1104a and 1104b, a small amount of adhesive or glue may be applied to firmly secure metal half rings 1102a-b to plastic attachments 1104a-b. as shown in FIG. 11A, one or more strain gauges 1106 are attached to oval-shaped metal half rings 1102 as described herein.

Figure 11B:
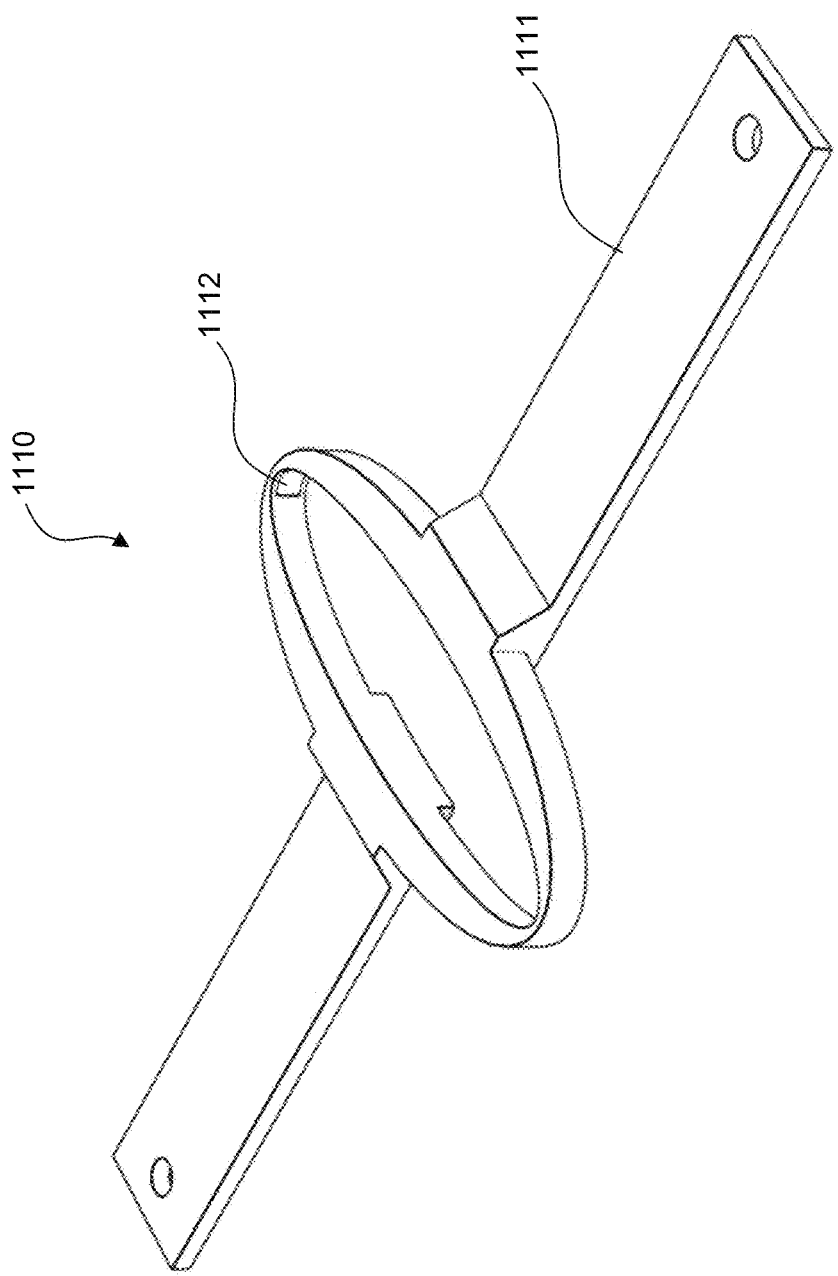
FIG. 11B illustrates an example swelling/pressure sensor that may be used according to embodiments of the present invention.

FIG. 11B illustrates an example swelling/pressure sensor 1110 that may be used according to embodiments of the present invention. As shown in FIG. 11B, sensor 1110 includes a single part 1111 and one or more strain gauges 1112 attached to plastic part 1111. The single part 1111 may be made entirely of plastic or any suitable material. Sensor 1110 can be less expensive to make and assemble than other sensors according to the present invention described herein.

Figure 11C:
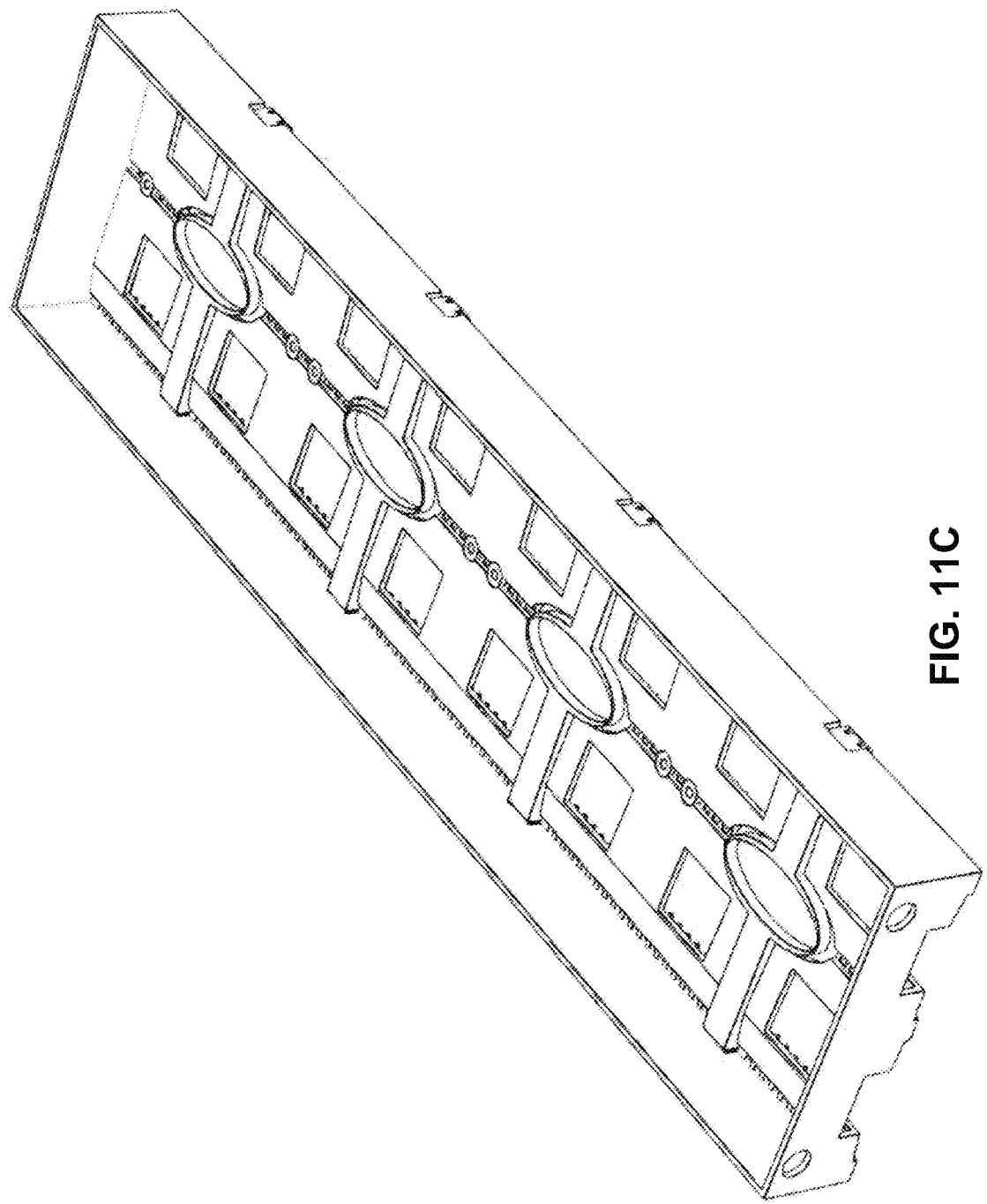
Figure 11D:
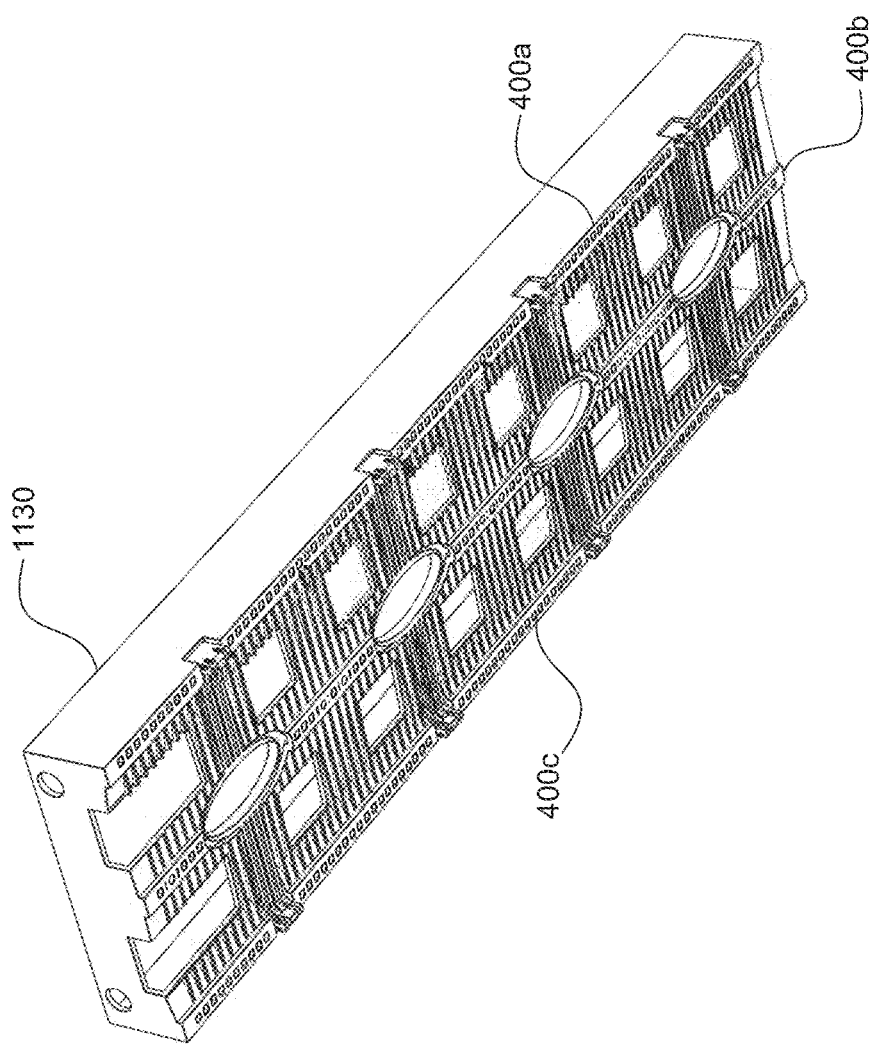
Figure 11F:
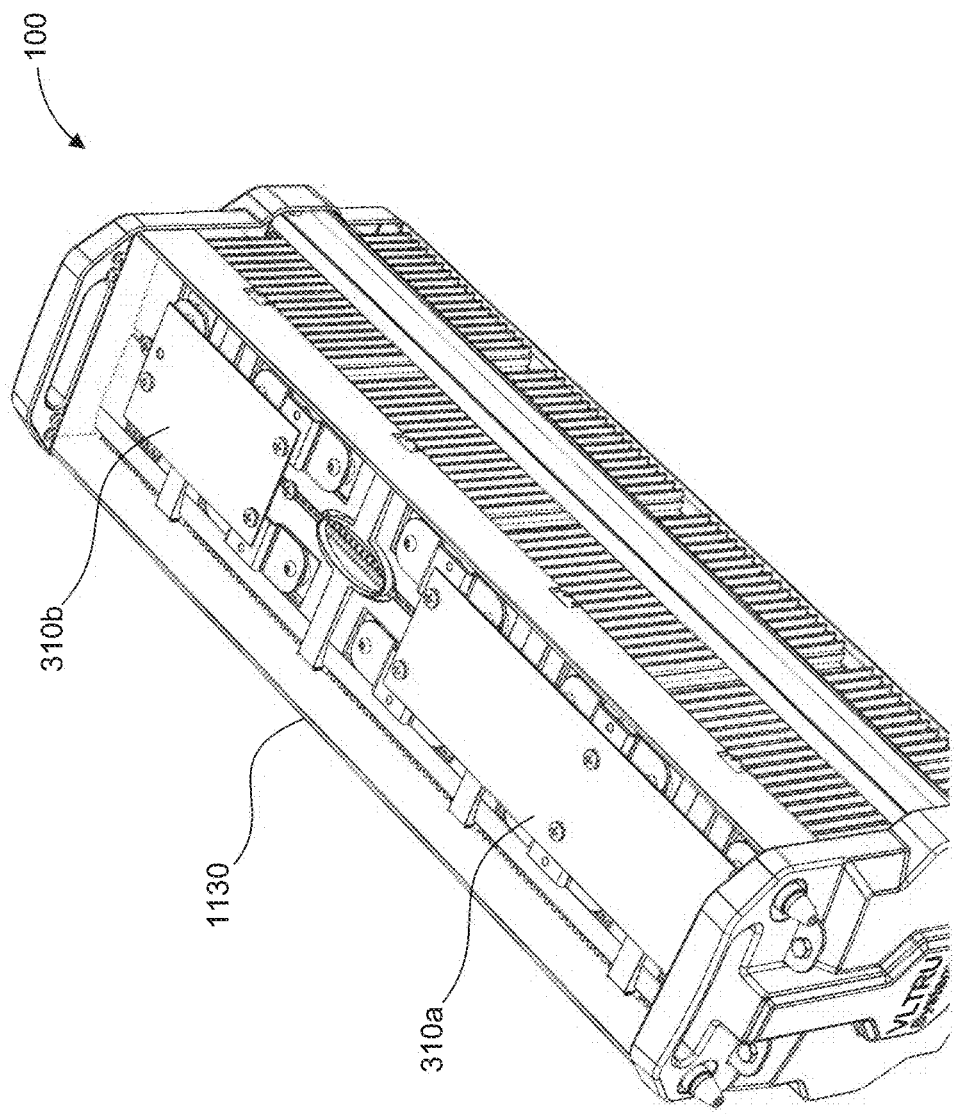
Figure 11G:
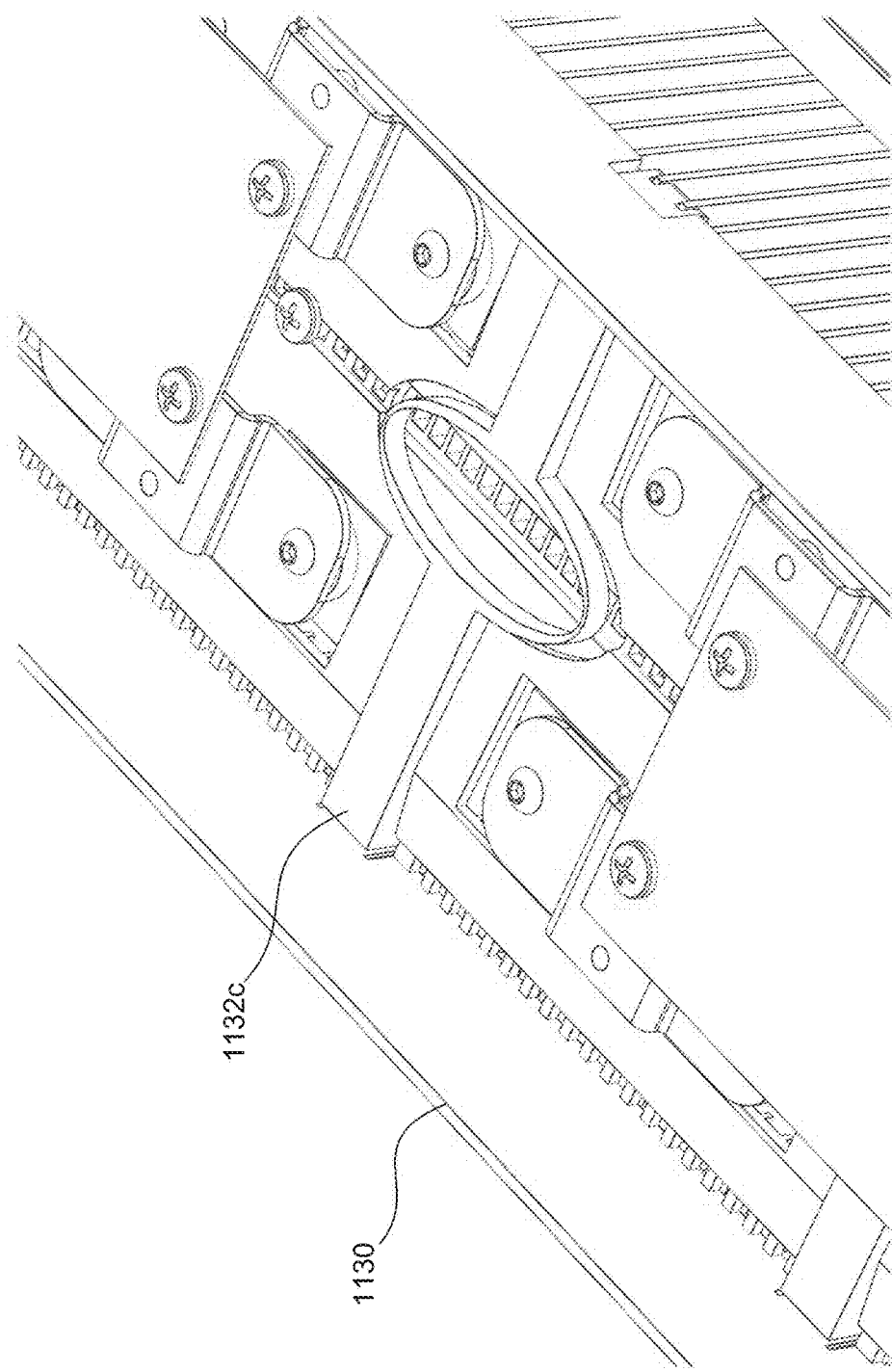
Figure 11H:
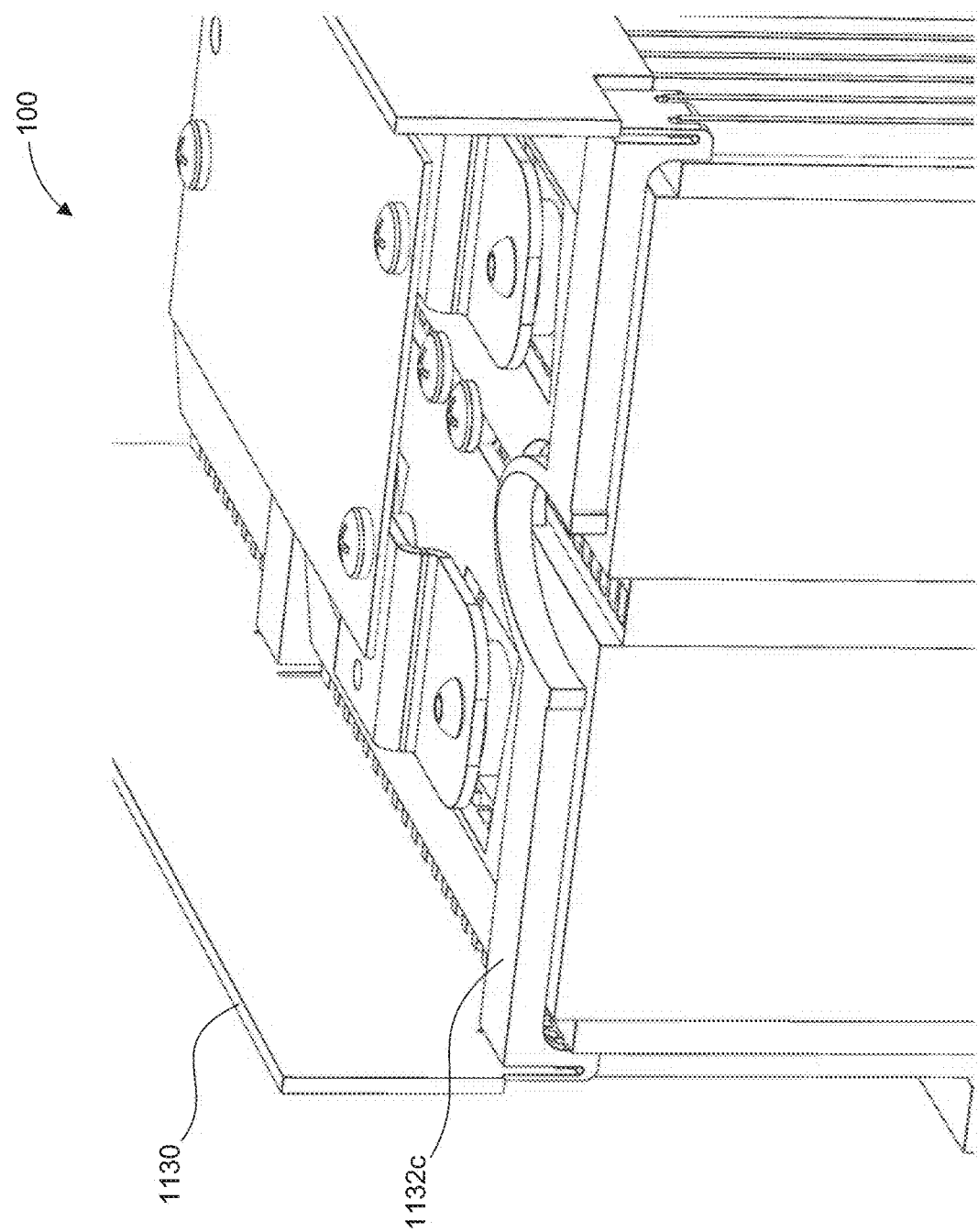

FIGS. 11C-H illustrate an example top tray 1130 with integrated swelling/pressure sensors 1132a-d according to an embodiment of the present invention. FIG. 11C is a top view of example top tray 1130, in which the four integrated swelling/pressures sensors 1132a-d can be seen. These sensors are similar to sensor 1110 in FIG. 11B. FIG. 11D is a bottom view of top tray 1130. In FIG. 11D, one can see the holes 400a-c that are used to direct water to the side plates and center plate of a battery module according to the present invention in order to cool the battery cells in the event of a battery cell fire. FIG. 11E is a sectional view of top tray 1130 that shows sensors 1132a and 1132b. FIG. 11F shows top tray 1130 installed on a battery module 100 according to the present invention. In FIG. 11F, one can see the installed battery module controller circuit boards 310a-b installed on the battery module and see how top tray 1130 protects the circuit boards. FIG. 11G further illustrates top tray 1130 and one of its integrated sensors 1132c. FIG. 11H is a sectional view that further illustrates top tray 1130 with its integrated sensor 1132c installed on a battery module 100.

In other embodiments of the present invention, other sensors according to the present invention are integrated into a top tray of a battery module. For example, in embodiments, sensors similar to those shown in FIGS. 7A-B, FIGS. 8A-B, FIGS. 9A-B, FIG. 10, and FIG. 11A can be integrated into a top tray as shown in FIGS. 11C-H. Integrating sensors according to the present invention into the top tray can, for example, reduce manufacturing costs, tooling costs, labor costs, etc. Additionally, while the ring(s) of the sensors shown in FIGS. 7A-B, FIGS. 8A-B, FIGS. 9A-B, FIG. 10, and FIG. 11A were described as being metal, any suitable material may be used. Similarly, while the attachment(s) and cap(s) of the sensors shown in FIGS. 7A-B, FIGS. 8A-B, FIGS. 9A-B, FIG. 10, and FIG. 11A were described as being plastic, any suitable material may be used.

Figure 12A:
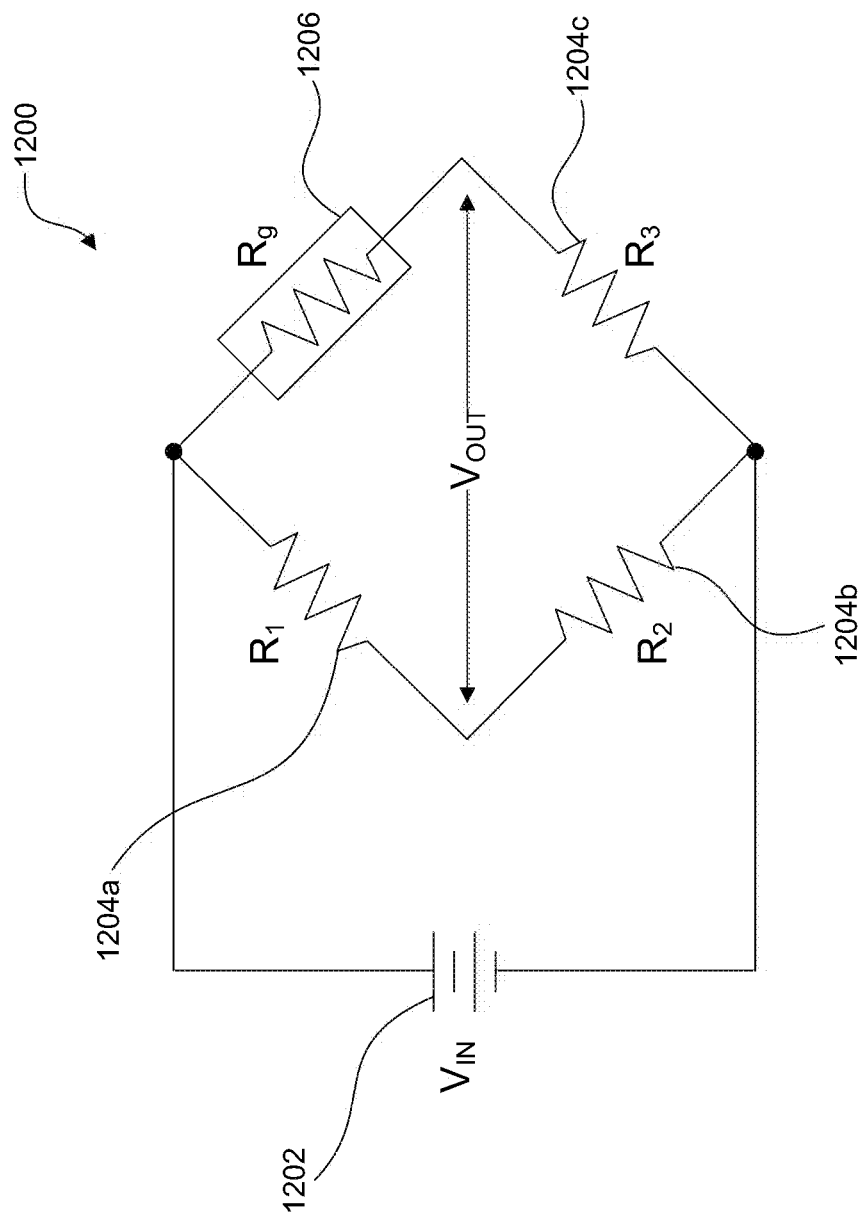
FIG. 12A illustrates a circuit that may be used with swelling/pressure sensors according to embodiments of the present invention.

FIG. 12A illustrates a circuit 1200 that may be used with swelling/pressure sensors according to embodiments of the present invention. Circuit 1200 is a Wheatstone bridge circuit. As shown in FIG. 12A, circuit 1200 includes a voltage source 1202, three fixed resistance values 1204a-c, and a variable resistance value 1206. In embodiments of the present invention, variable resistance 1206 is a swelling/pressure sensor as described herein. In operation, a voltage is applied to the Wheatstone bridge circuit, and any change in the resistance of a strain gauge that forms a part of a swelling/pressure sensor due to the swelling of a battery cell that forms a part of a battery module is detected as a change in the output voltage shown in FIG. 12A. One or more strain gauges may be coupled to (e.g., wired to) one or more of the battery module controller circuit boards.

Figure 12B:
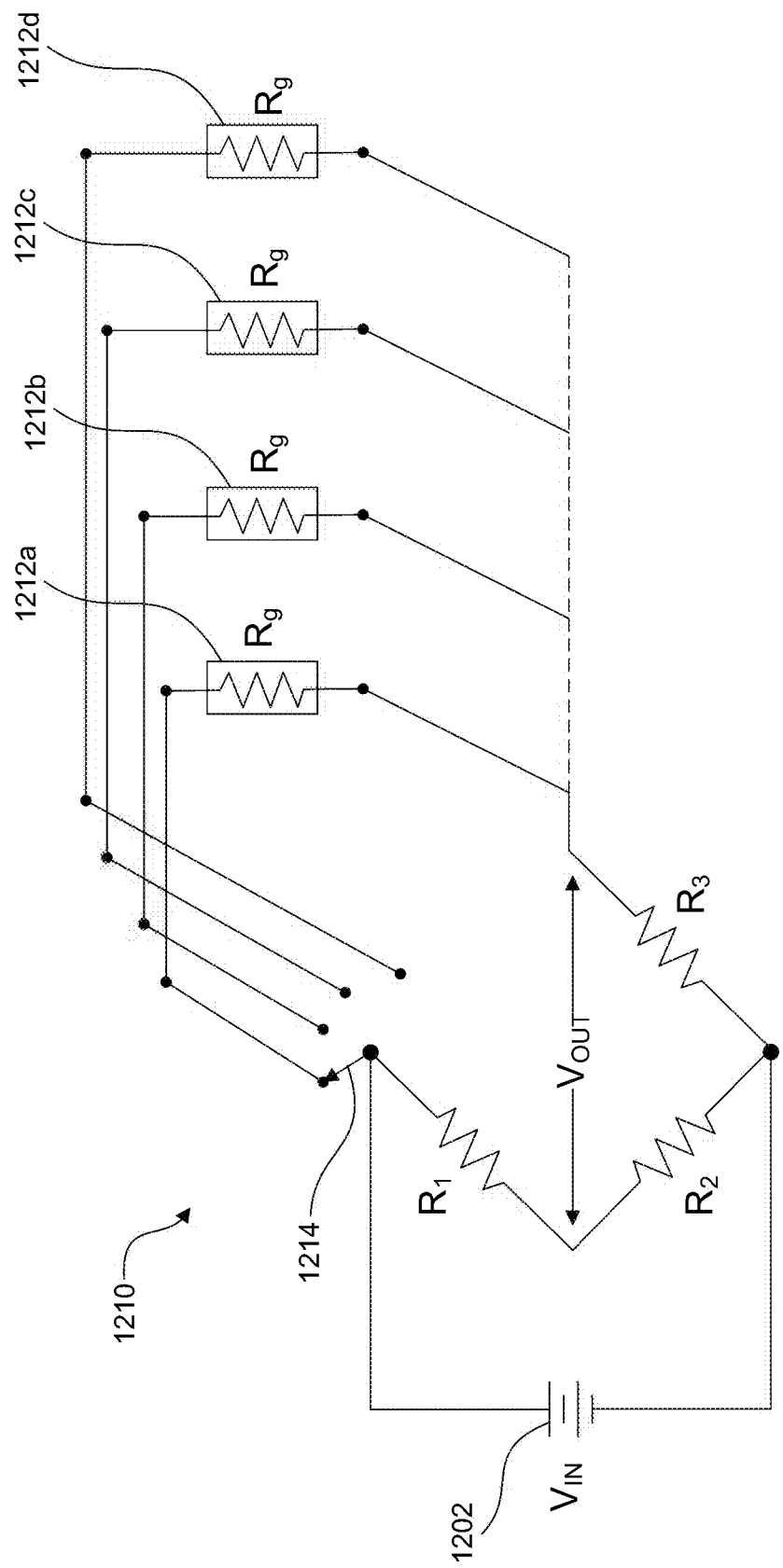
FIG. 12B illustrates a circuit that may be used with swelling/pressure sensors according to embodiments of the present invention.

FIG. 12B illustrates a circuit 1210 that may be used with swelling/pressure sensors according to embodiments of the present invention. Circuit 1210 is a Wheatstone bridge circuit with four variable resistances 1212a-d. In embodiments, each of the four variable resistances 1212 is a swelling/pressure sensor as described herein. A selection circuit of multiplexer circuit 1214 is used to select which variable resistor or sensor is used when the output voltage is measured or determined using battery module controller circuit boards 310a-b. In one embodiment, voltage source 1202 is a 12V voltage source, and each variable resistance 1212 is a 350 Ohm strain gauge that forms a part of a swelling/pressure sensor according to embodiments of the present invention. In another embodiment, each variable resistance 1212 is comprises two 350 Ohm strain gauges, connected in series, which form a part of a swelling/pressure sensor according to embodiments of the present invention. These two strain gauges are attached, for example, at locations 604a and 604c as shown in FIG. 6.

Figure 13:
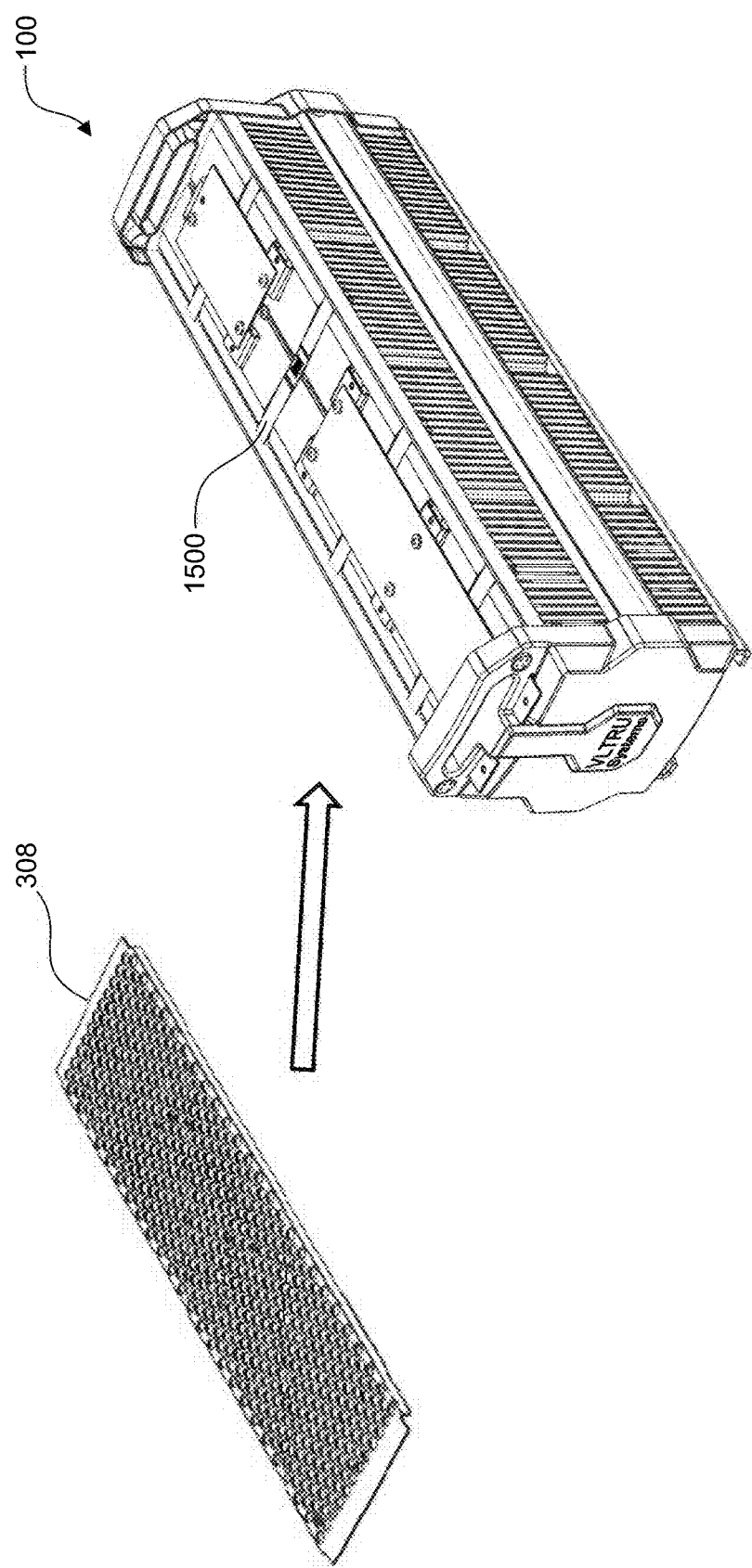
FIG. 13 illustrates an example battery module according to an embodiment of the present invention.

FIG. 13 illustrates an example battery module 100 according to an embodiment of the present invention with top 308 removed. As shown in FIG. 13, in this embodiment, battery module 100 has four swelling/pressure sensors 1500. Sensor 1500 is described in more detail below.

Figure 14:
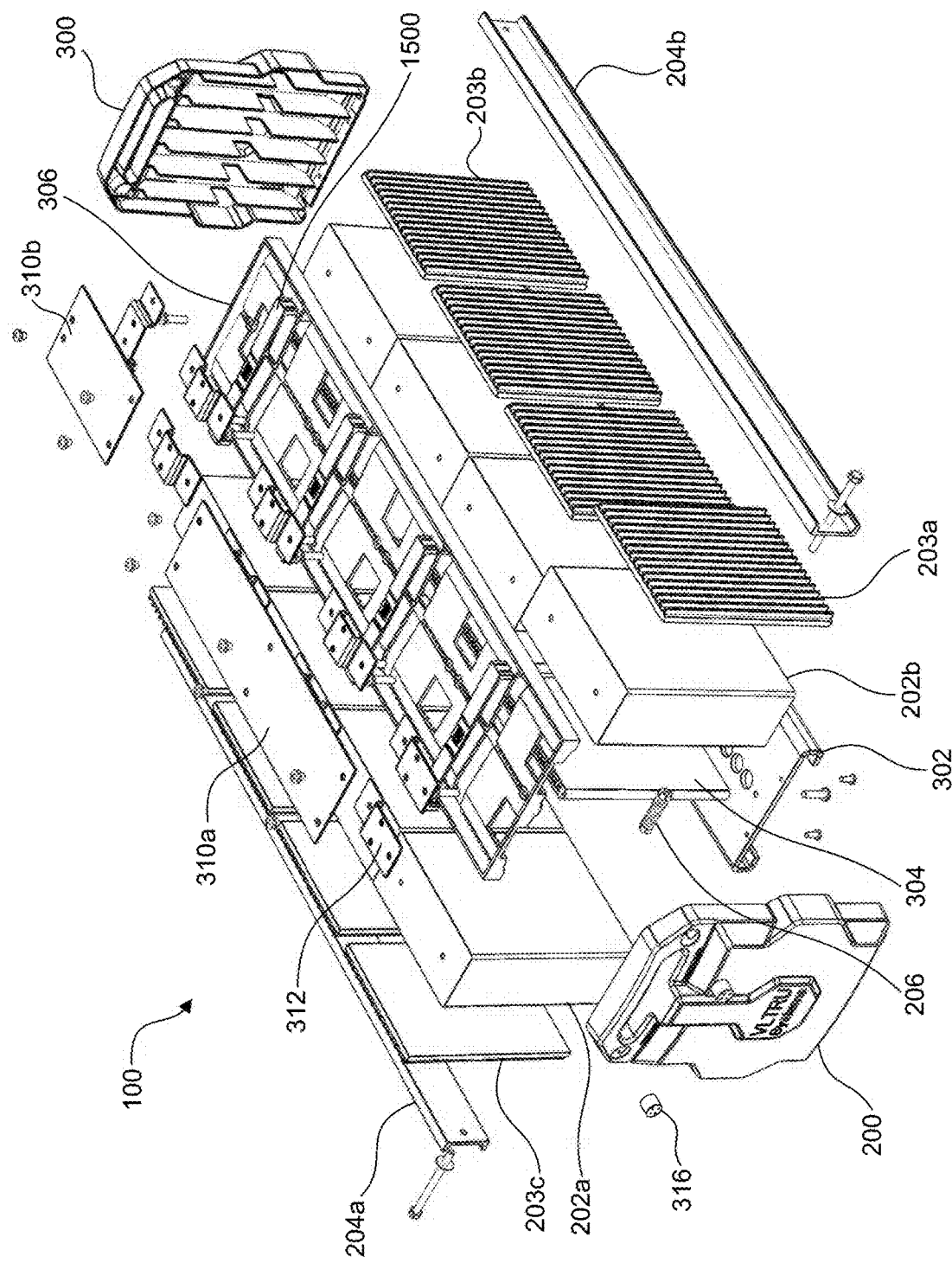
FIG. 14 illustrates an exploded view of the battery module in FIG. 13.

FIG. 14 illustrates an exploded view of the battery module 100 shown in FIG. 13. As shown in FIG. 14, battery module 100 includes front cover 200, a back cover 300, battery cells 202 (e.g., 202a, 202b), side plates 203 (e.g., 203a, 203b, 203c), side bars 204 (e.g., 204a, 204b), springs 206 (one at each end of battery module 100), a bottom plate 302, center plates 304, top tray 306, and a cover 308 (shown in FIG. 13). Also included in battery module 100 are battery module controller circuit boards 310a and 310b, busbars 312, and four sensors 1500.

In an embodiment, battery module 100 includes eight battery cells 202. Battery cells 202 are used for storing electrical energy. The eight battery cells 202 are connected in series using busbars 312. A predetermined amount of pressure is applied to battery cells 202 using side plates 203, center plates 304, springs 206, and side bars 204. Side plates 203 and center plates 304 also provide cooling for battery cells 202. Top tray 306 fits on top of battery cells 202 and provides several functions including providing a protective space for sensors 1500 and battery module controller circuit boards 310a and 310b. Other functions of top tray 306 are described below. A cover 308 (shown in FIG. 13) fits on top of top tray 306. Front cover 200 and back cover 300 are used, for example, to lift and carry battery module 100. Front cover 200 includes connectors 316 that allow for several battery modules 100 to be easily wired together to form larger battery systems. Battery module controller circuit boards, described in more detail below, provide battery management functions for battery module 100 such as, for example, monitoring the voltage, temperature, and pressure of battery cells 202.

Figure 15:
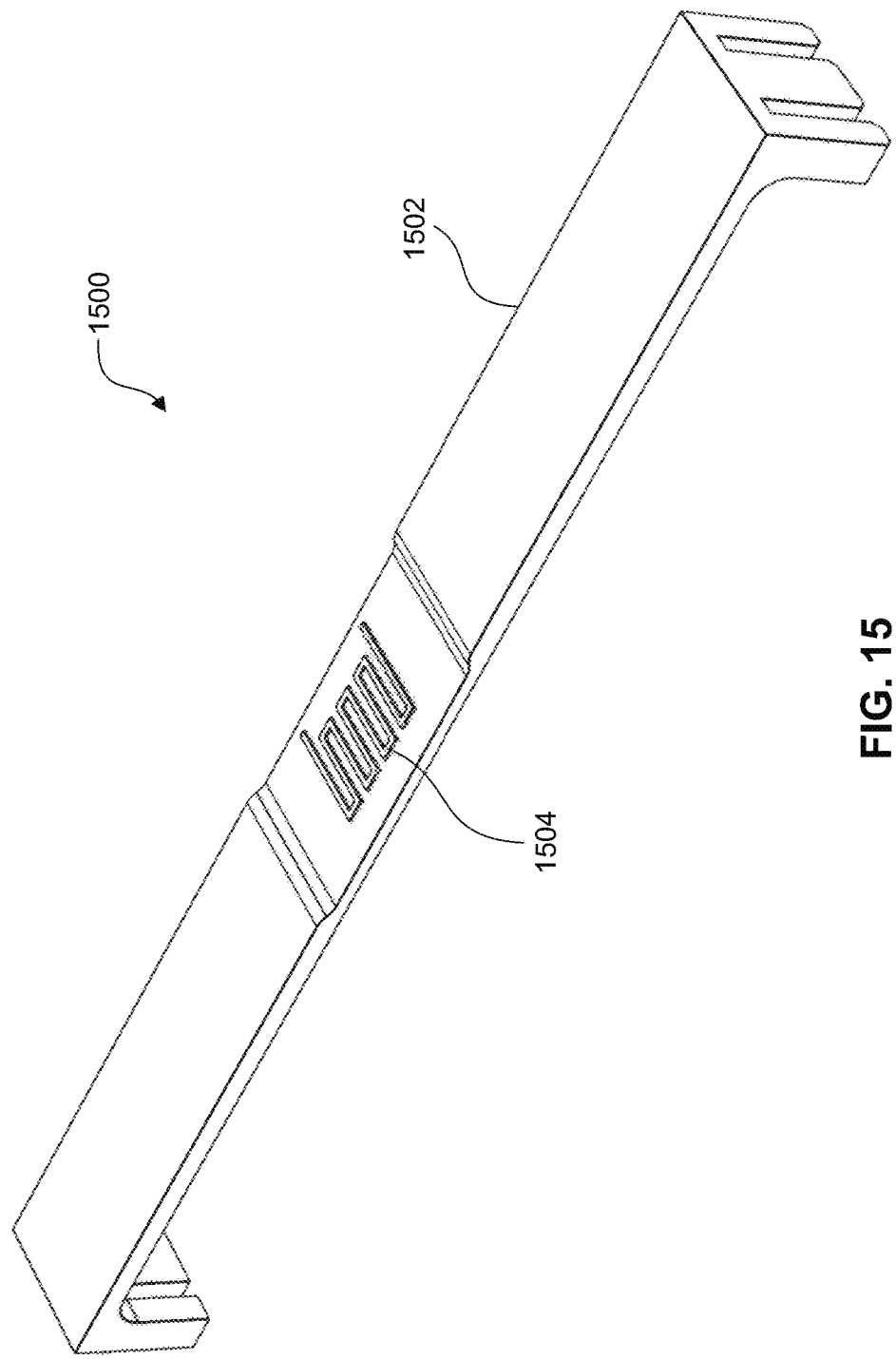
FIG. 15 illustrates an example swelling/pressure sensor for the battery module of FIG. 13.

FIG. 15 illustrates an example all plastic swelling/pressure sensor 1500 for the battery modules according to embodiments of the present invention. As shown in FIG. 15, sensor 1500 includes a plastic part 1502 and a strain gauge 1504 attached to part 1502. When a force is applied to the ends of part 1502, the strain gauge 1504 stretches or compresses, thereby changing the resistance of the strain gauge. This change in resistance can be detected, for example, using circuit 1210 described above. In other embodiments, swelling/pressure sensor 1500 can be made from any other suitable material.

Figure 16:
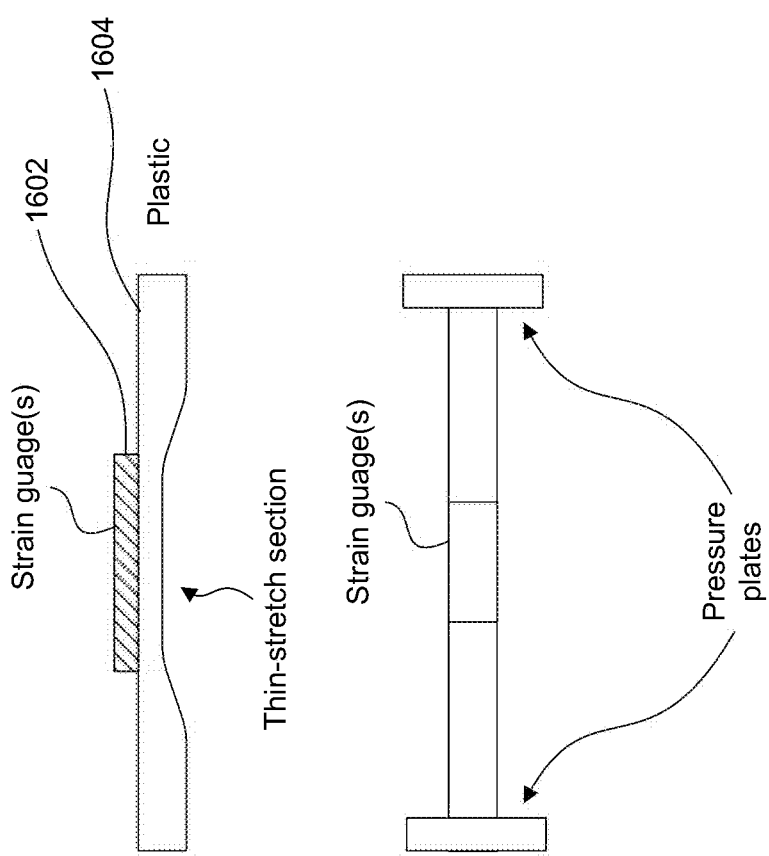
FIG. 16 illustrates an example swelling/pressure sensor for the battery module of FIG. 13.

FIG. 16 further illustrates how an example swelling/pressure sensor, like sensor 1500, can be made and used. As shown in FIG. 16, in embodiments, one or more strain gauges 1602 are attached to the top of a plastic part 1604. The strain gauges can be attached using an adhesive. A thin section can be formed in part 1604 directly under strain gauge(s) 1602 to facilitate, for example, expansion of this section when force is applied to the ends of part 1604. In embodiments, the ends of part 1604 are attached to the side plates or pressure plates of a battery module, such as the battery modules described herein.

Figure 17:
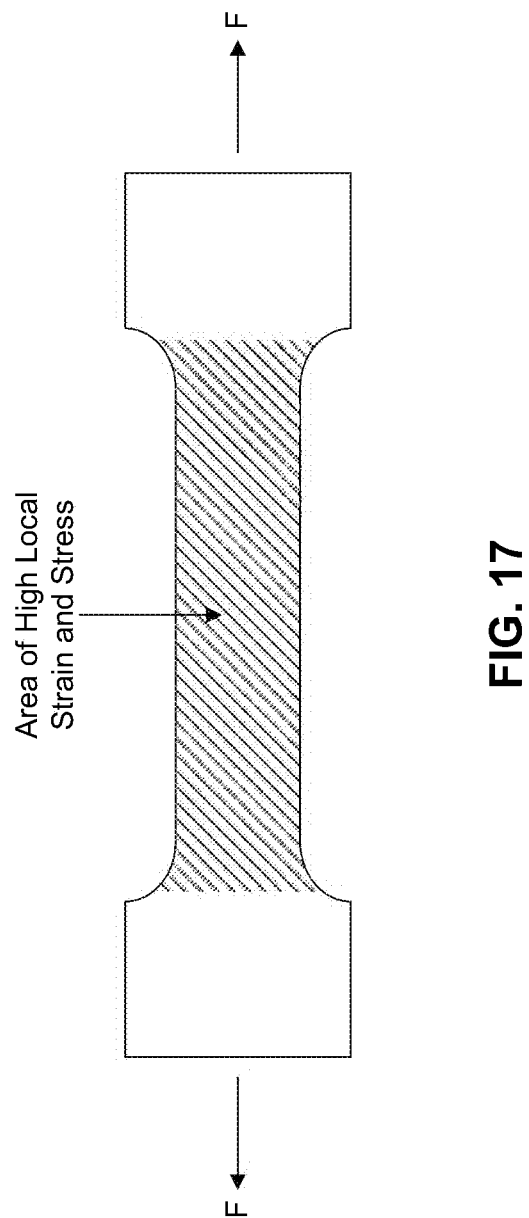
FIG. 17 illustrates an example swelling/pressure sensor for the battery module of FIG. 13.

FIG. 17 illustrates how an area of high local strain and stress is formed in part 1604 when a force is applied to the ends of part 1604.

Figure 18:
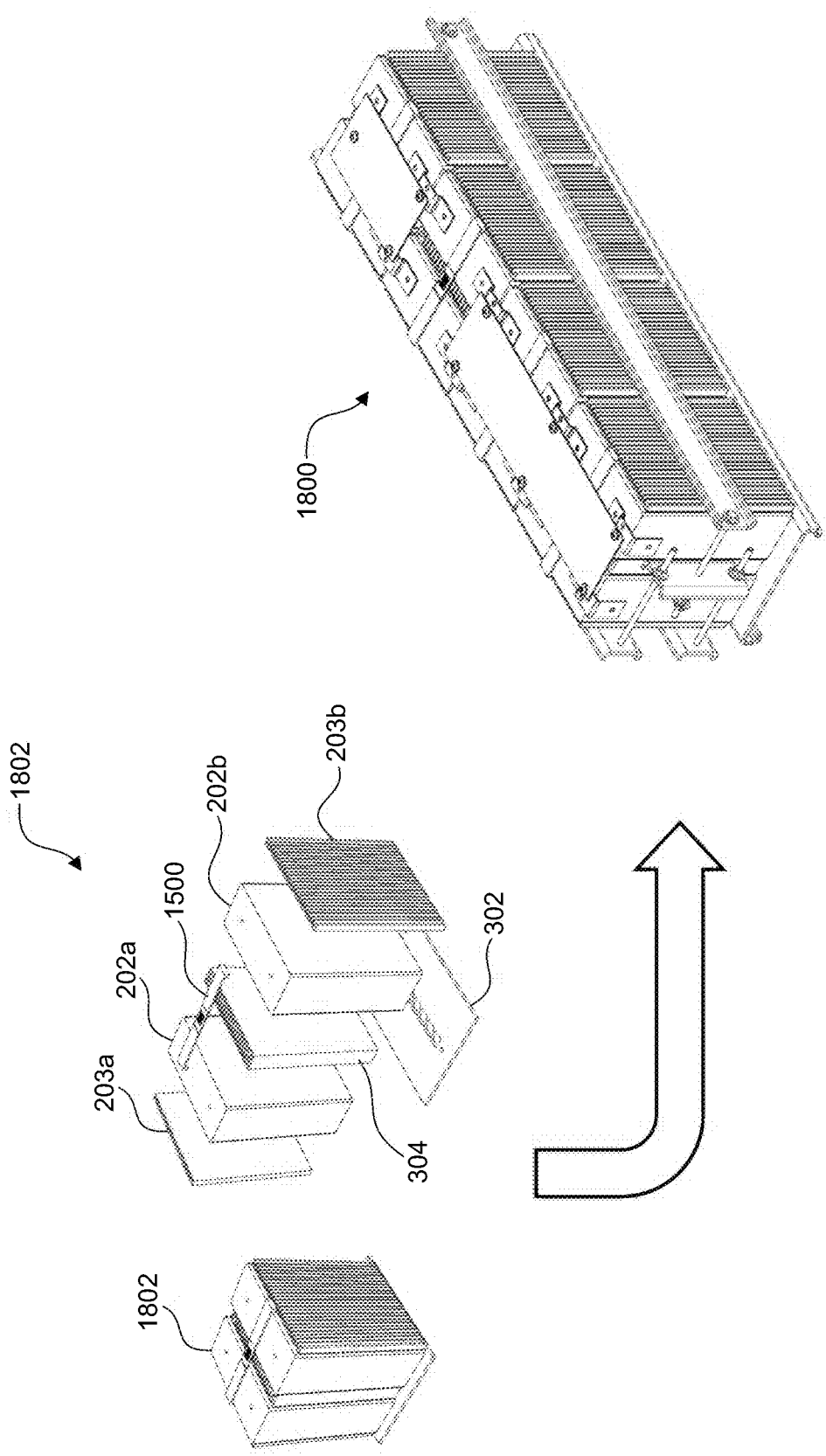
FIG. 18 illustrates an example battery module according to an embodiment of the present invention.

FIG. 18 illustrates an example battery module 1800 according to an embodiment of the present invention. As shown in FIG. 18, a battery module 1800 has four battery cell assemblies 1802. Each battery cell assembly 1802 has two battery cells 202a and 202b, a middle plate 304, and two side plates 203a and 203b, which may act as heat sinks. The middle plate 304 is coupled to a bottom plate 302 of battery module 1800. In an embodiment, the battery cells 202 are attached to the middle plate 304 and side plates 203, for example, by an adhesive or double-sided tape. Various commercially available adhesives and tapes can be used depending on the desired setting time, curing time, strength, and thermal conductivity.

In one embodiment, as shown in FIG. 18, each battery cell assembly 1800 has its own swelling/pressure sensor such as, for example, sensor 1500. Sensor 1500 is attached to the two side plates 203. When one or both of the battery cells 202 swell, the side plates 203 move, and this movement is detected/measured by the sensor 1500. In an embodiment, this sensor may be made from a plastic strip and have strain gauge(s) attached to the plastic strip as described above. The thickness of the plastic strip may be varied to allow more stretching of the plastic strip in the area where the stain gauge(s) are attached. In other embodiments, sensors other than 1500 are used as will be understood by persons skilled in the relevant art(s).

Figure 19:
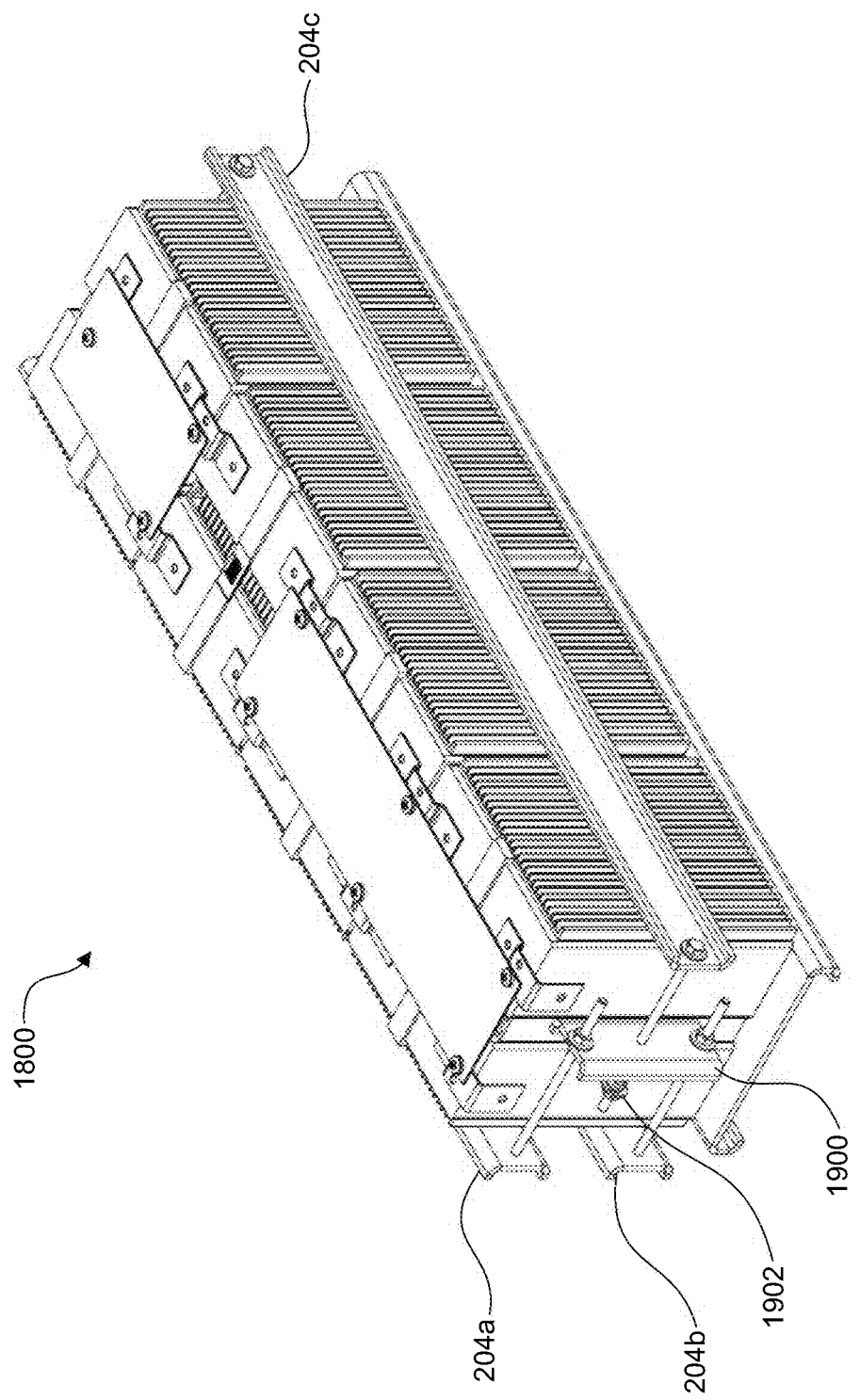
FIG. 19 illustrates an example battery module according to an embodiment of the present invention.

FIG. 19 further illustrates an example battery module 1800 according to an embodiment of the present invention. As shown in FIG. 19, battery module 1800 includes three side bars 204a-c, which are used to apply pressure to the battery cells. The three side bars 204 are connected together using a bar 1900 and bolts. A spring 1902 controls the amount of pressure applied by the side bars 204 to the battery cells.

Figure 20B:
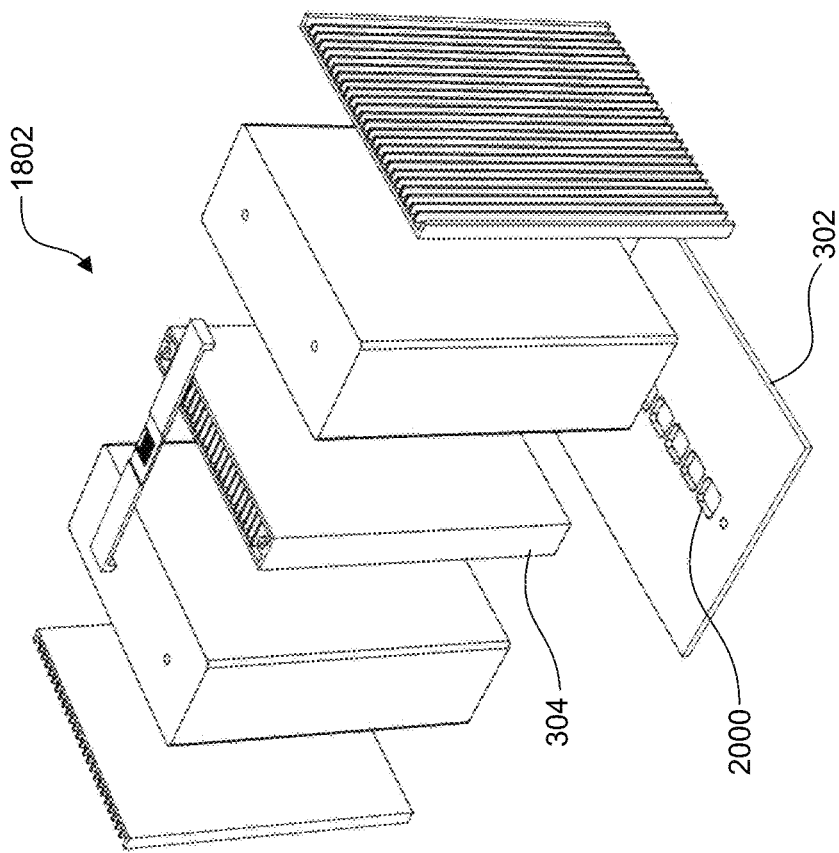
FIGS. 20A-B illustrate an example battery assembly according to an embodiment of the present invention.
Figure 20A:
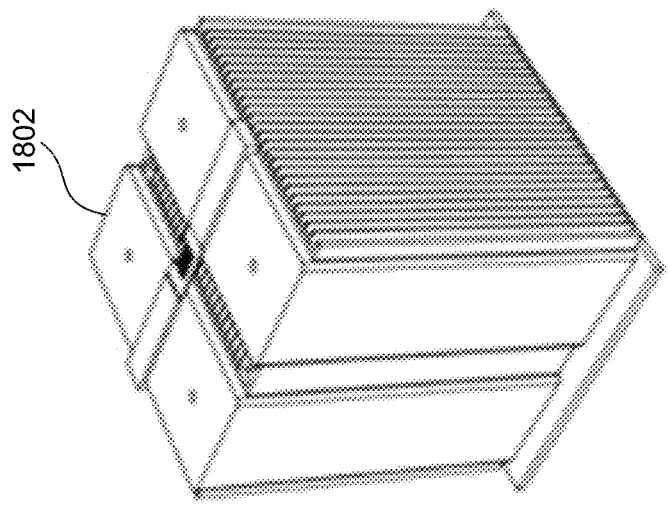

FIGS. 20A-B further illustrate an example battery assembly 1802 according to an embodiment of the present invention. As shown in FIG. 20B, in embodiments, bottom plate 302 has holes 2000 located where center plate 304 attaches to bottom plate 302. Holes 400 permit air and water to flow through center plate 304 without being blocked by bottom plate 302.

Figure 21:
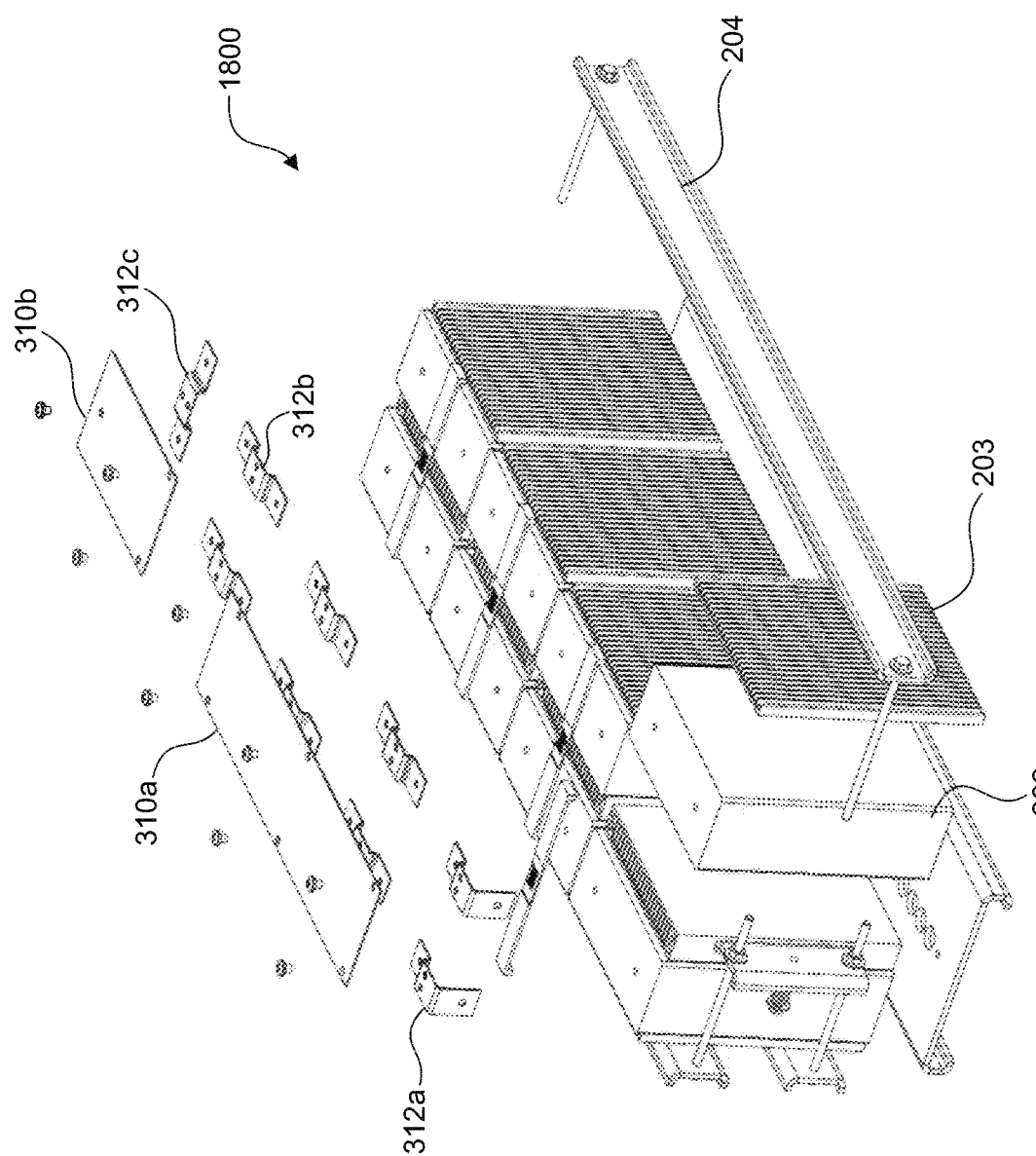
FIG. 21 illustrates an exploded view of the battery module in FIG. 19.

FIG. 21 illustrates an exploded view of battery module 1800. In FIG. 21, the various parts that form battery module 1800 can be seen more clearly than in some of the other figures. These parts include, for example, battery cells 202, side plates 203, side bars 204, battery module controller circuit boards 310a and 310b, and busbars 312.

Figure 22:
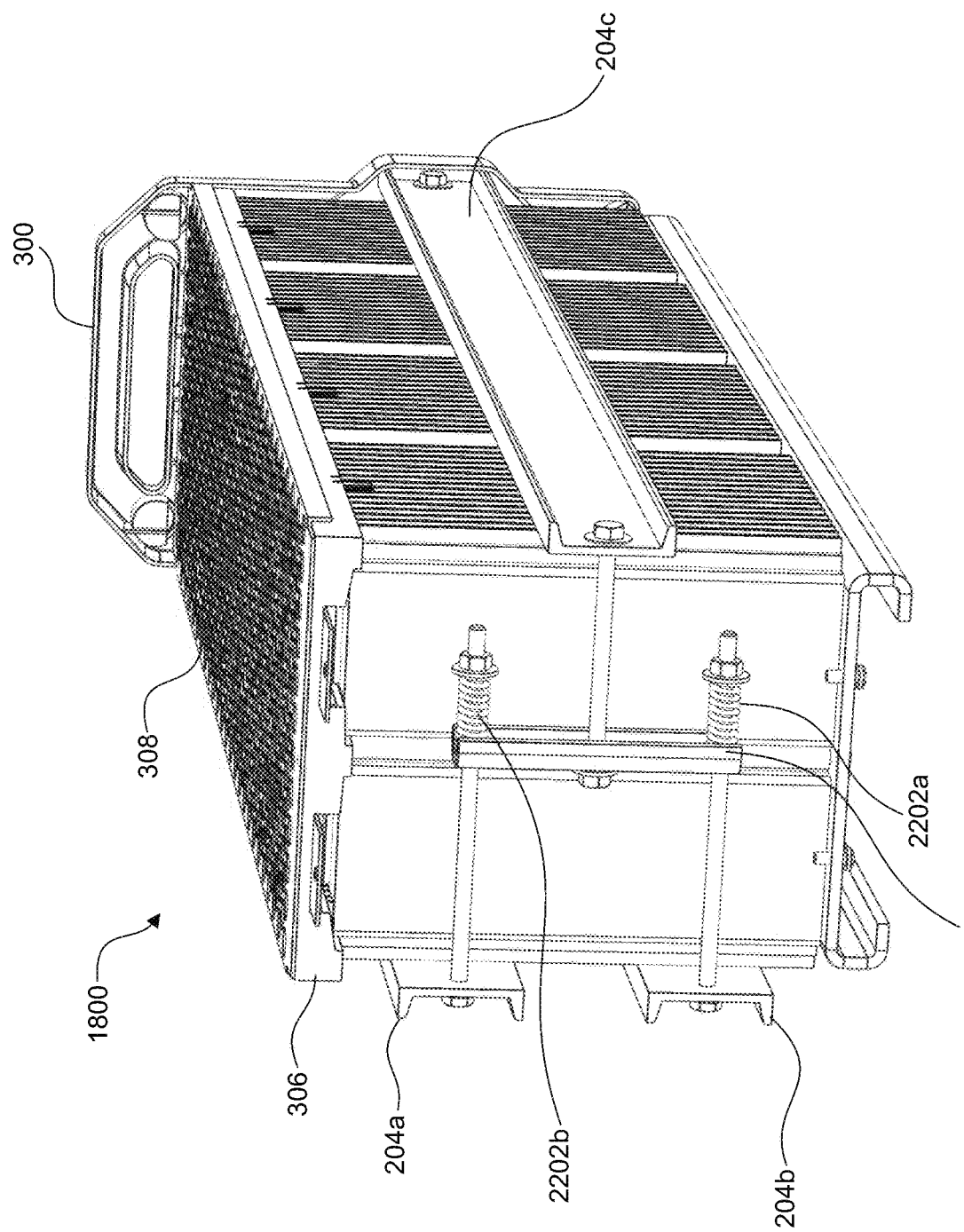
FIG. 22 illustrates an example battery module with the front cover removed according to an embodiment of the present invention.

FIG. 22 illustrates another embodiment of example battery module 1800 according to the present invention with the front cover removed. In this embodiment, side bars 204a-c are connected together using a bar 2200, two spring 2202a-b, and bolts. As shown in FIG. 22, in this embodiment, battery module 1800 includes a back cover 300, a top tray 306, and a cover 308.

Figure 23:
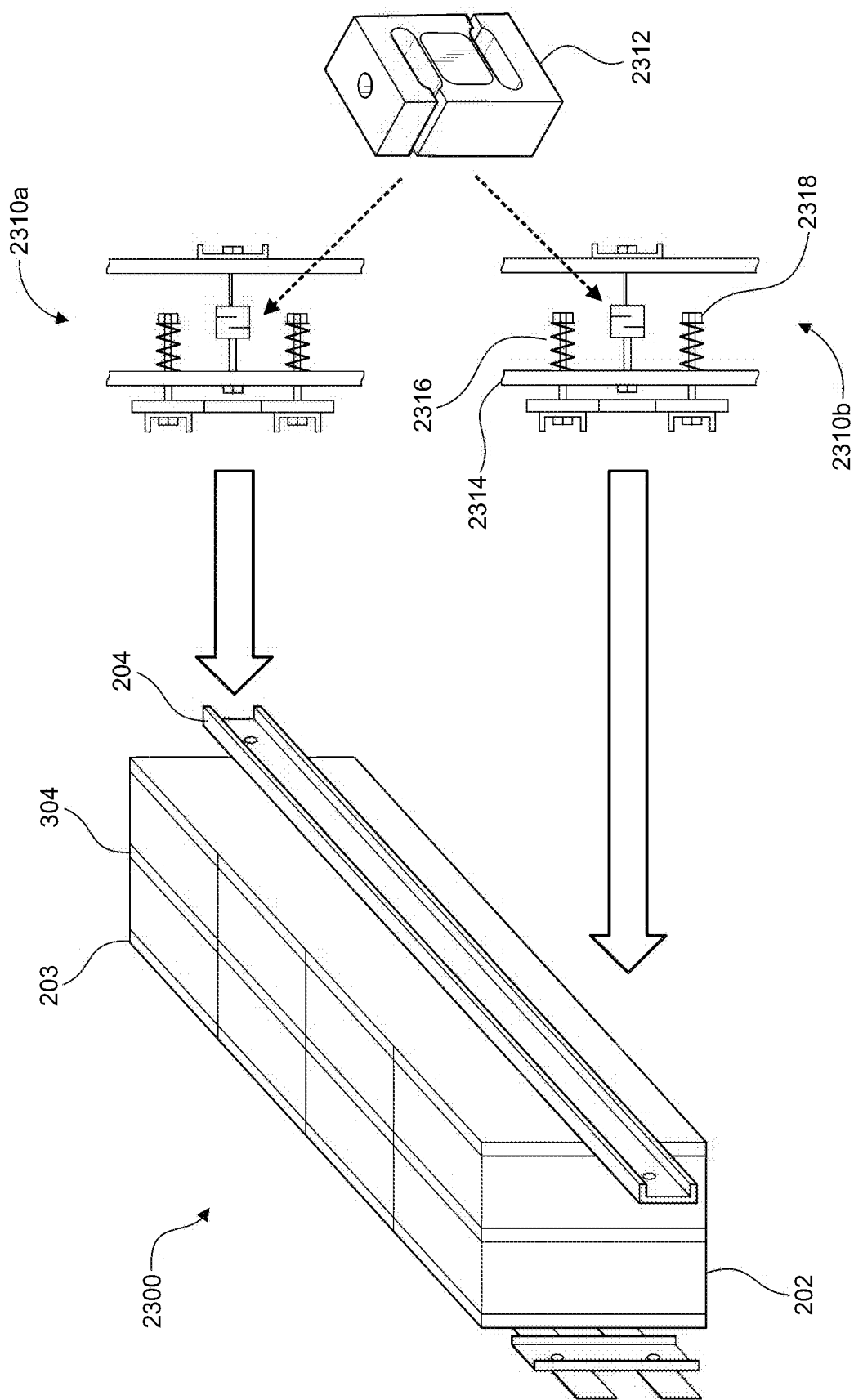
FIG. 23 illustrates an example battery module according to an embodiment of the present invention.

FIG. 23 illustrates an example battery module 2300 according to an embodiment of the present invention. As shown in FIG. 23, battery module 2300 includes battery cells 202, side plates 203, and center plates 304. Pressure is applied to the side plates 203/battery cells 202 using side bars 204 and two pressure assemblies 2310a-b. One pressure assembly 2310 is located at the two ends of battery module 2300 as indicated in FIG. 23.

As shown in FIG. 23, each pressure assembly 2310 includes a load cell 2312, a connecting bar 2314, springs 2316, and bolts 2318. The pressure applied to the side plates 203 and battery cells 202 is controlled by the springs 2316 and can be adjusted using bolts 2318. In operation, when one or more of the battery cells 202 swell, they cause a movement of side plates 203 which applies a force to the load cells 2312 that are attached to the side plates. This movement is then detected and quantified by battery module controller circuit boards 310a-b (see, for example, FIG. 26).

Figure 24B:
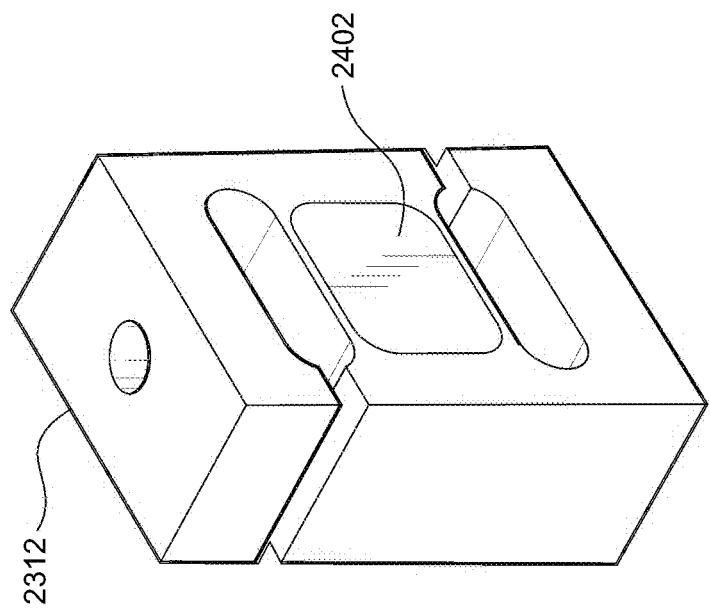
FIGS. 24A-B illustrate load cells/gauges that may be used in embodiments of the present invention.
Figure 24A:
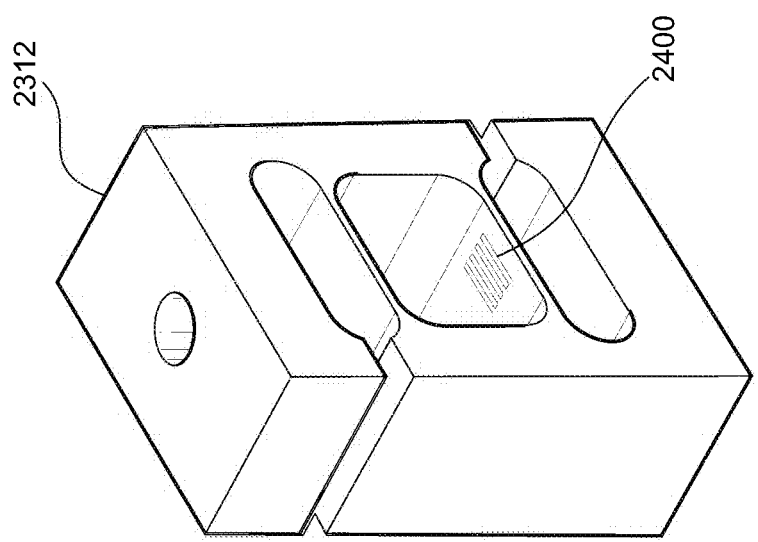

FIGS. 24A-B further illustrate load cells 2312 that may be used in embodiments of the present invention. As shown in FIG. 24A, load cells 2312 include one or more strain gauges 2400 located within the center hole of load cell 2312. After the one or more strain gauges are installed, the center hole is typically filled with an epoxy to protect the strain gauges and associated wires.

Figure 25:
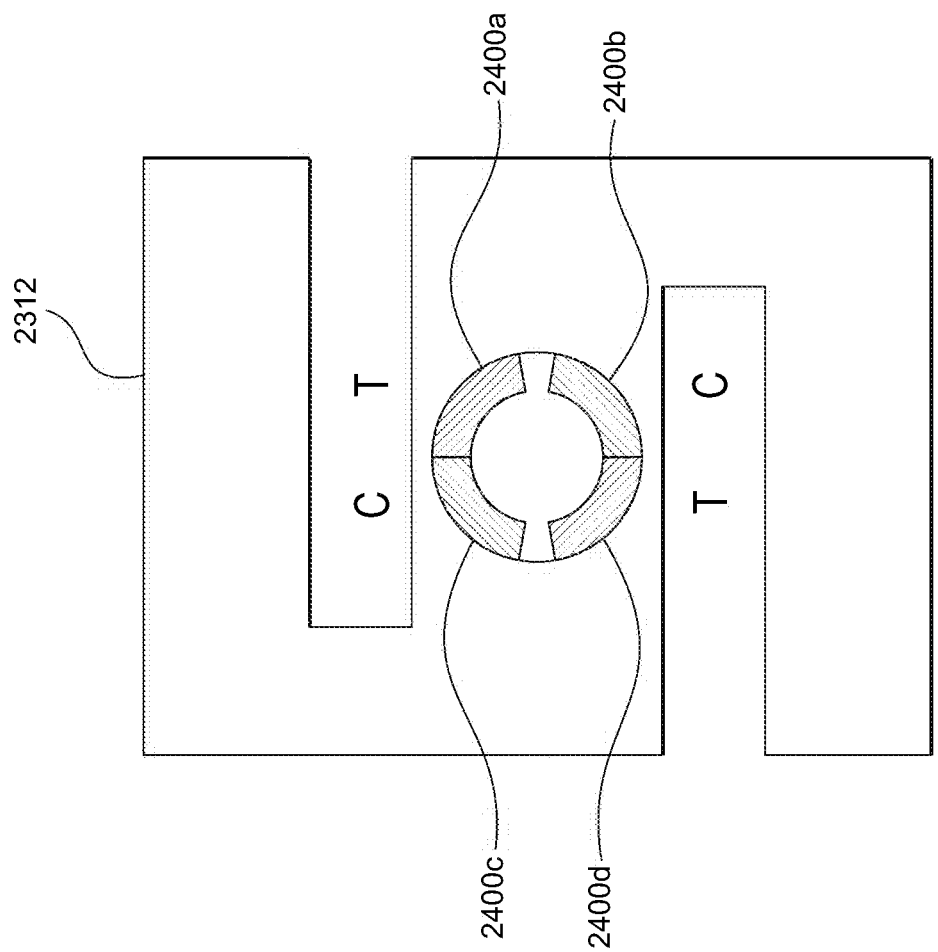
FIG. 25 illustrates a load cells/gauge that may be used in embodiments of the present invention.

FIG. 25 illustrates the operation of a load cell 2312 that may be used in embodiments of the present invention. As shown in FIG. 25, the strain gauges are located in one or more locations within the center hole of load cell 2312 to measure the compression and/or tension caused by applying a force to the ends of load cell 2312. In the embodiment shown in FIG. 25, four strain gauges 2400a-d are installed. This embodiment can be used, for example with the circuits shown below in FIG. 29 and FIG. 30.

Figure 26:
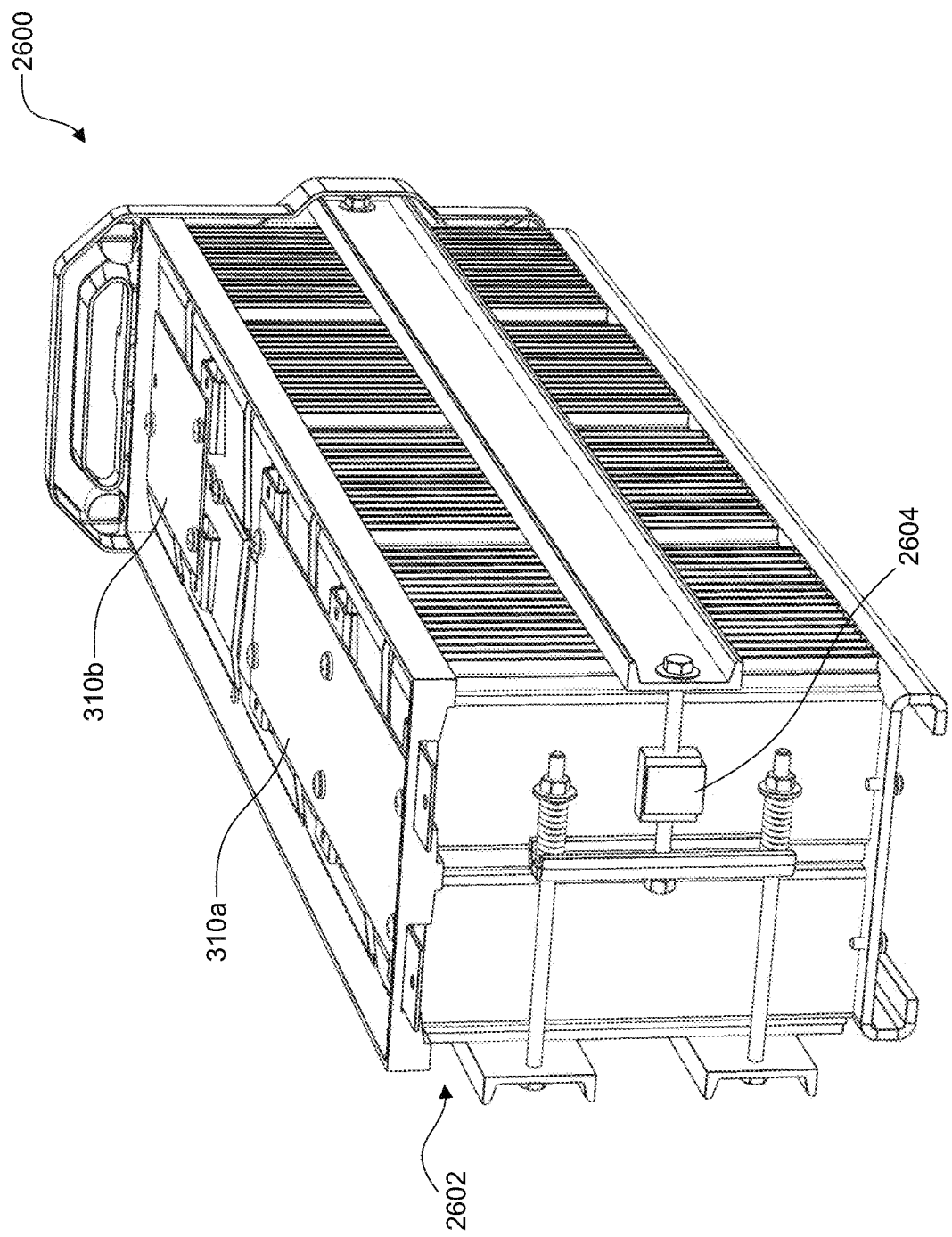
FIG. 26 illustrates an example battery module with the front cover and top cover removed according to an embodiment of the present invention.

FIG. 26 illustrates an example battery module 2600 with the front cover and top cover removed according to an embodiment of the present invention. As shown in FIG. 26, battery module 2600 includes a pressure assembly 2602, which includes a load cell 2604. The load cell 2604 is wired to one or both of the battery module controller circuit boards 310a-b. The output of the load cell 2604 is monitored and quantified using battery module controller circuit boards 310a-b.

Figure 27:
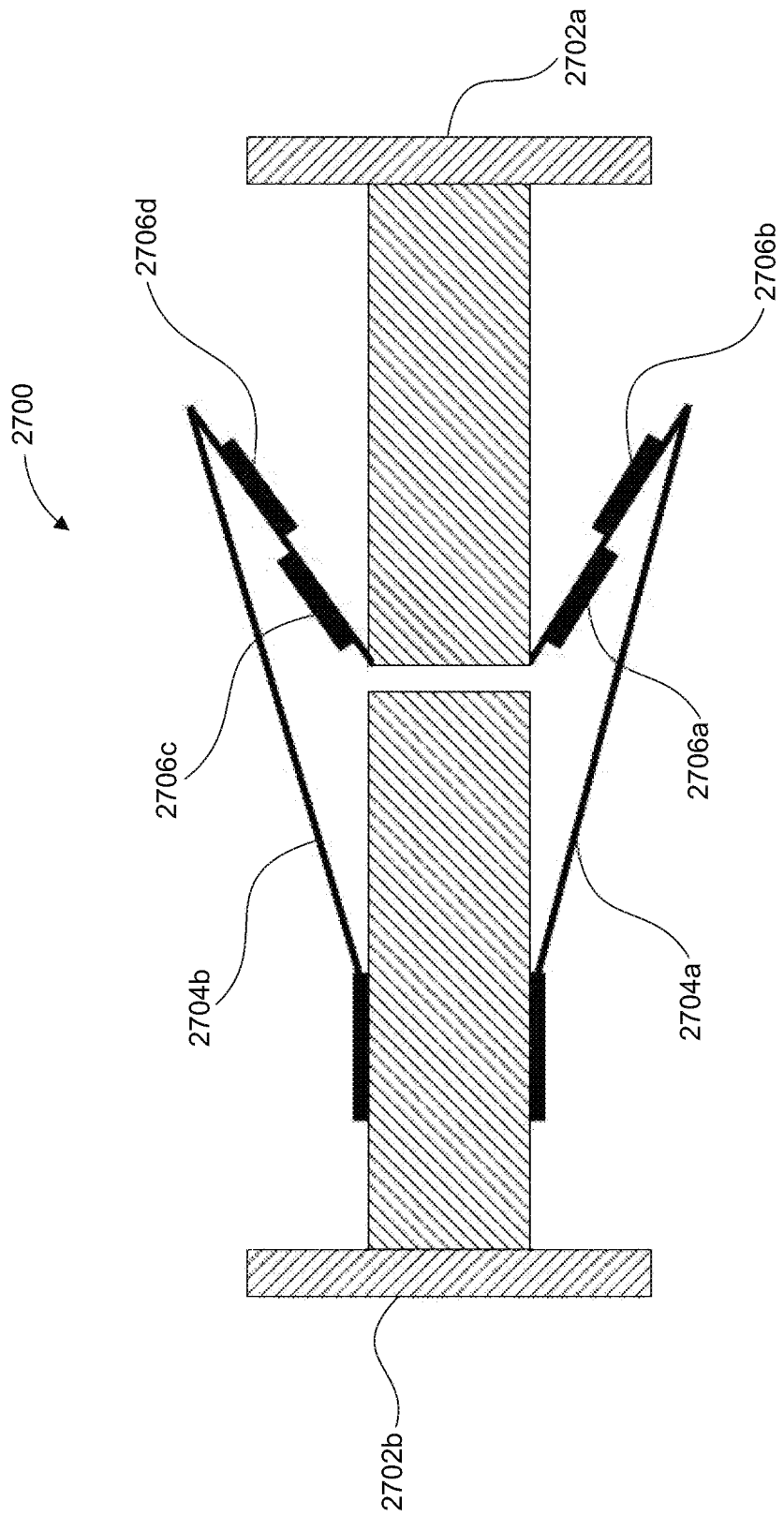
FIG. 27 illustrates an example swelling/pressure sensor that may be used according to embodiments of the present invention.
Figure 28:
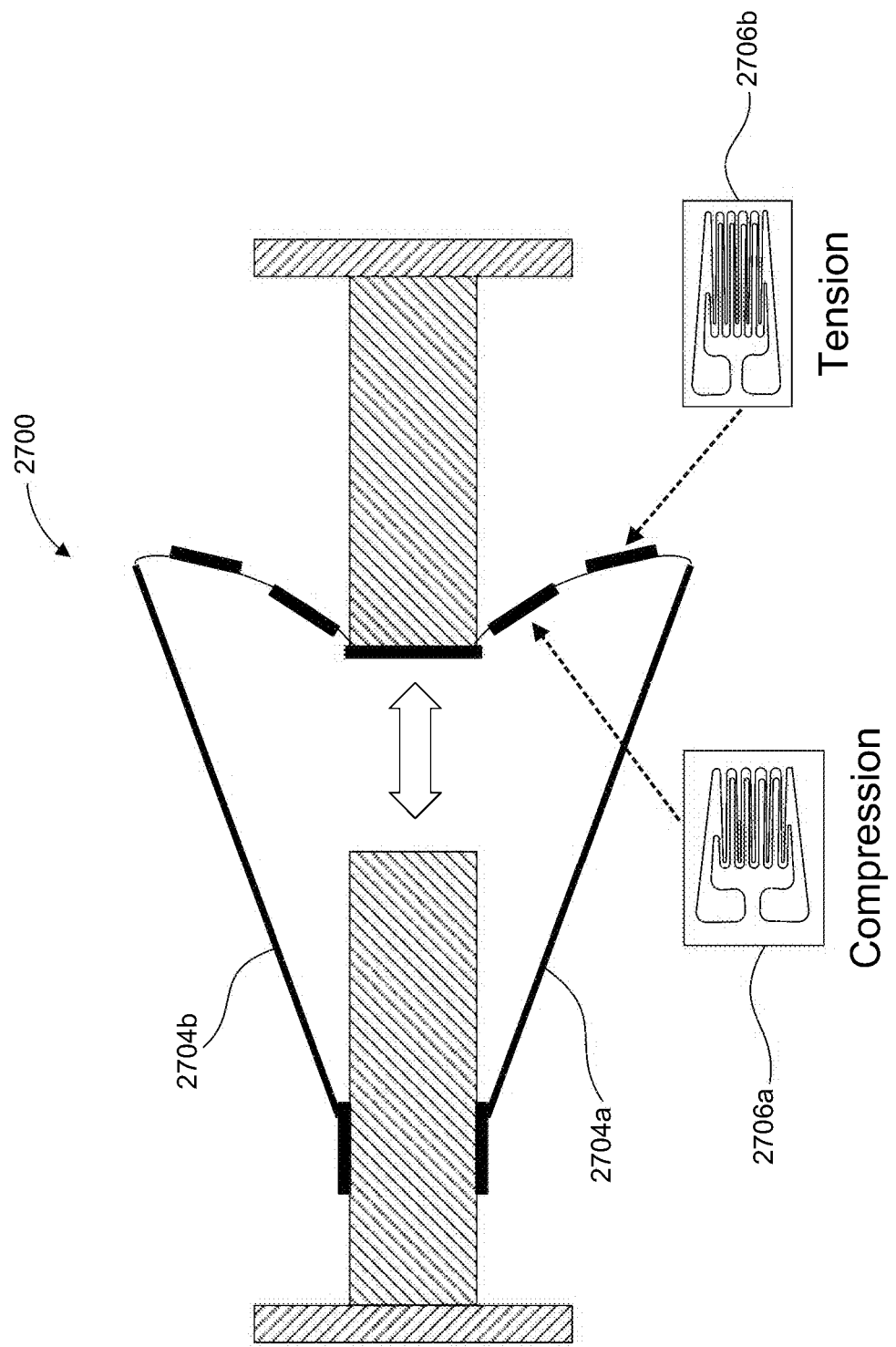
FIG. 28 is a diagram showing how movement of the sensor of FIG. 27 applies stresses to strain gauges.

FIGS. 27 and 28 illustrate an example swelling/pressure sensor 2700 that may be used according to embodiments of the present invention. As shown in FIG. 27, sensor 2700 includes two supports 2702a-b, two flexors 2704a-b (which may be metal or plastic of any other suitable material), and four strain gauges 2706a-d. The supports attached to the side plates of a battery module according to the present invention, and they cause flexors 2702 to flex when a force is applied to the supports 2702. This flexing is illustrated in FIG. 28.

As shown in FIG. 28, when a force is applied to sensor 2700 that causes flexors 2704a-b to flex, compression and tension forces are applied to the strain gauges such as strain gauges 2706a-b, as shown in FIG. 28.

Figure 29:
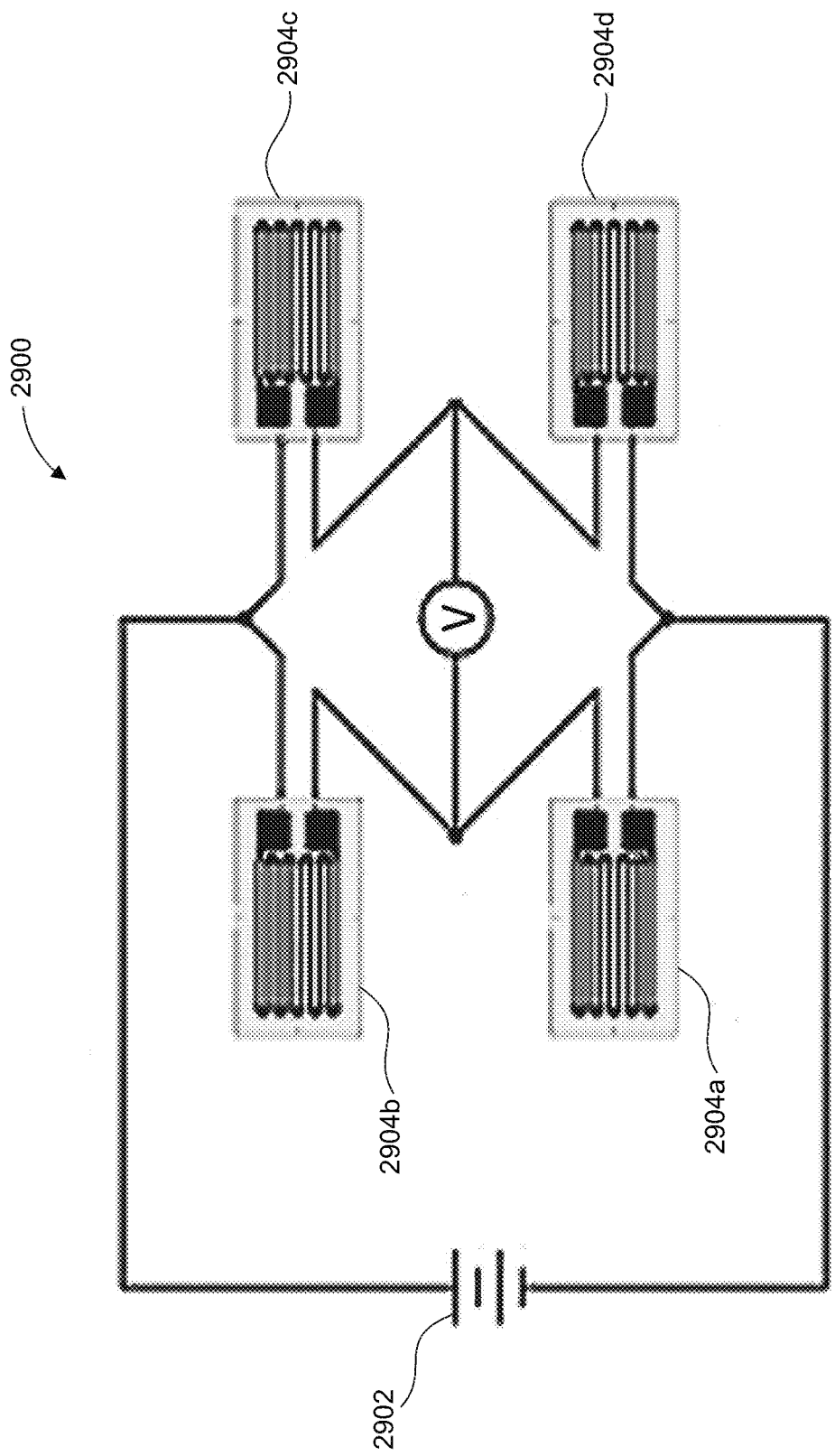
FIG. 29 is a diagram showing how to connect strain gauges of a sensor in a Wheatstone bridge configuration.

FIG. 29 is a diagram showing how to connect strain gauges of a sensor according to embodiments of the present invention in a Wheatstone bridge circuit 2900. As shown in FIG. 29, circuit 2900 includes a voltage source 2902 and four strain gauges 2902a-d. The Wheatstone bridge circuit 2900 compensates for adverse temperature effects of a sensor, as will be understood by persons skilled in the relevant art(s). In embodiments, the strain gauges can be attached to a load cell or flexors as described herein or directly to pressure plate(s) or to battery cell(s).

Figure 30:
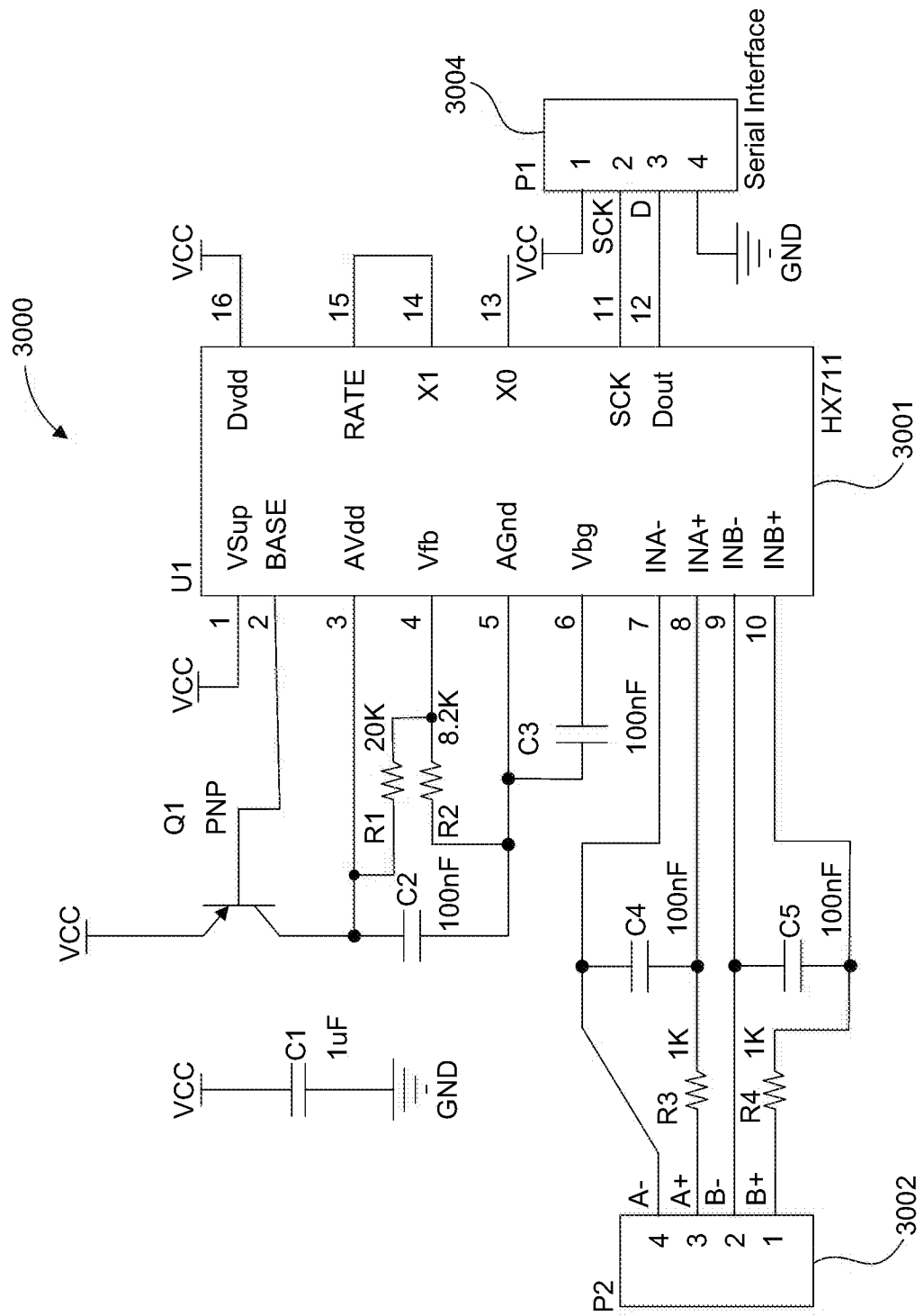
FIG. 30 is a diagram showing a circuit for converting the output of strain gauges to a serial digital signal.

FIG. 30 is a diagram showing a circuit 3000 for converting the output of strain gauges to a serial digital signal. Circuit 3001 uses a commercially available HX711 chip 3001. Sensors described herein are connected to connector 3002. The serial output of circuit 3000 is connected to battery module controller circuit boards 310a-b using circuit connector 3004. In operation, circuit 3000 provides an input voltage to the strain gauges of a sensor and monitors the output voltage of the strain gauges in a manner shown, for example, in FIG. 29. The monitored output voltage is converted to a digital signal by an analog-to-digital converter, and this digital signal is then serially communicated to another circuit such as a circuit included on battery module controller circuit boards 310a-b, which is further described below.

Figure 31:
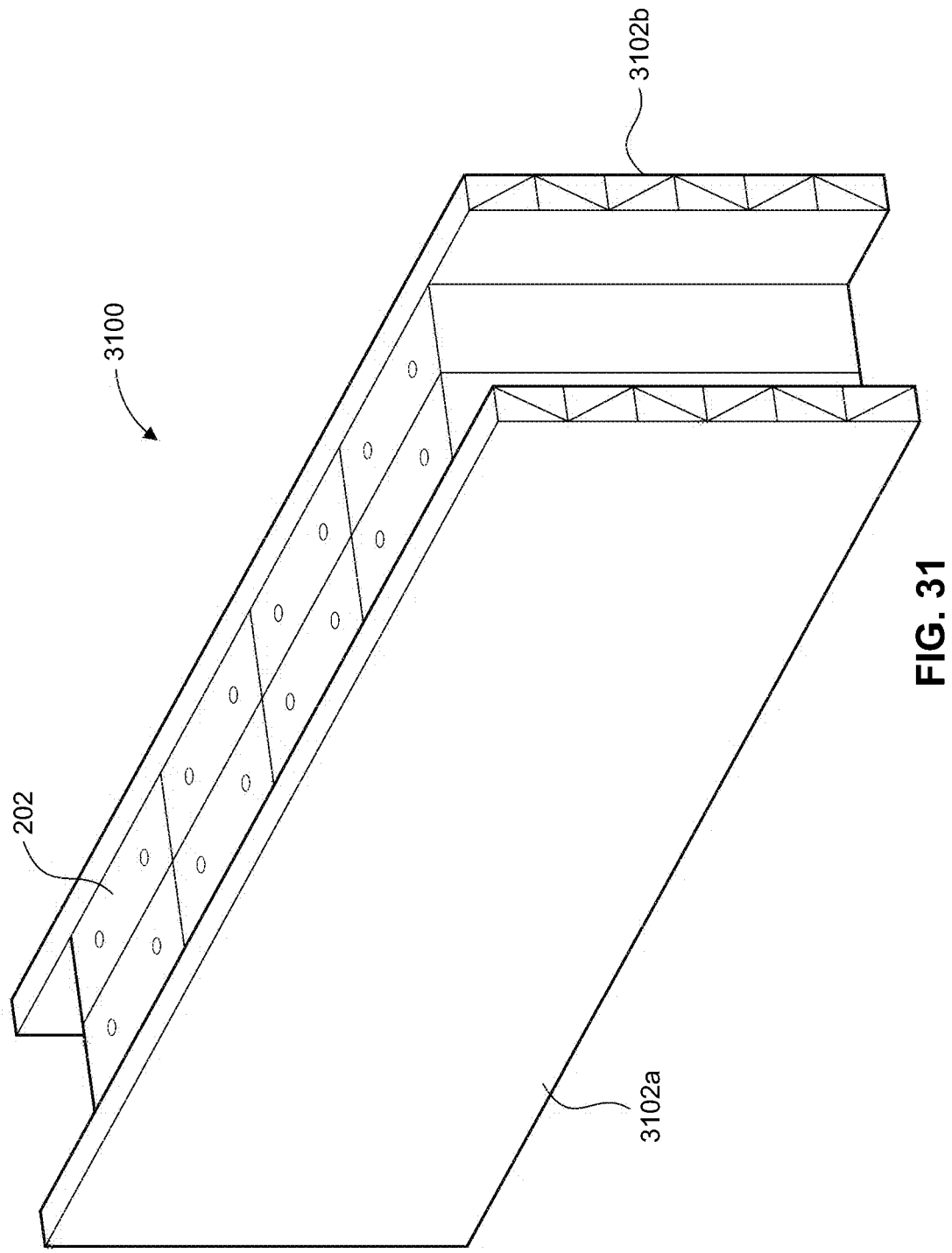
FIG. 31 illustrates a battery module having two pressure plates and eight battery cells.

FIG. 31 illustrates a battery module 3100 having two side plates 3102a-b and eight battery cells 202. The eight battery cells 202 are compressed by the two side plates 3102a-b. Pressure applied to side plates 3102a-b is transferred to the eight battery cells 202. As shown in FIG. 31, there is room at both ends of battery module 3100 to attached pressure assemblies according to embodiments of the present invention.

Figure 32:
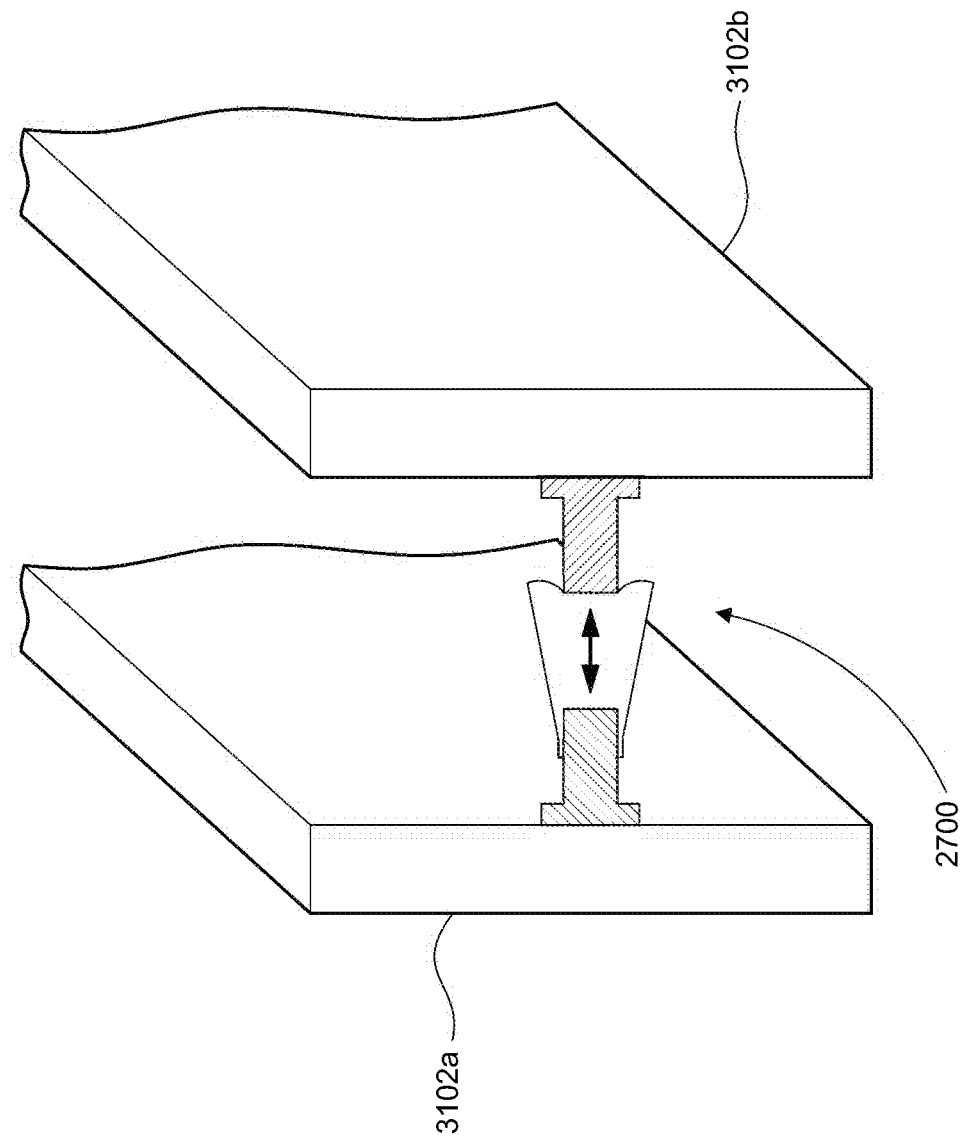
FIG. 32 illustrates a swelling/pressure sensor attached to pressure plates of a battery module.

FIG. 32 illustrates a swelling/pressure sensor 2700 attached to pressure plates 3102a-b of a battery module 3100 according to an embodiment of the present invention. Swelling of a battery cell within the battery module causes the pressure plates or side plates 3102a-b to move, and this movement is detected by the swelling/pressure sensor 2700.

Figure 33:
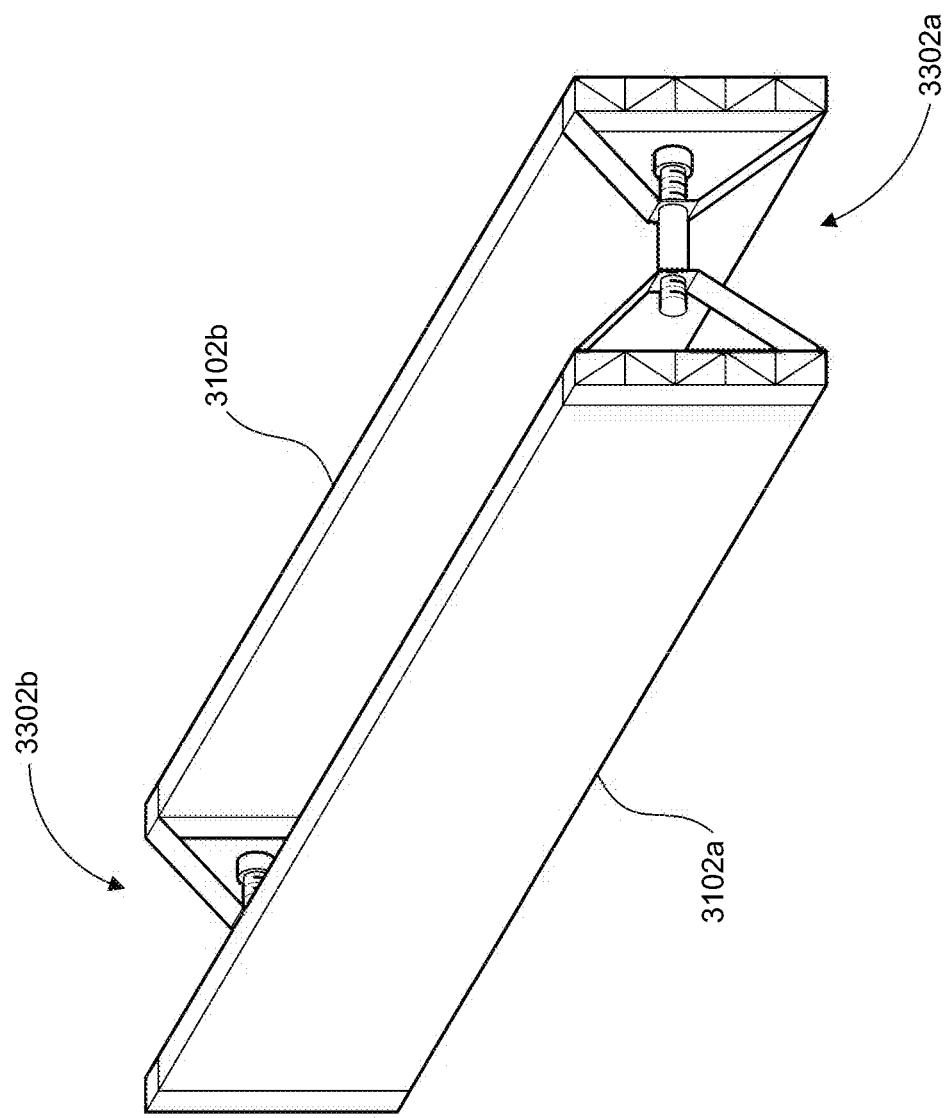
FIG. 33 illustrates two applied pressure assemblies attached to two pressure plates of a battery module.

FIG. 33 illustrates two applied pressure assemblies 3302a-b attached to two pressure plates 3102a-b of a battery module according to embodiments of the present invention. One applied pressure assembly 3302a is attached to the front of the battery module. A second applied pressure assembly 3302b is attached to the rear of the battery module. These two applied pressure assemblies 3202a-b include integrated sensors used to determine/measure the applied force and to detect changes in the force/movement of the pressure plates 3102a-b of the battery module.

Figure 34:
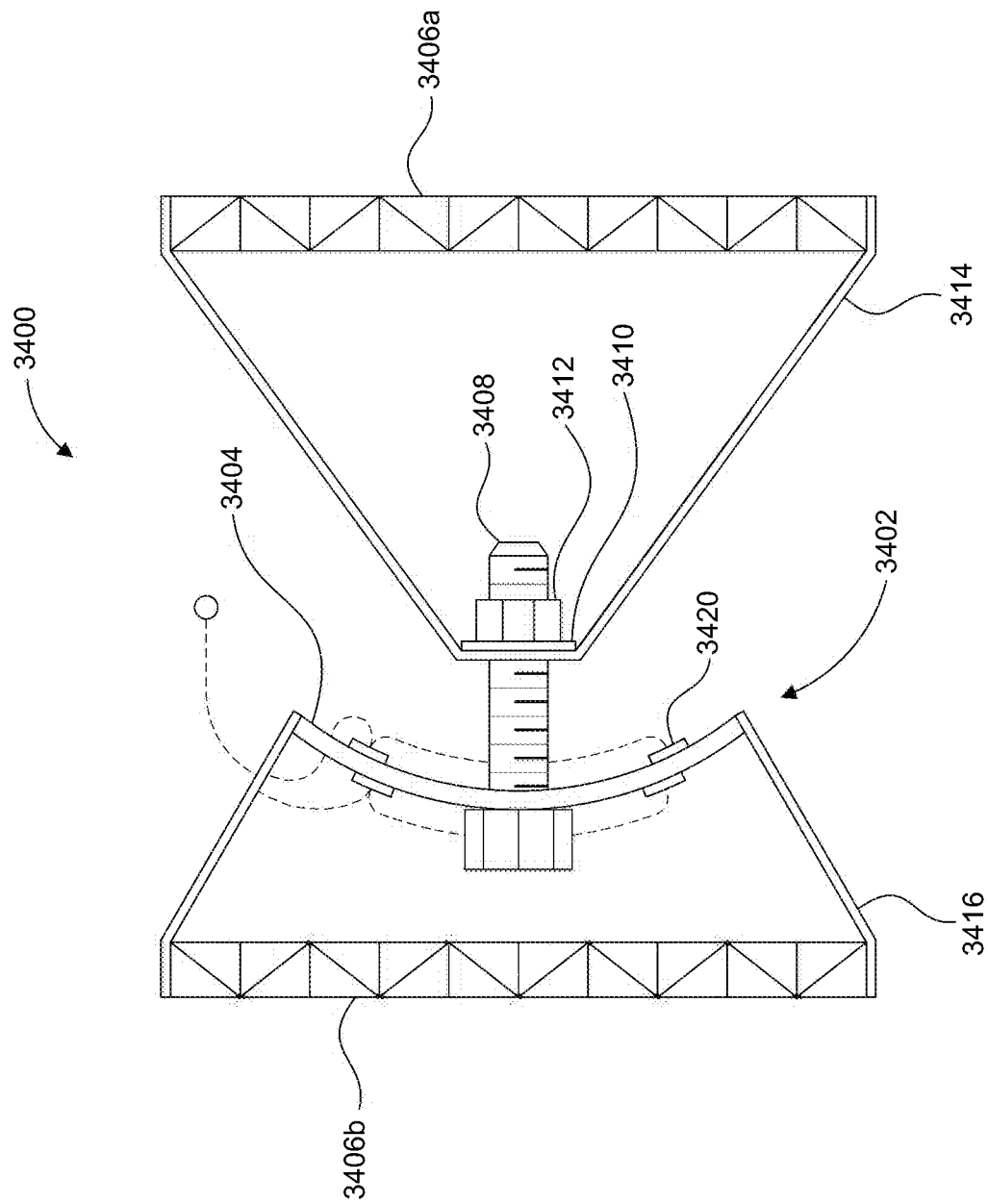
FIG. 34 illustrates an applied pressure assembly with integrated sensor that has a leaf spring.
Figure 35:
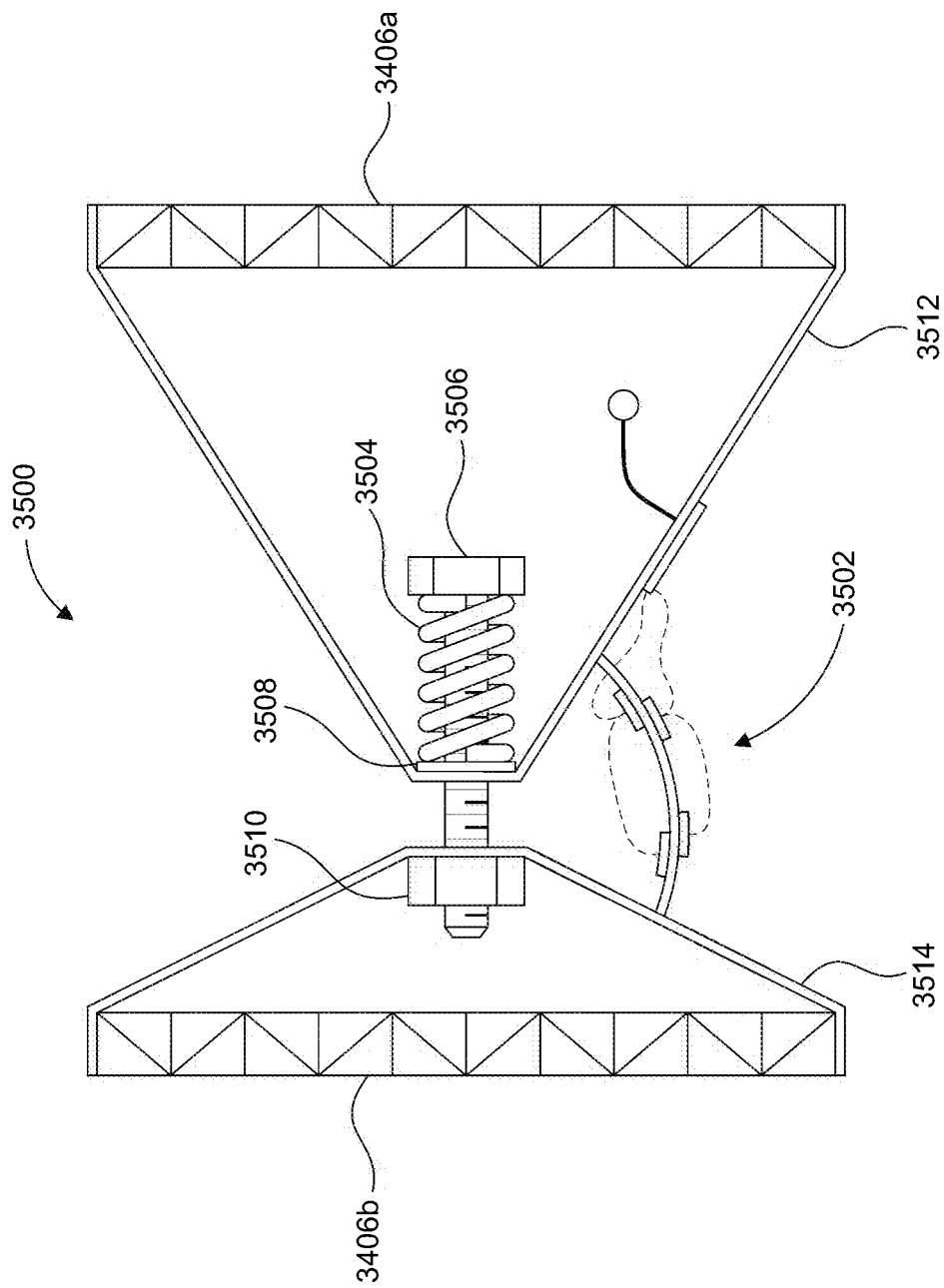
FIG. 35 illustrates an applied pressure assembly with integrated sensor that has a die spring.

FIGS. 34 and 35 are diagrams that depict two embodiments of an applied pressure assembly with integrated sensor for a battery module according to the present invention. FIG. 34 illustrates an applied pressure assembly 3400 with integrated sensor 3402 that has a leaf spring 3404. FIG. 35 illustrates an applied pressure assembly 3500 with integrated sensor 3502 that has a die spring 3504. The applied pressure assemblies are used to apply a predetermined amount of force to the battery cells that make up the battery module. The integrated sensors are used to determine/measure the applied force and to detect changes in the force/movement of the pressure plates 3406a-b of the battery module, for example, due to the swelling of a battery cell within the battery module.

FIG. 34 illustrates an applied pressure assembly 3400 with integrated sensor 3402 that has a leaf spring 3404. As shown in FIG. 34, the applied pressure assembly 3400 includes a leaf spring 3404, a bolt 3408, a washer 3410, and a nut 3412. One metal bracket 3416 attaches the leaf spring 3404 to a first pressure plate 3406b. A second metal bracket 3414 attaches a second pressure plate 3406a to the washer 3410/nut 3412. Force is applied to the two pressure plates 3404a-b by turning the nut 3412 and/or the bolt 3408. The bolt 3408 is in contact with the leaf spring 3404. The force applied is determined by the leaf spring 3404 and transferred to the pressure plates 3406a-b by the two metal brackets 3414 and 3416. When the desired force is applied, the nut 3412 can be tack welded, for example, to the bolt 3408 to ensure that the bolt 3408 does not loosen over time.

In an embodiment, strain gauges 3420 are attached to the leaf spring 3404 as illustrated in FIG. 34. In an embodiment, four strain gauges 3420 are used. These strain gauges 3420 are connected in a Wheatstone bridge configuration. The strain gauges 3420 are wired to an electronic circuit that converts the output of the strain gauges 3420 to a digital signal as described herein.

FIG. 35 illustrates applied pressure assembly 3500 with integrated sensor 3502 that has a die spring 3504. As shown in FIG. 35, the applied pressure assembly 3500 includes a die spring 3504, a bolt 3506, a washer 3508, and a nut 3510. One metal bracket 3512 attaches the washer 3508 to a first pressure plate 3406a. A second metal bracket 3514 attaches a second pressure plate 3406b to the nut 3510. Force is applied to the two pressure plates 3406a-b, for example, by turning the bolt 3506, which is in contact with the die spring 3504. The applied force is determined by the die spring 3504 and transferred to the pressure plates 3406*a-b* by the two metal brackets 3512 and 3514. When the desired force is applied, the nut 3510 can be tack welded to the bolt 3506 to ensure that the bolt 3506 does not loosen over time. The nut 3510 can also be tack welded to the second metal bracket 3514 so that it does not rotate when turning the bolt 3506.

Figure 36:
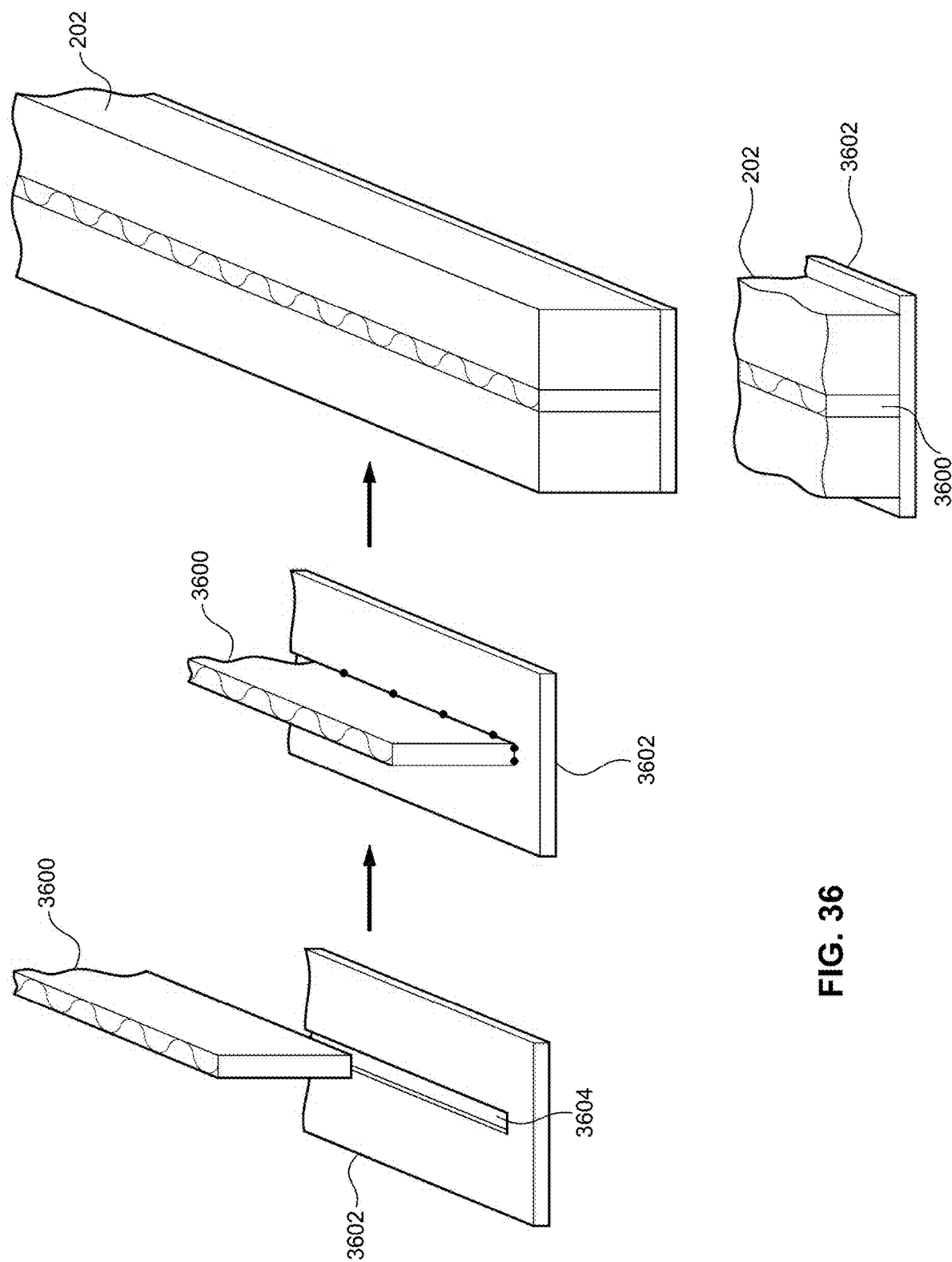
FIG. 36 illustrates features of an example center plate and bottom plate for a battery module according to an embodiment of the present invention.

FIG. 36 illustrates features of an example center plate 3600 and bottom plate 3602 for a battery module according to an embodiment of the present invention. As shown in FIG. 36, bottom plate 3602 has one or more holes 3604 to allow air and/or water to flow through center plate 3600 as described herein. In embodiments, center plate 3600 is welded to bottom plate 3602. Battery cells 202 are then attached to center plate 3600, for example using a thermally conductive adhesive or tape.

Figure 37:
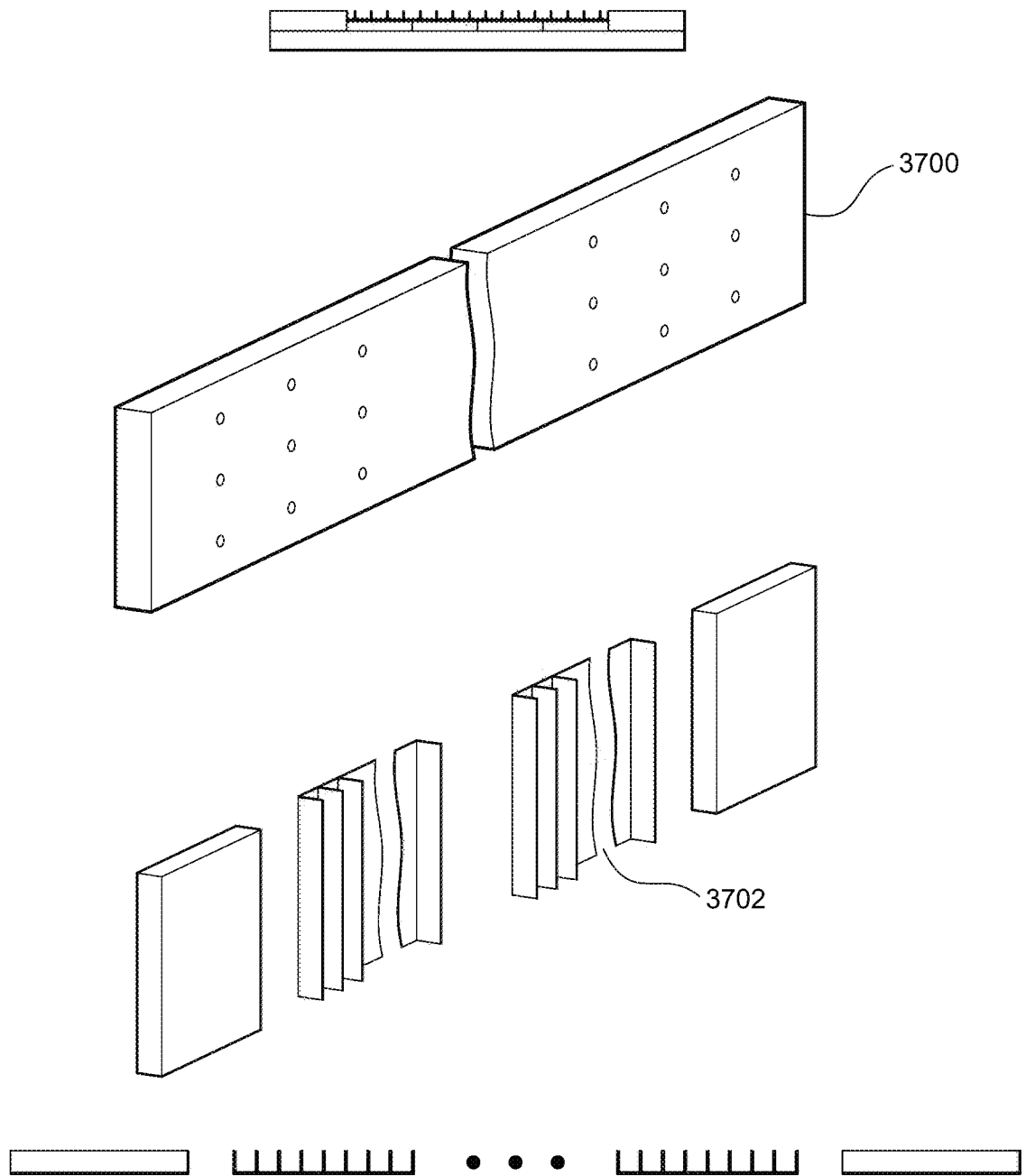
FIG. 37 illustrates a battery module side plate according to an embodiment of the present invention.

FIG. 37 illustrates a battery module side plate 3700 according to an embodiment of the present invention. Side plate 3700 has heat sinks 3702 attached to it, as shown in FIG. 37, to facilitate cooling. In embodiments, the heat sinks 3702 are attached, for example, by welding or screws.

Figure 38:
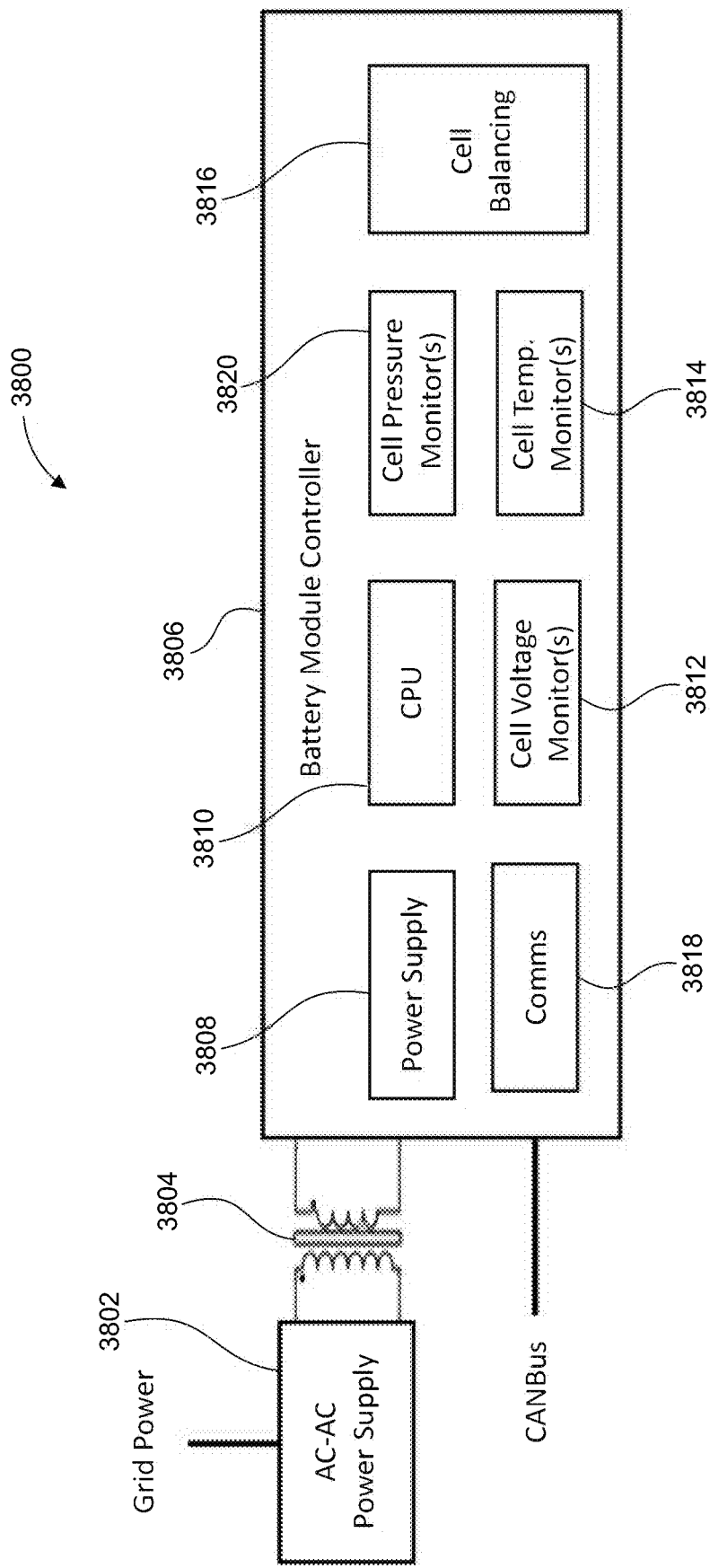
FIG. 38 illustrates an example battery module controller according to an embodiment of the present invention.

FIG. 38 illustrates an example battery module controller 3800 according to an embodiment of the present invention. Battery module controller 3800 include an AC-to-AC power supply 3802, and isolation transformer 3804, and a battery module controller circuit board 3806 that attaches to the top of a battery module as described herein. The battery module controller circuit board 3806 includes a power supply 3808, a CPU 3810, voltage sensors 3812, temperature sensors 3814, a cell balancing circuit 3816, and communication circuit(s) 3818. It also includes cell pressure monitors 3820 that interfaces with the swelling/pressor sensors described herein that are a feature of battery modules according to the present invention.

In operation, AC-AC Power supply 3802 draws power from a power grid and converts this power to a higher frequency AC power. The higher frequency AC power output by power supply 3802 is supplied to the power supply 3808 on the battery module controller circuit board 3806 and to cell balancing circuit 3816. Power supply 3808 produces DC power required to operate the various components of battery module controller circuit board 3806. CPU 3810 runs the firmware and software that controls the operation and functions of battery module controller circuit board 3806. These functions include monitoring the voltage, temperature and pressure of the battery cells that make up the battery module controlled by battery module controller 3800. The functions also include balancing the battery cells of the battery module and communicating data about the battery module and battery cells to a higher-level controller such as, for example, a battery rack controller as described below. Cell voltage monitor(s) 3812, cell temperature monitor(s) 3814, and cell pressure monitor(s) 3820 are the hardware sensors and circuits needed to monitor the battery cell voltages, temperatures, and pressures. Cell balancing circuit 3816 is the hardware needed to provide balancing current/power to the individual battery cells of the battery module controlled by battery module controller 3800. More details regarding these functions and the associated hardware are provided below.

Figure 39:
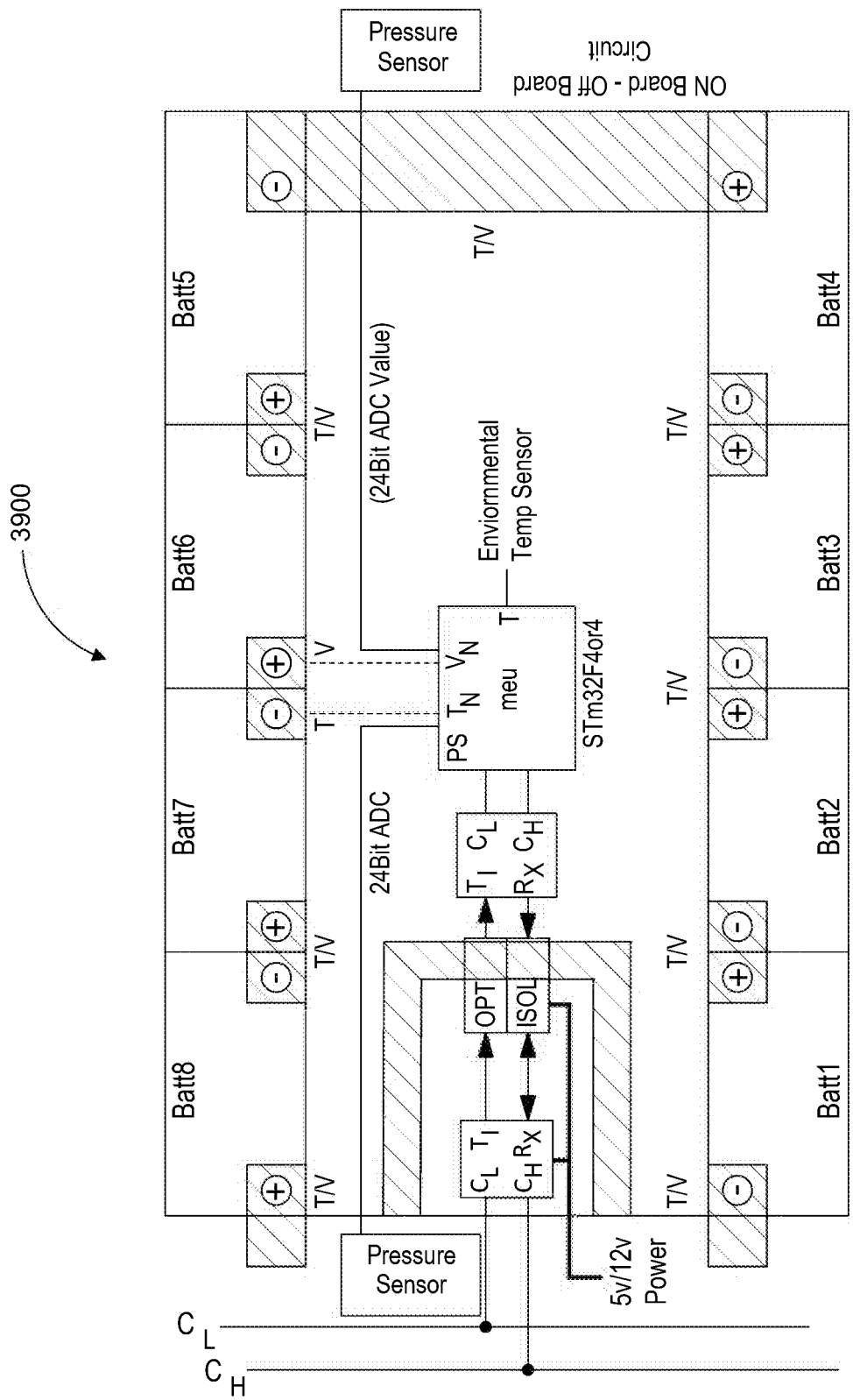
FIG. 39 illustrates an example battery module controller according to an embodiment of the present invention.

FIG. 39 illustrates more details of an example battery module controller 3900 according to an embodiment of the present invention. As described herein, battery module controller 3900 monitors the voltage, temperature, and pressure of the battery cells by battery module controller 3900. Battery module controller 3900 also balances the battery cells of the battery module and communicates data about the battery module and battery cells to a higher-level controller such as, for example, a battery rack controller as described herein.

Figure 40:
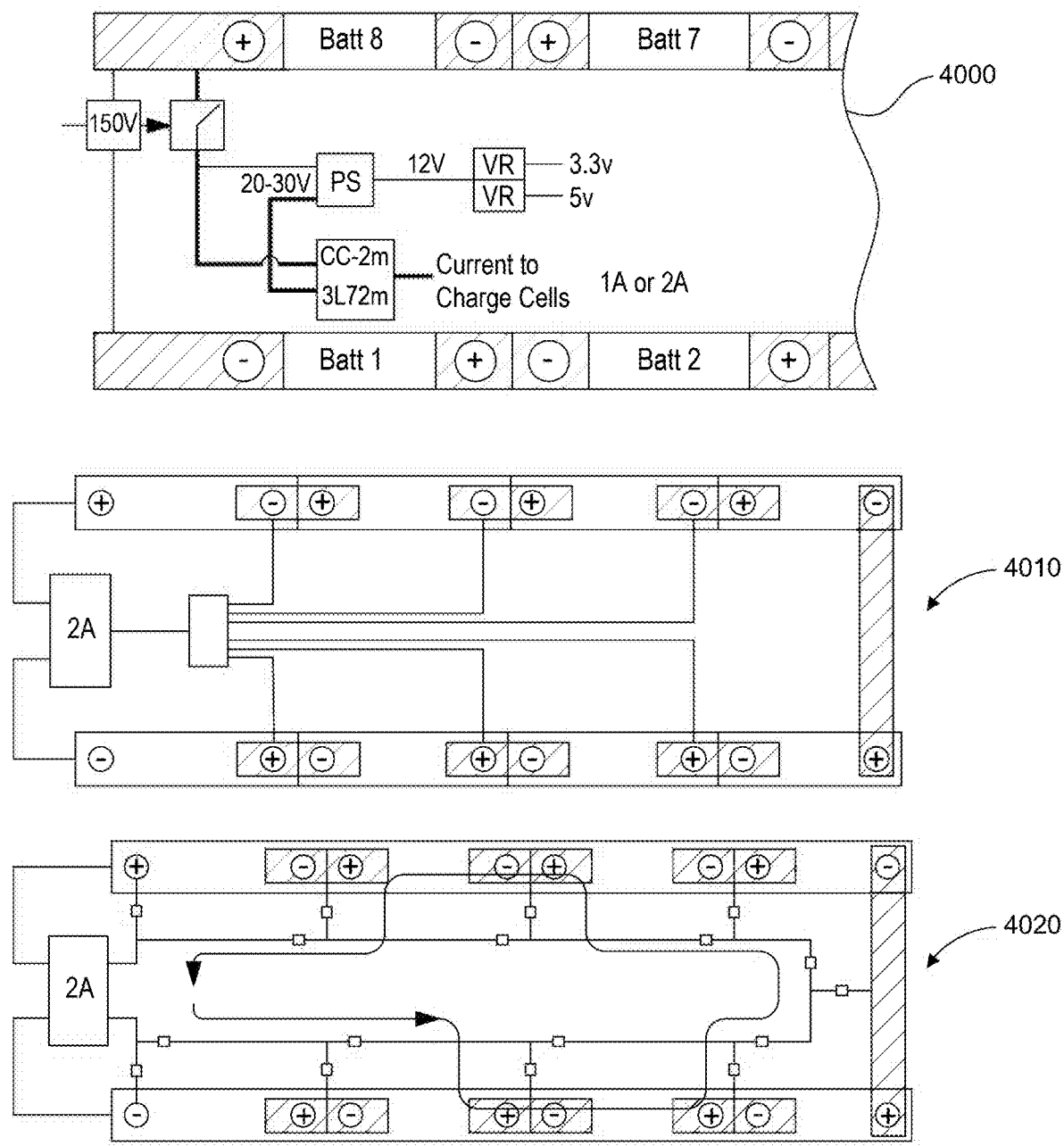
FIG. 40 illustrates example battery module controllers according to embodiments of the present invention.

FIG. 40 illustrates example battery module controllers 4000 according to embodiments of the present invention. In embodiments, battery module controllers provide a constant balancing current to each of the battery cells that are controlled by battery module controller 4000. In embodiments, the constant balancing current is, for example, 1 amp or 2 amps. In one embodiment 4010, the battery module controller provides the balancing current to each individual battery cell that is selected to receive balancing current using a star configuration. In another embodiment 4020, the balancing current is provided via a loop, which charges battery cells selected for balancing and bypasses battery cells not selected to receive balancing current as shown in FIG. 40.

Figure 41:
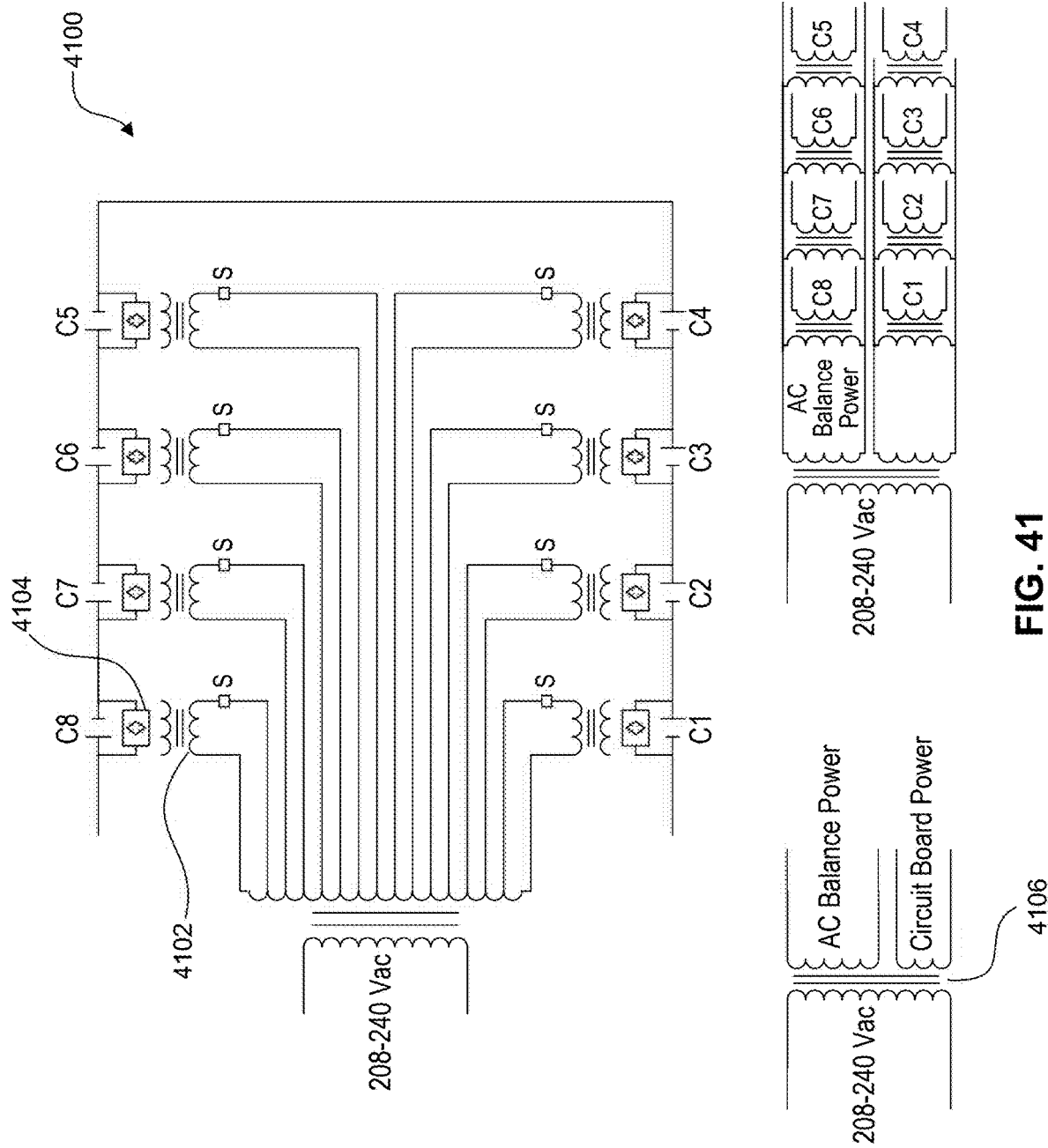
FIG. 41 illustrates example battery module controllers according to embodiments of the present invention.

FIG. 41 illustrates example battery module controllers 4100 according to embodiments of the present invention. In these embodiments, high frequency AC current is supplied to the individual battery cells via isolation transformers 4102 as shown in FIG. 41. The AC current is then rectified by a rectifier circuit 4104 and used to charge/balance the battery cells. In an embodiment, the transformer 4106 that is used to supply the battery cell balancing current can also be used to supply the power for the other battery module controller components as shown in FIG. 41.

Figure 42:
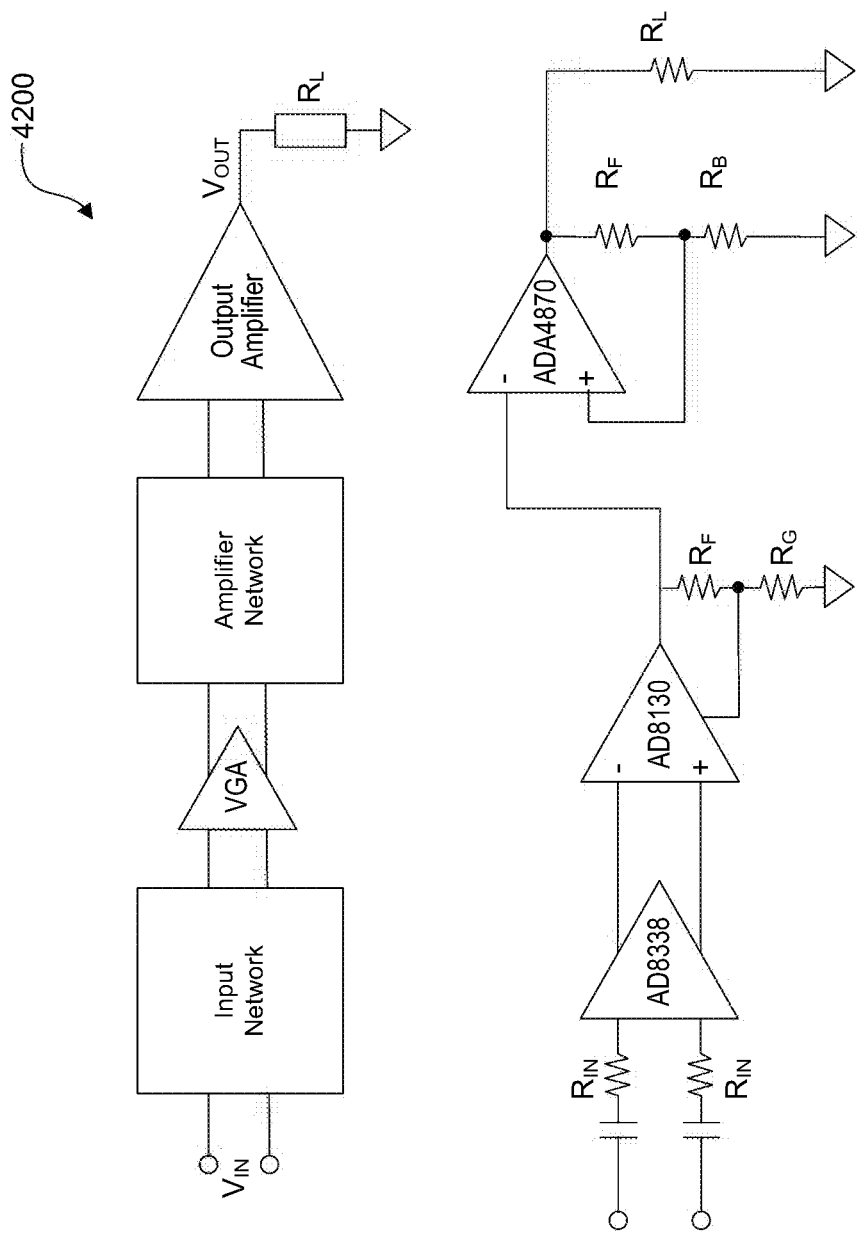
FIG. 42 illustrates an example battery module power supply according to an embodiment of the present invention.

FIG. 42 illustrates an example battery module power supply 4200 according to an embodiment of the present invention that can be used to generate the high frequency AC needed to provide balancing power to the battery cells.

Figure 43:
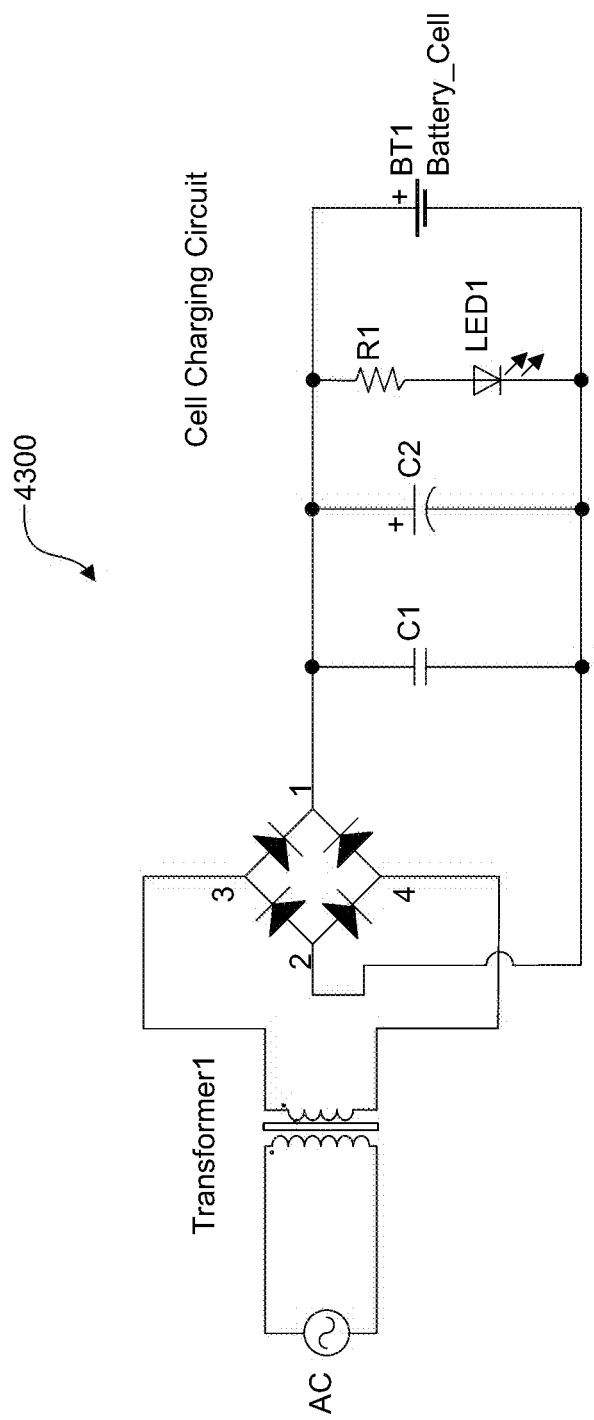
FIG. 43 illustrates an example cell charging/balancing circuit that can be used in embodiments of the present invention.

FIG. 43 illustrates an example cell charging/balancing circuit 4300 that can be used in embodiments of the present invention to rectify an AC current and provide the DC current used to balance the battery cells.

Figure 44:
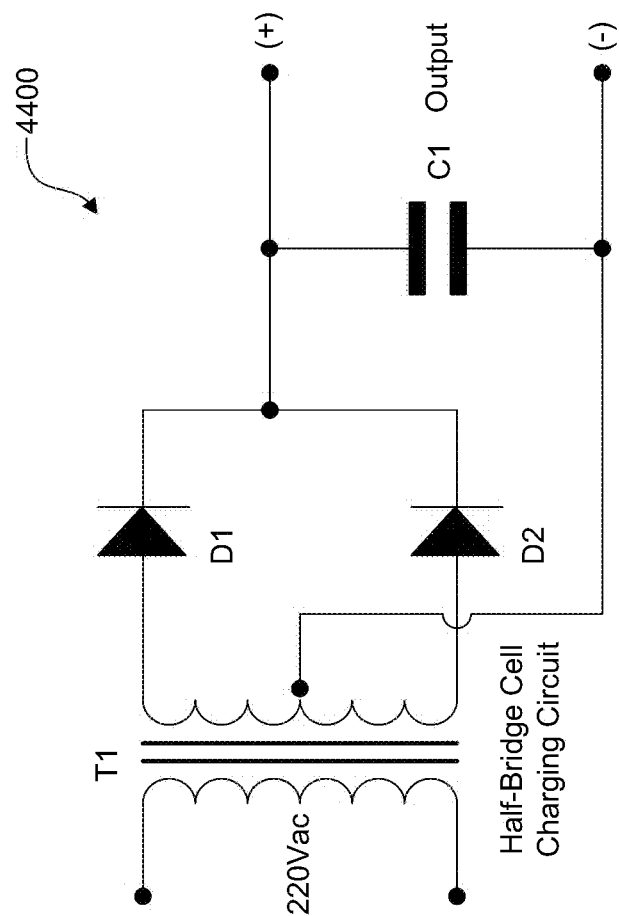
FIG. 44 illustrates an example cell charging/balancing circuit that can be used in an embodiment of the present invention.

FIG. 44 illustrates another example cell charging/balancing circuit 4400 that can be used in an embodiment of the present invention to balance the battery cells.

Figure 45:
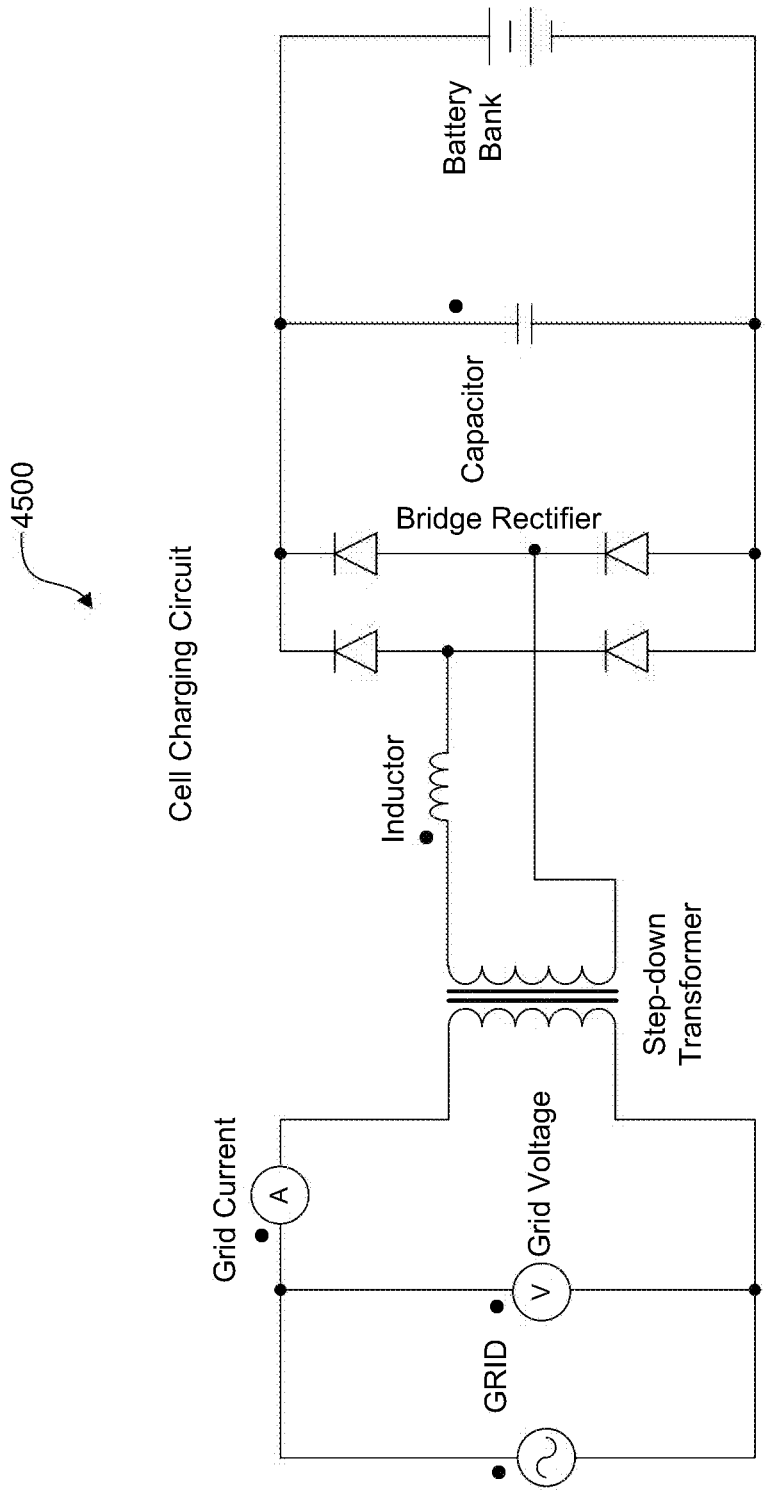
FIG. 45 illustrates an example cell charging/balancing circuit that can be used in an embodiment of the present invention.

FIG. 45 illustrates an example cell charging/balancing circuit 4500 that can be used in an embodiment of the present invention to charge/balance the battery cells.

The operation of the above charging/balancing circuits will be understood by persons skilled in the relevant art(s) given the circuit diagrams in the figures and the description herein.

Figure 46:
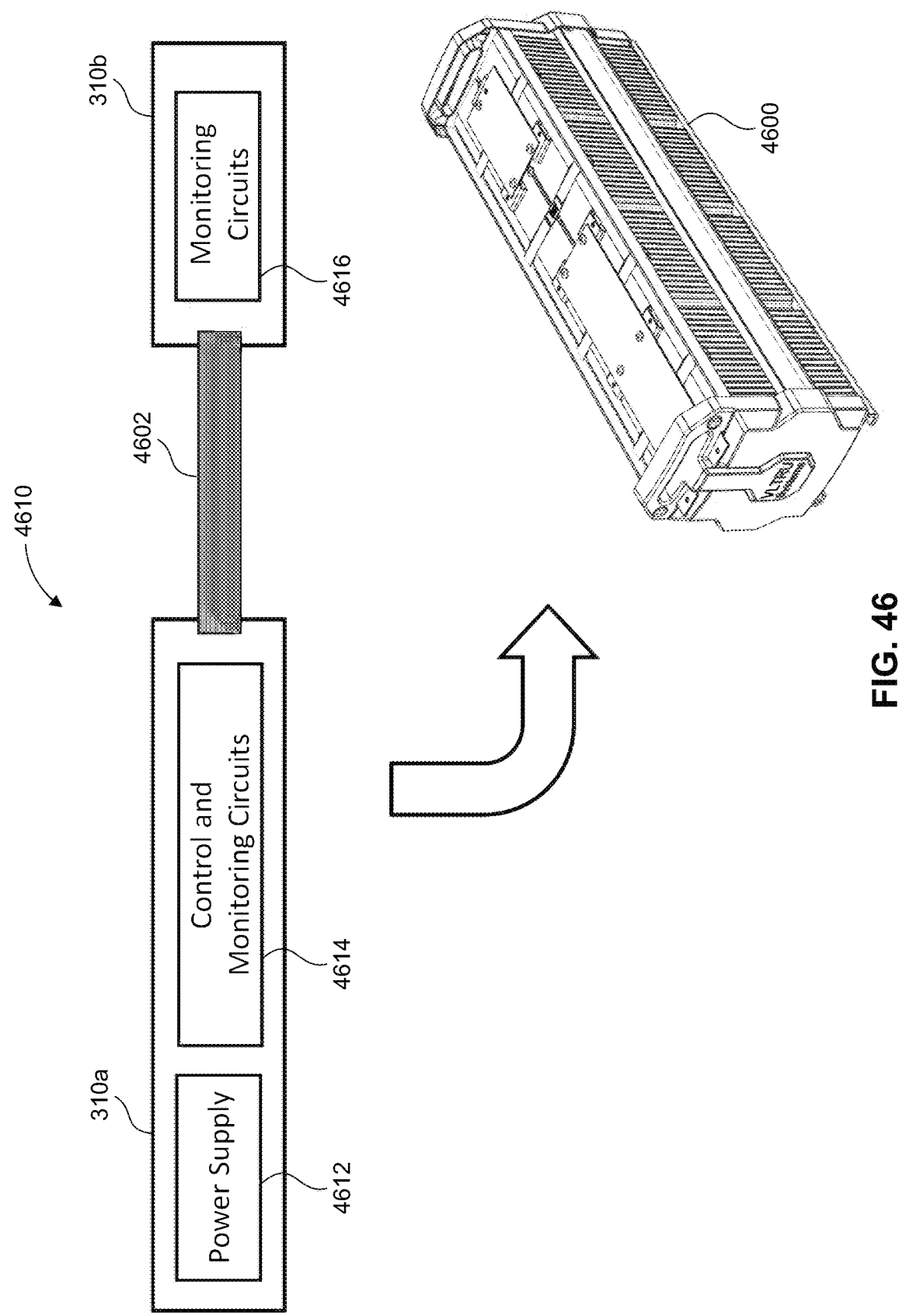
FIG. 46 illustrates an example battery module controller according to an embodiment of the present invention.

FIG. 46 illustrates an example battery module controller 4610 according to an embodiment of the present invention. As shown in FIG. 46, battery module controller 4610 includes two battery module controller circuit boards 310*a* and 310*b* connected together by a ribbon cable 4602. In an embodiment, battery module controller circuit board 310*a* includes a power supply 4612 and control and monitoring circuits 4614. Battery module controller circuit board 310*b* includes monitoring circuits 4616. Battery module controller circuit boards 310*a-b* are shown installed on a battery module 4600 according to an embodiment of the present invention.

Figure 47:
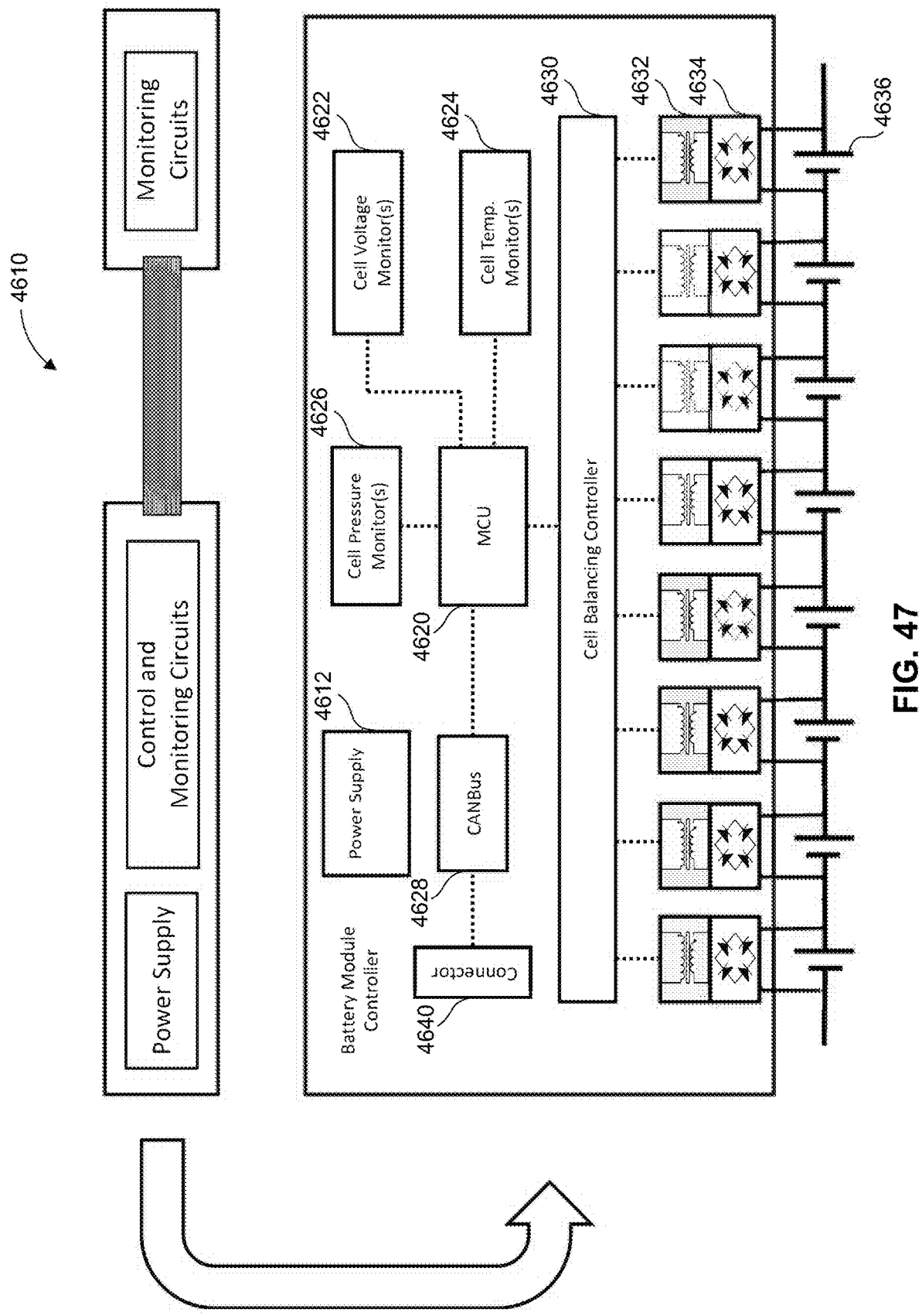
FIG. 47 illustrates an example battery module controller according to an embodiment of the present invention.

FIG. 47 further illustrate example battery module controller 4610. As shown in FIG. 47, in addition to power supply 4612, battery module controller 4610 includes a microcontroller unit (MCU) 4620, cell voltage monitors 4622, cell temperature monitors 4624, cell pressure monitors 4626, a cell balancing controller 4630, balancing transformers 4632, and balancing rectifiers 4634. In an embodiment, MCU 4620 communicates with a higher-level controller using a CANBus communications circuit 4628. The CANBus communications circuit is connected to the higher-level controller using a connector 4640. In an embodiment, the higher-level controller is a battery rack controller as described herein.

In operation, power supply 4612 draws power from a power grid and converts this power to a higher frequency AC power and DC voltages needed to operate the components of battery module controller 4610. The higher frequency AC power output by power supply 4612 is supplied to the cell balancing transformers 4632 and balancing rectifiers 4634 for balancing cells 4636. Power supply 4612 produces DC power required to operate the various components of battery module controller 4610 such as, for example, MCU 4620, cell voltage monitors 4622, cell temperature monitors 4624, cell pressure monitors 4626, and cell balancing controller 4630. MCU 4620 runs the firmware and software that controls the operation and functions of battery module controller 4610. These functions include monitoring the voltage, temperature and pressure of the battery cells that make up the battery module controlled by battery module controller 4610. The functions also include balancing the battery cells of the battery module and communicating data about the battery module and battery cells to a higher-level controller such as, for example, a battery rack controller as described below. Cell voltage monitor(s) 4622, cell temperature monitor(s) 4624, and cell pressure monitor(s) 4626 are the hardware sensors and circuits needed to monitor the battery cell voltages, temperatures, and pressures. Cell balancing controller 4630 is the hardware needed to provide balancing current/power to the individual battery cells 4636 of the battery module controlled by battery module controller 4610. More details regarding these functions and the associated hardware are provided below.

Figure 48A:
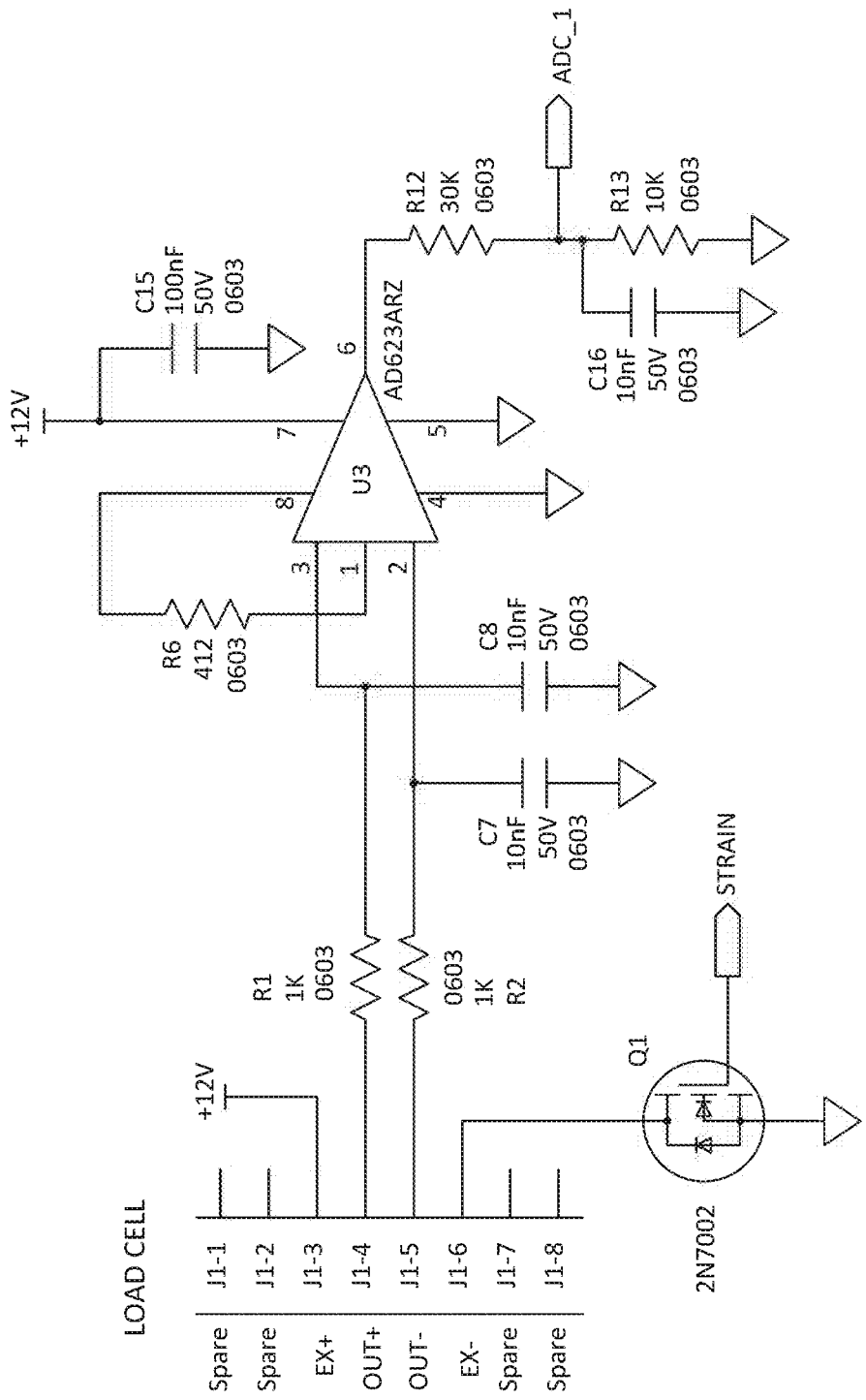
FIG. 48 (separated into the partial views shown in FIGS. 48A-48Q) illustrates an example battery module controller according to an embodiment of the present invention.
Figure 48B:
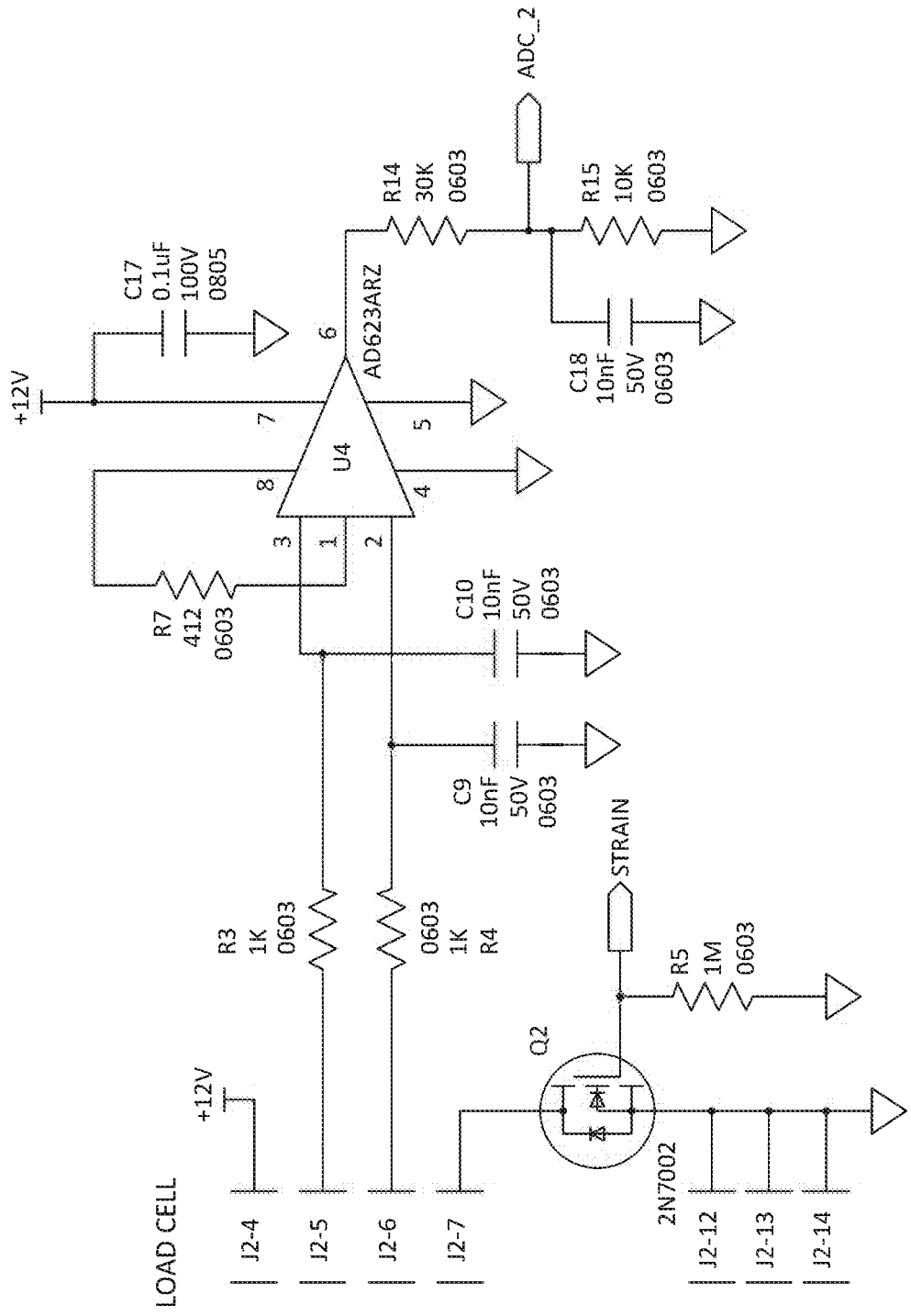
Figure 48C:
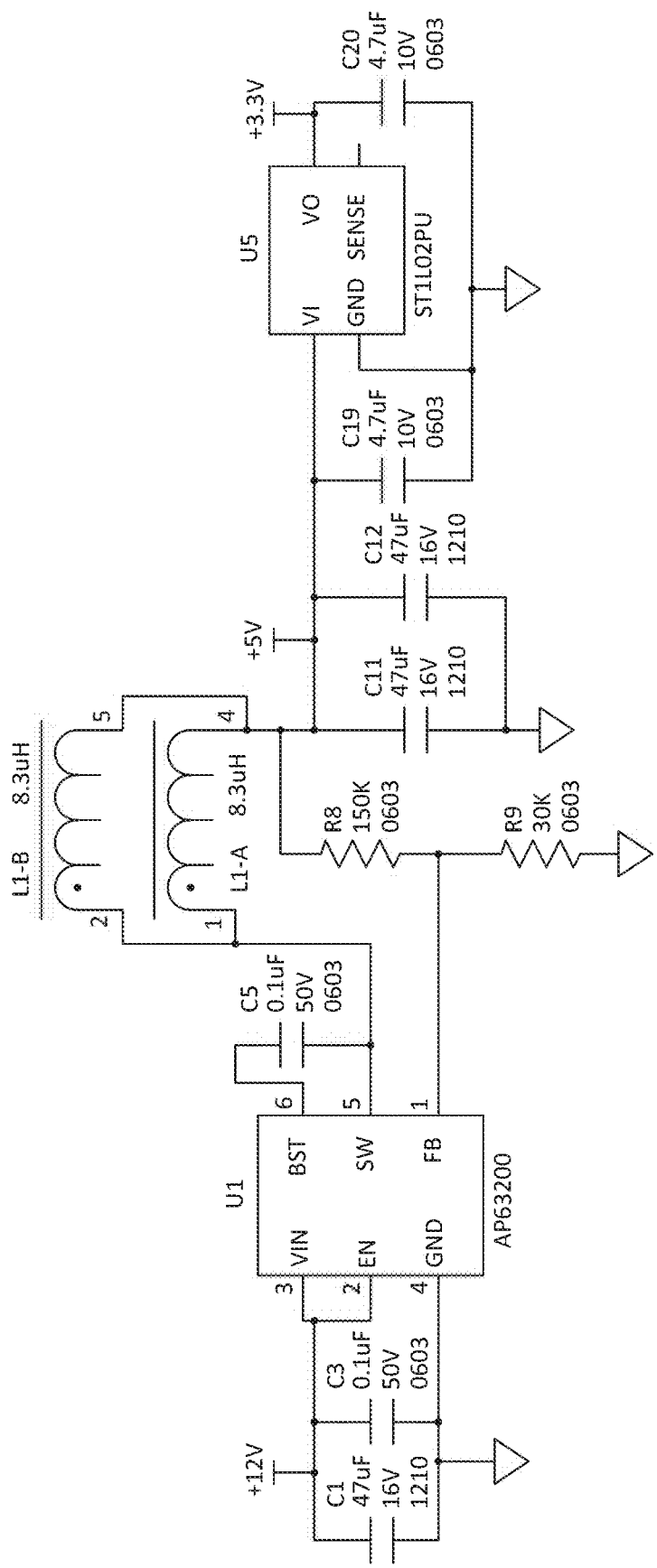
Figure 48D:
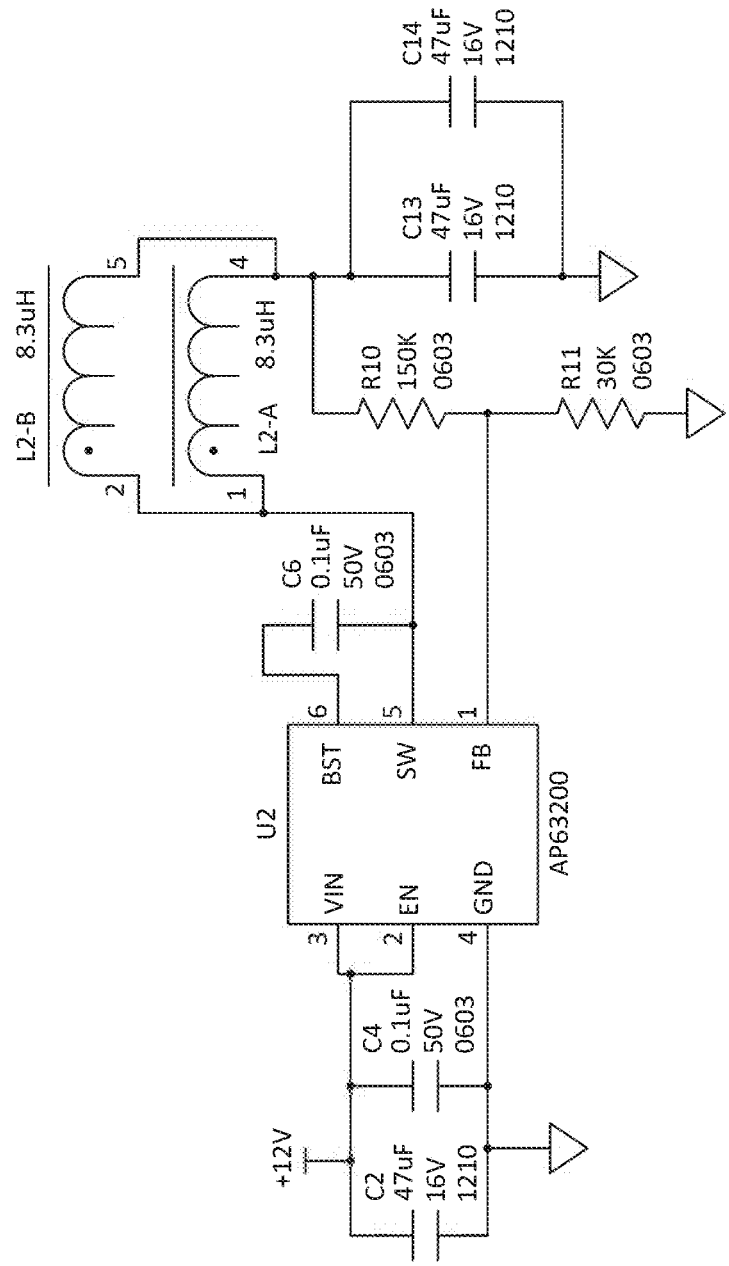
Figure 48E:
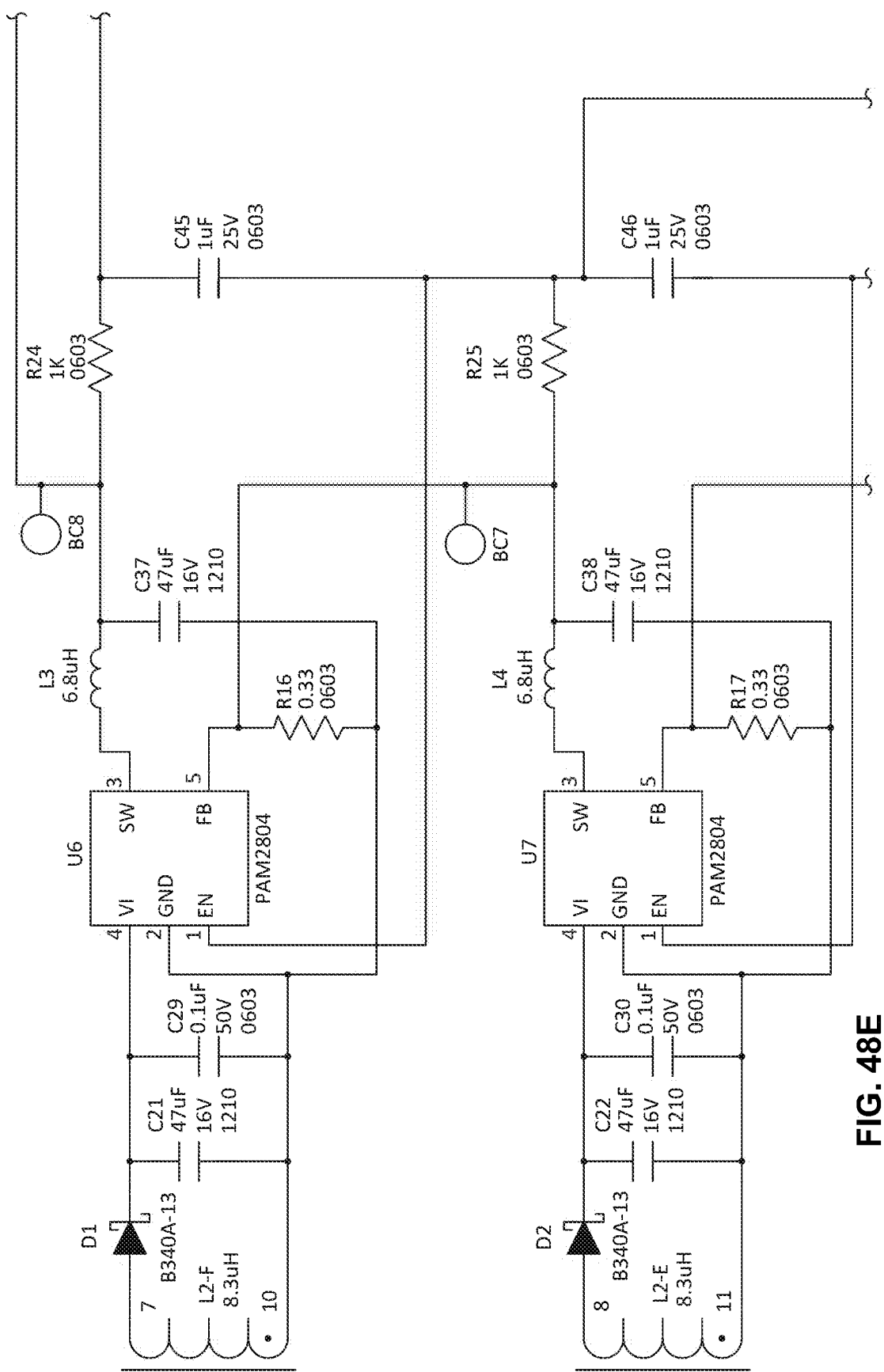
Figure 48F:
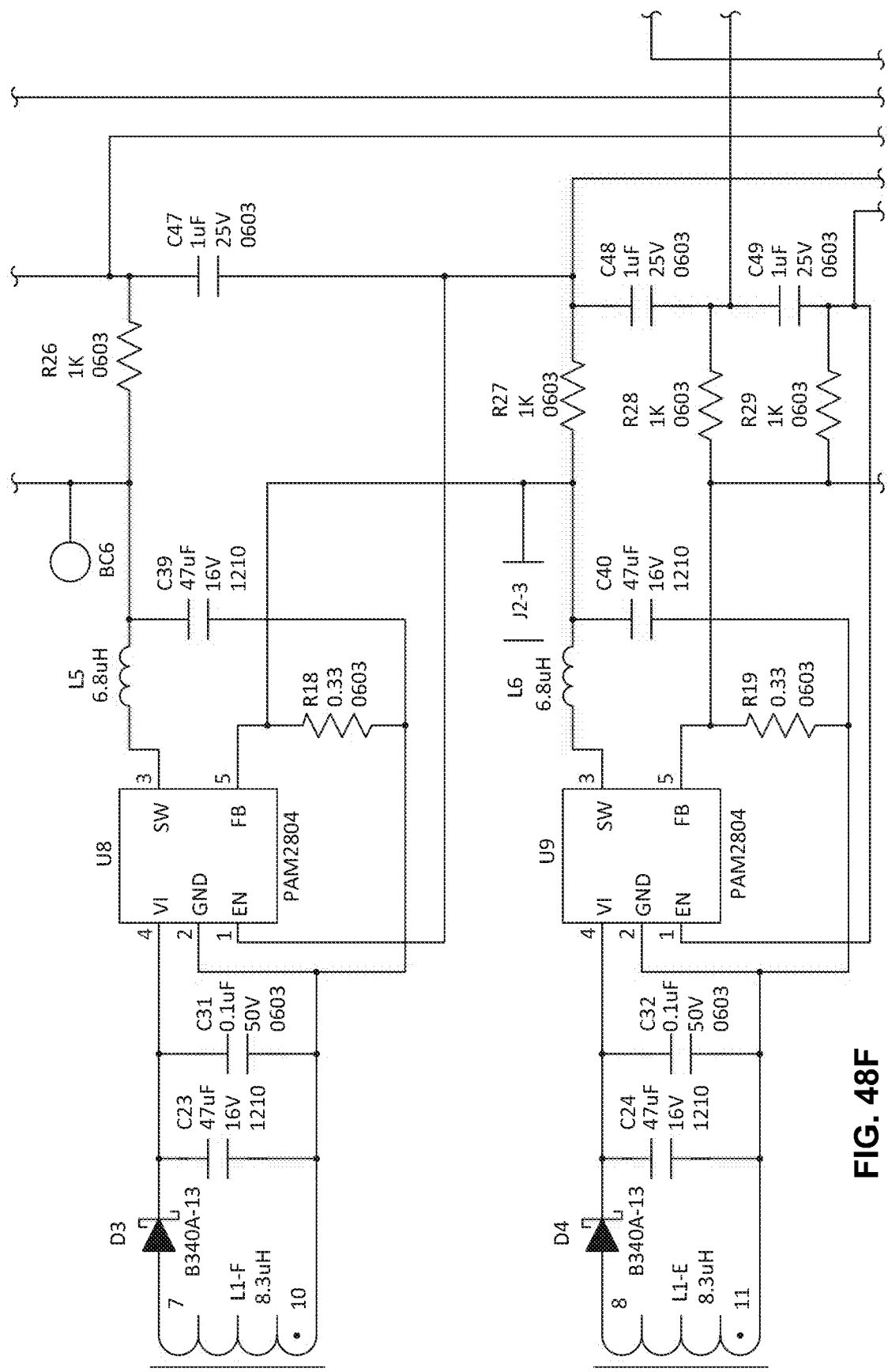
Figure 48G:
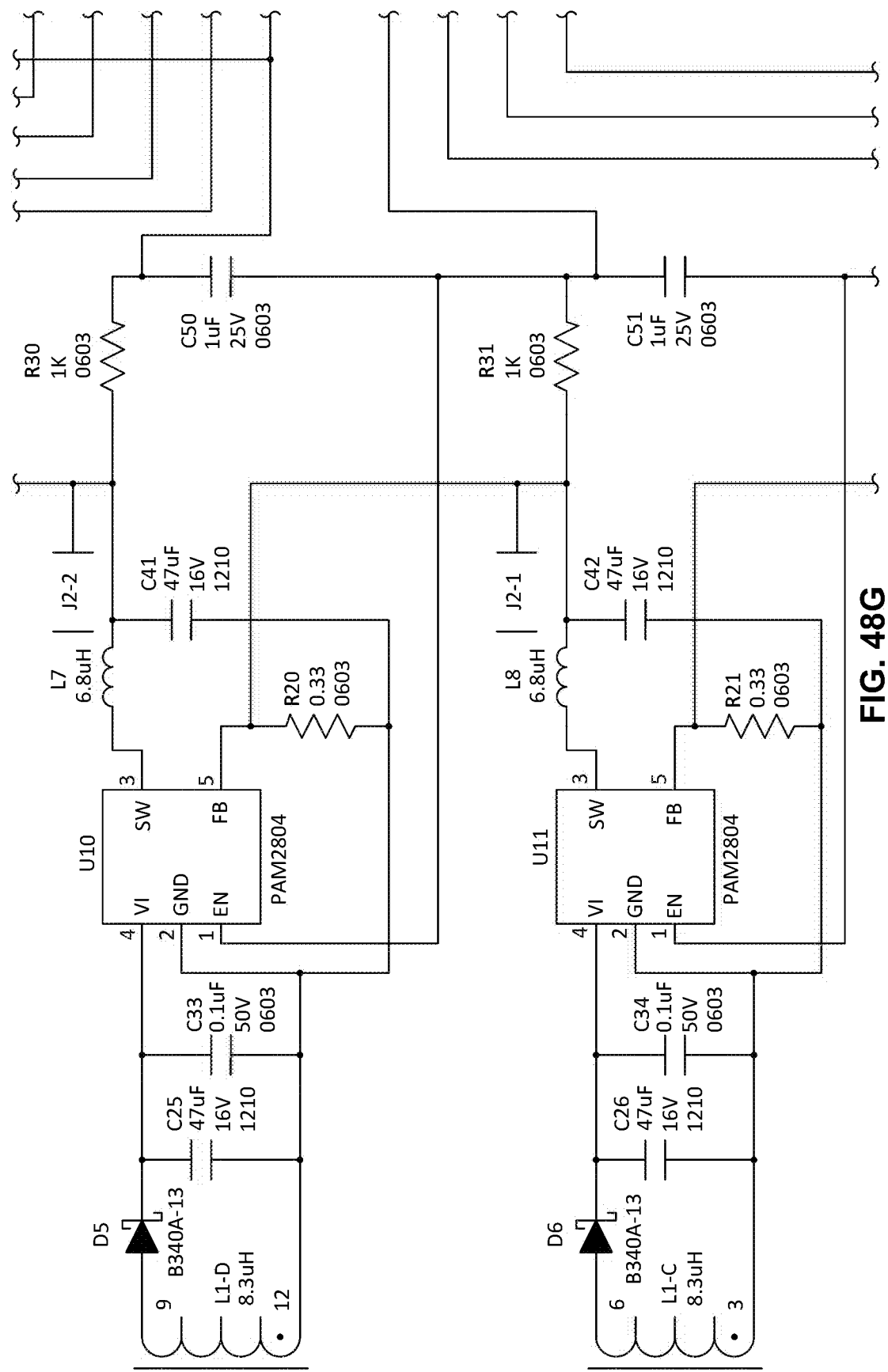
Figure 48H:
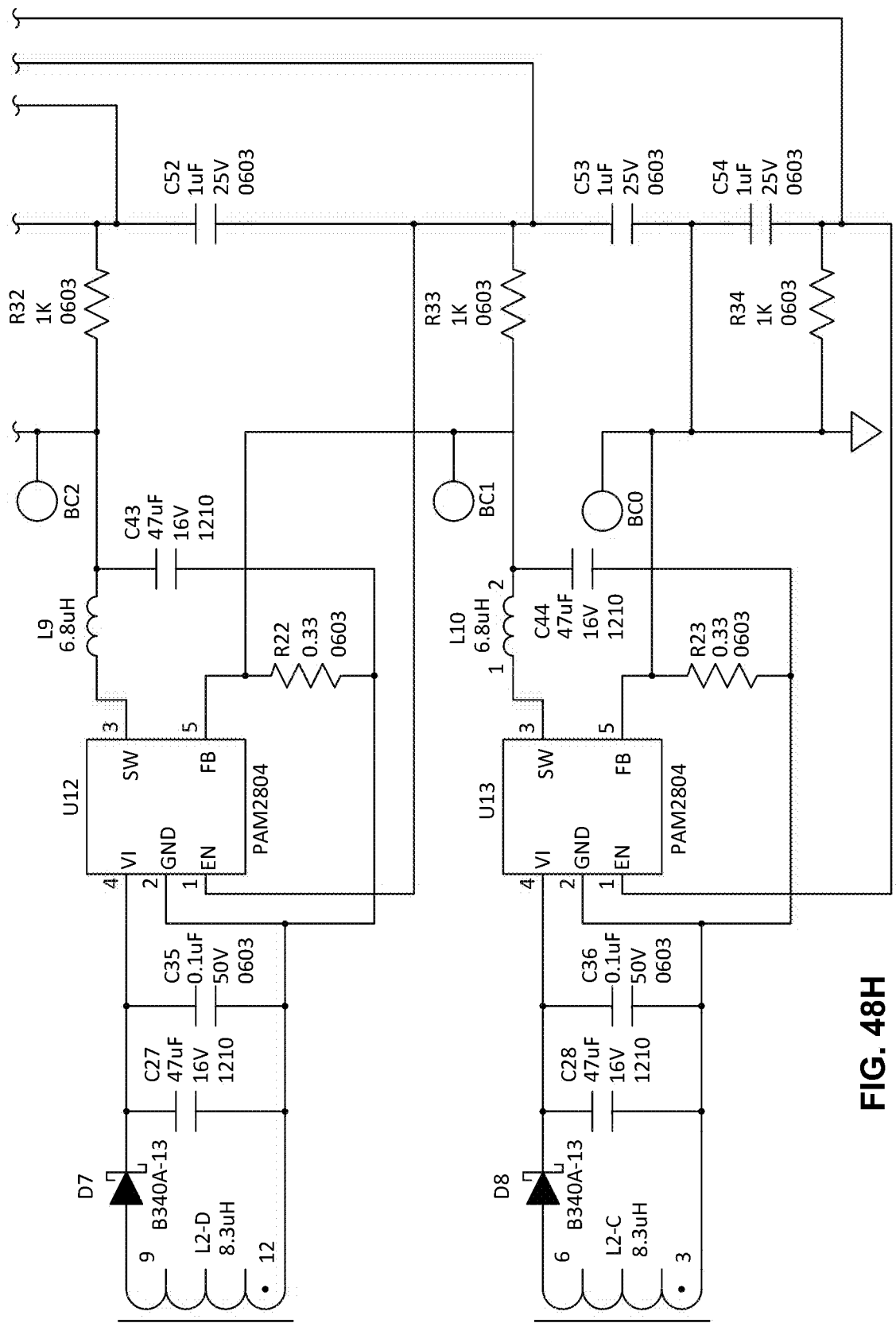
Figure 48I:
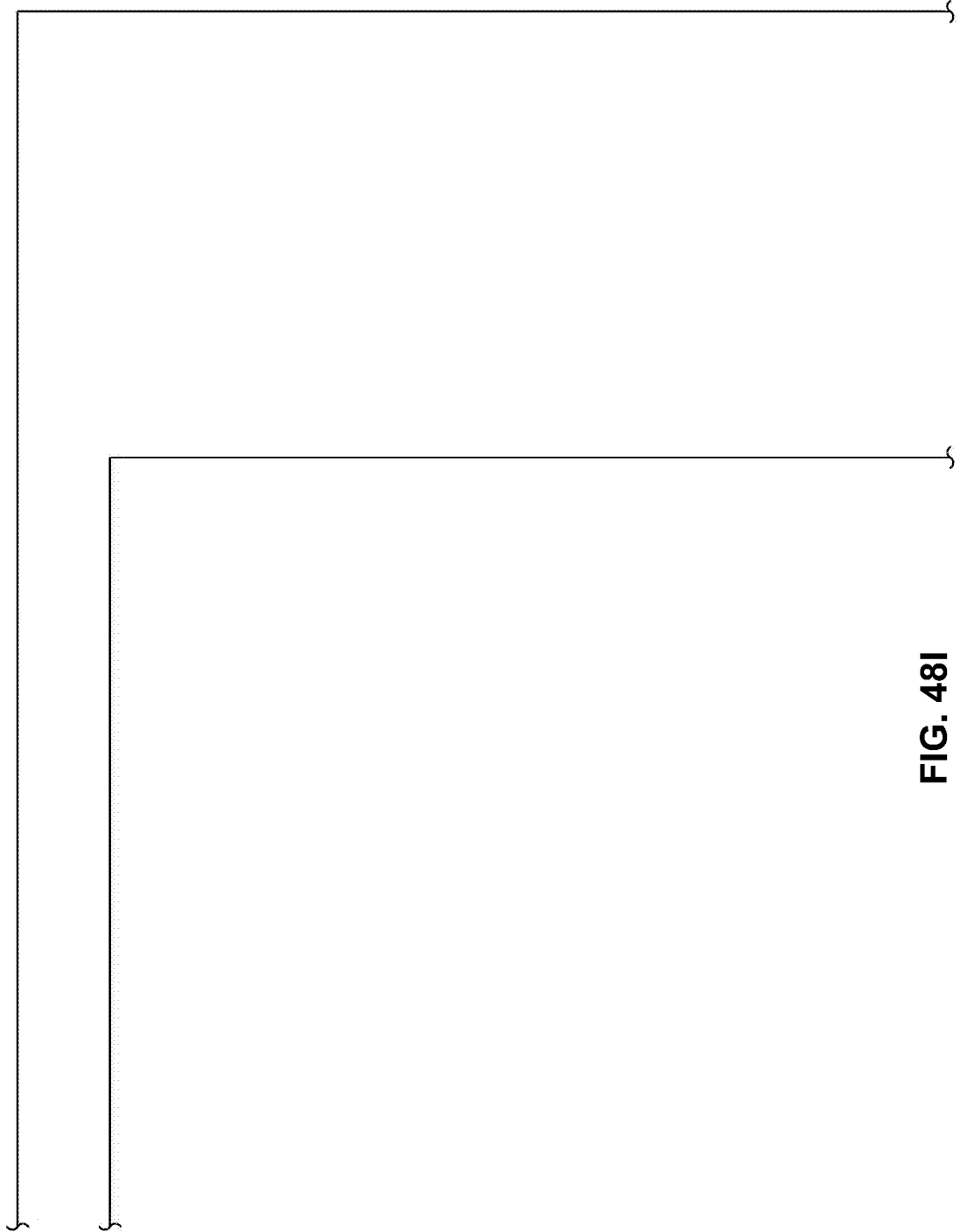
Figure 48K:
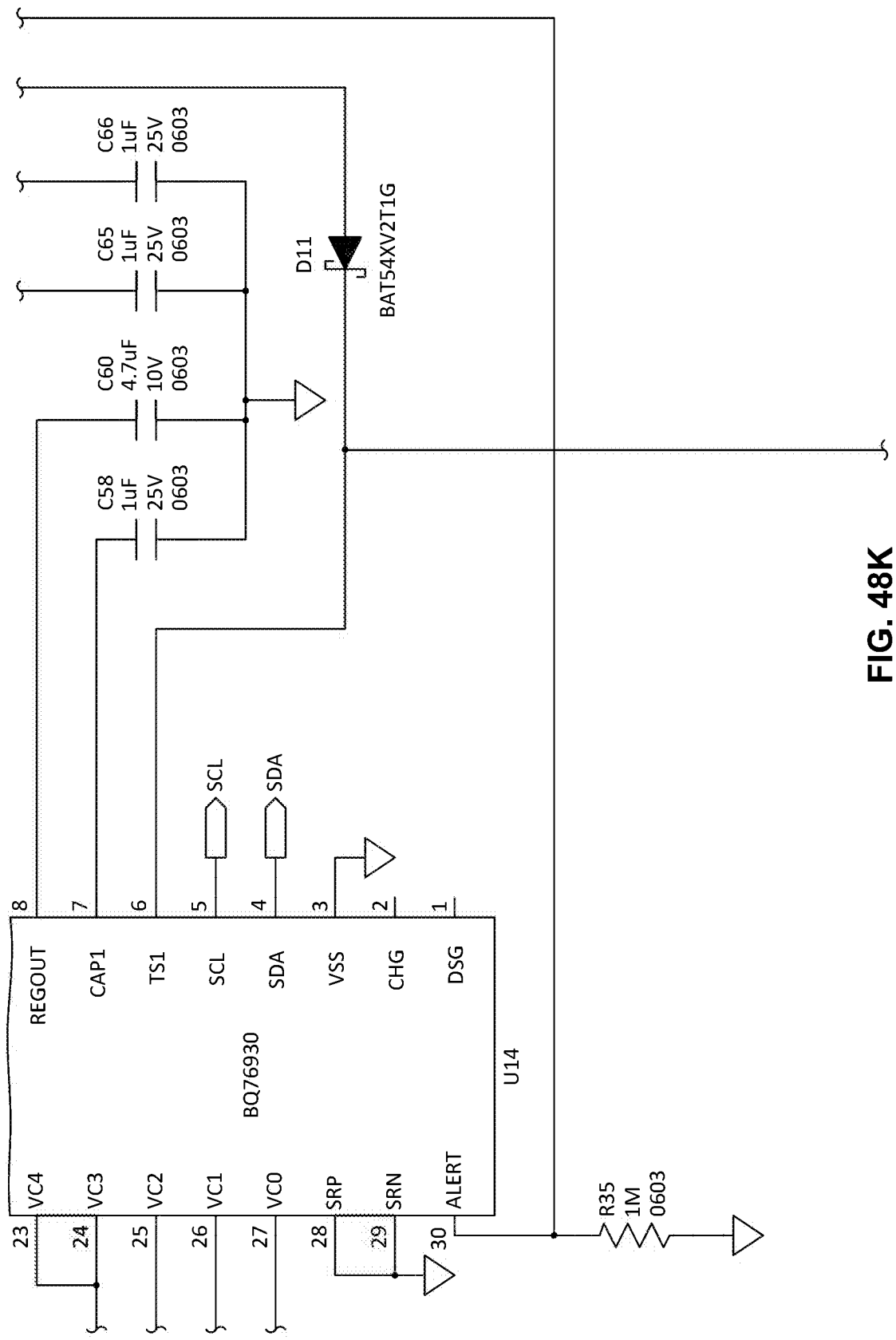
Figure 48L:
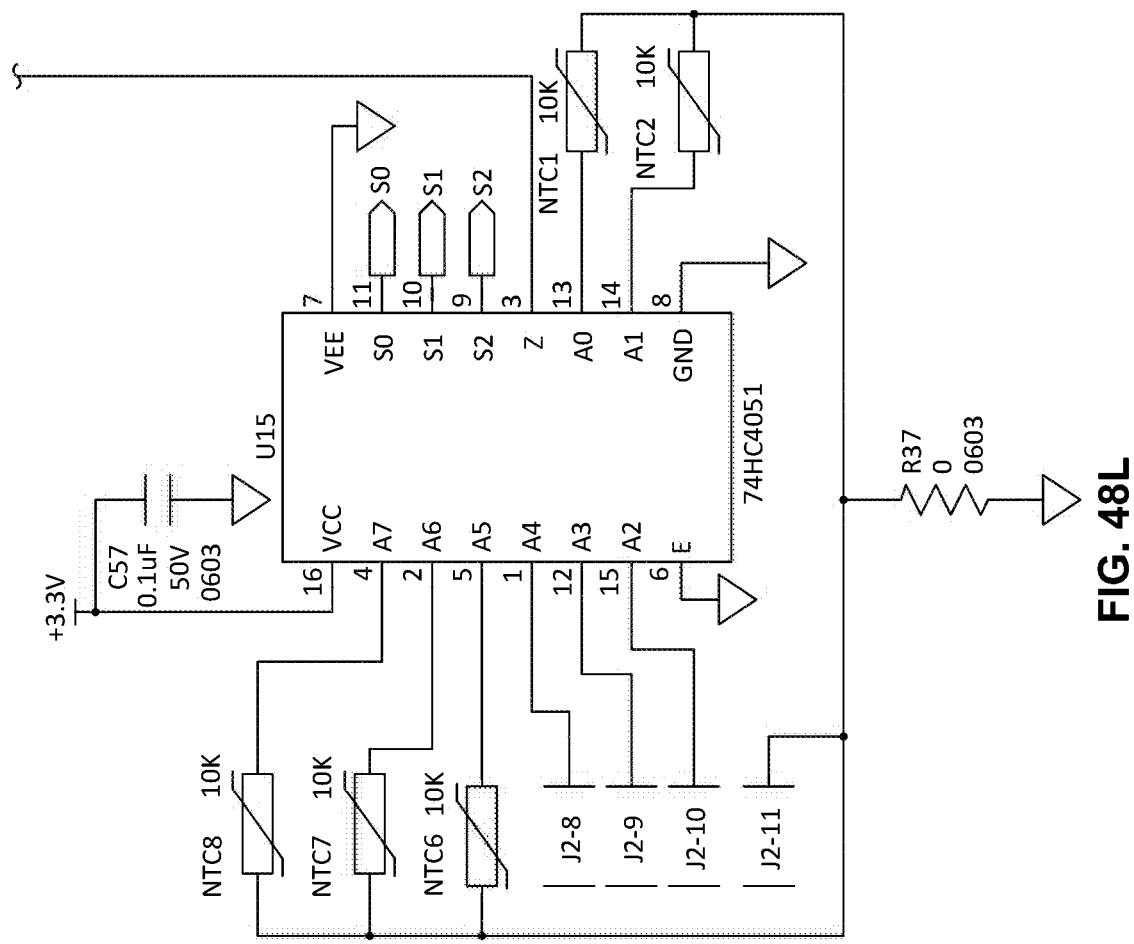
Figure 48M:
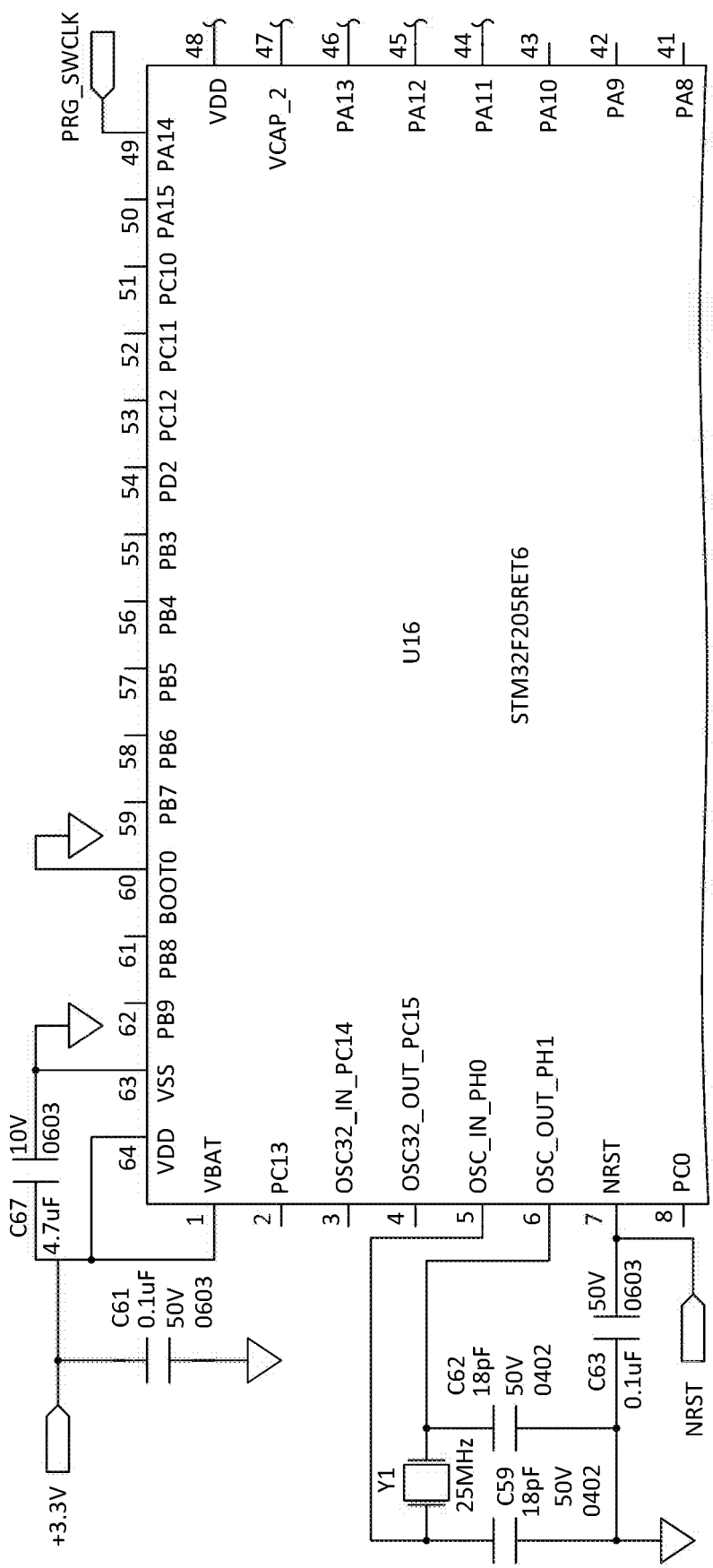
Figure 48N:
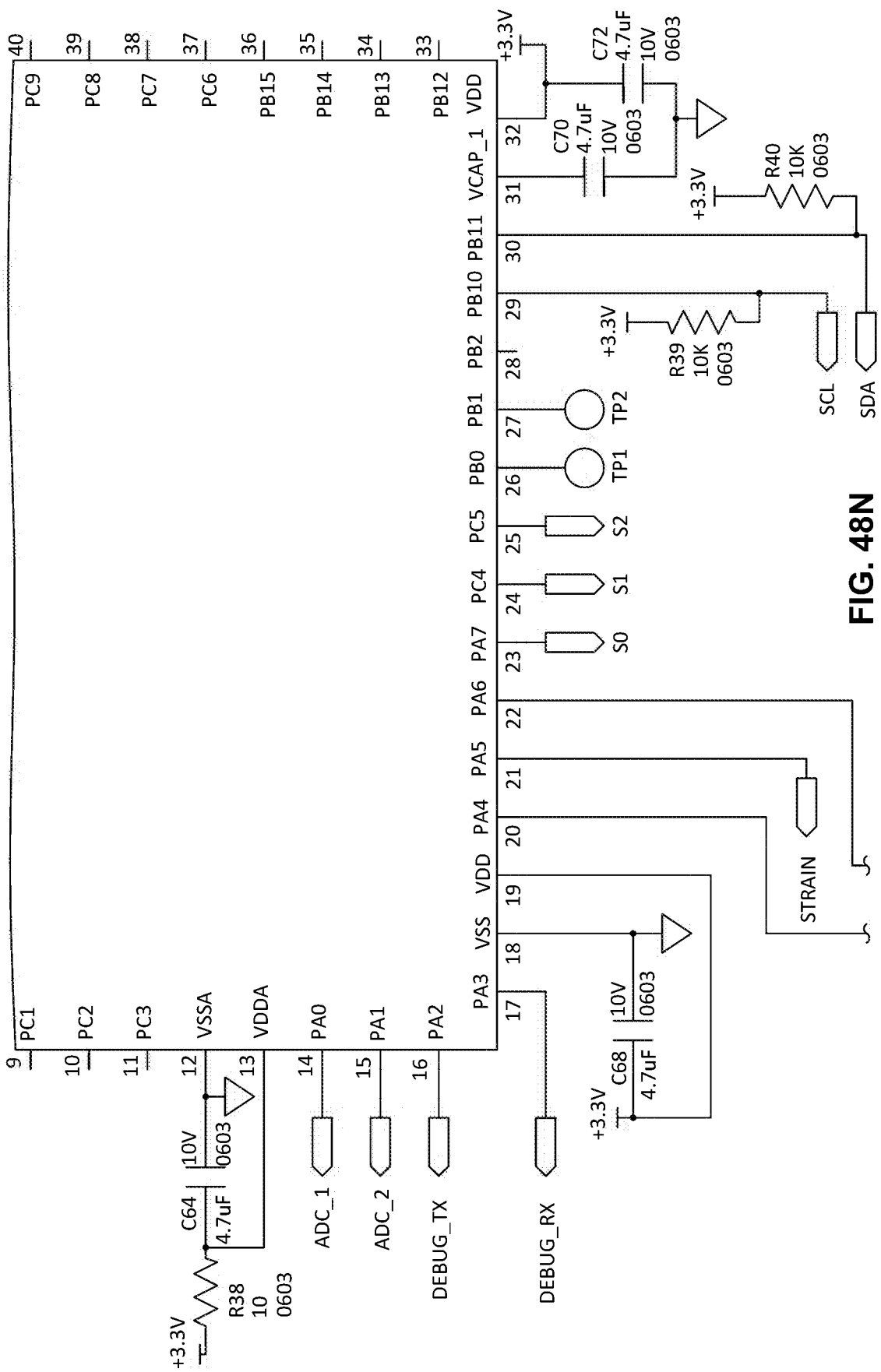
Figure 48O:
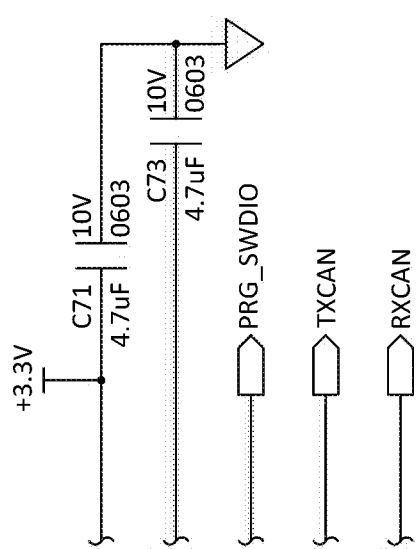
Figure 48P:
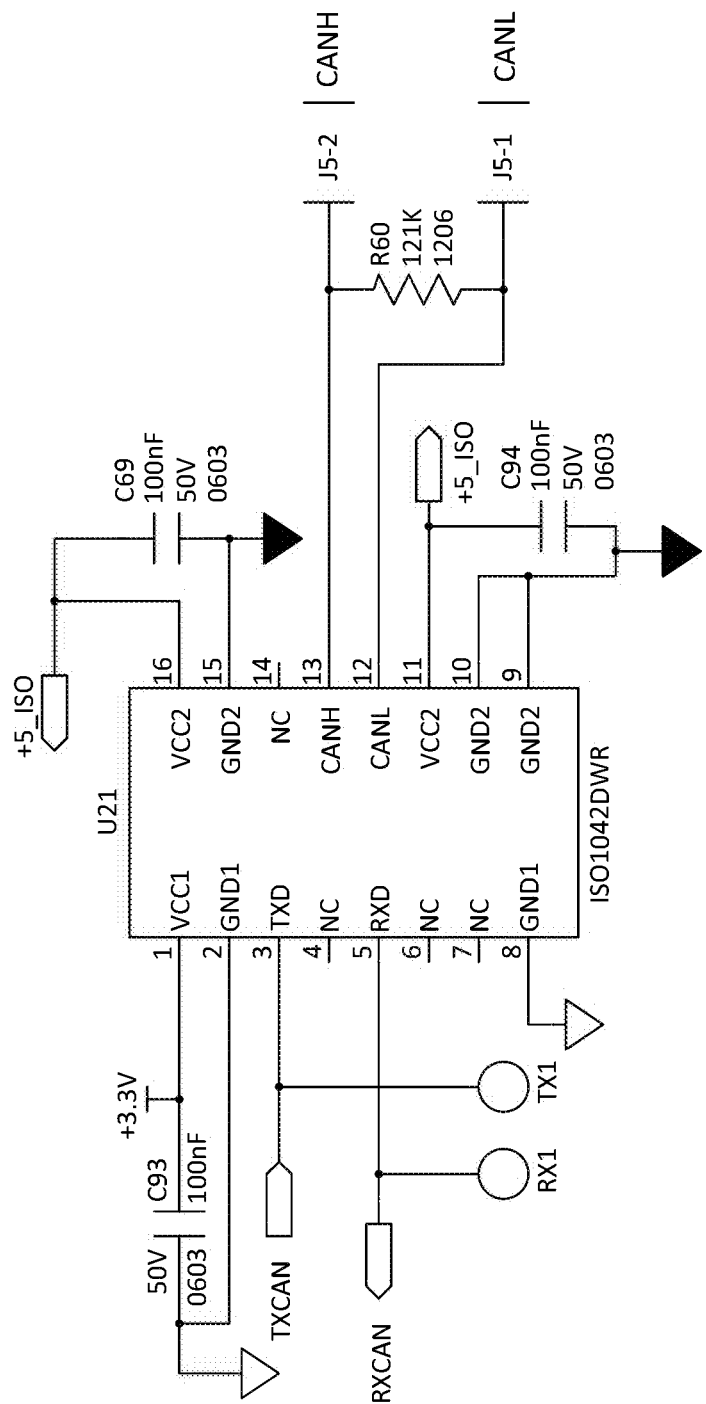
Figure 48Q:
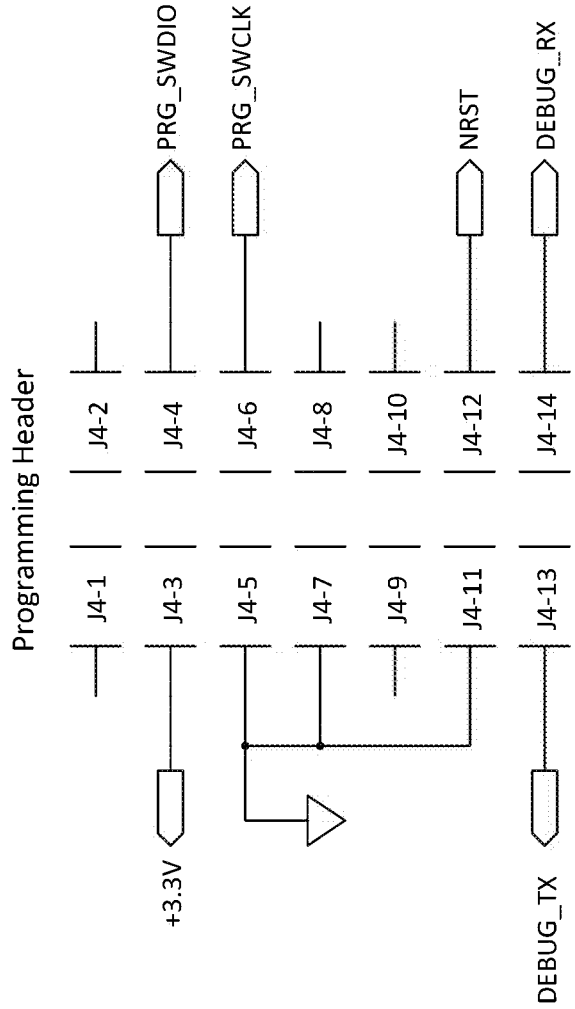

FIG. 48, which is separated into the partial views shown in FIGS. 48A-48Q, is a detailed circuit diagram for battery module controller 4610 according to an embodiment of the present invention. As shown in FIG. 48, in an embodiment, two convertors each drive a transformer that create four isolated outputs each. These eight outputs are used with a constant current circuit to charge one or more of the battery module battery cells. Each of the battery cells is monitored for temperature. The circuit is controlled by a microprocessor and communicates to a higher-level controller using CANBus communications. The microprocessor also measures the voltage on each cell. The controller also includes circuits that measure the swelling/pressure of the battery cells.

Figure 49:
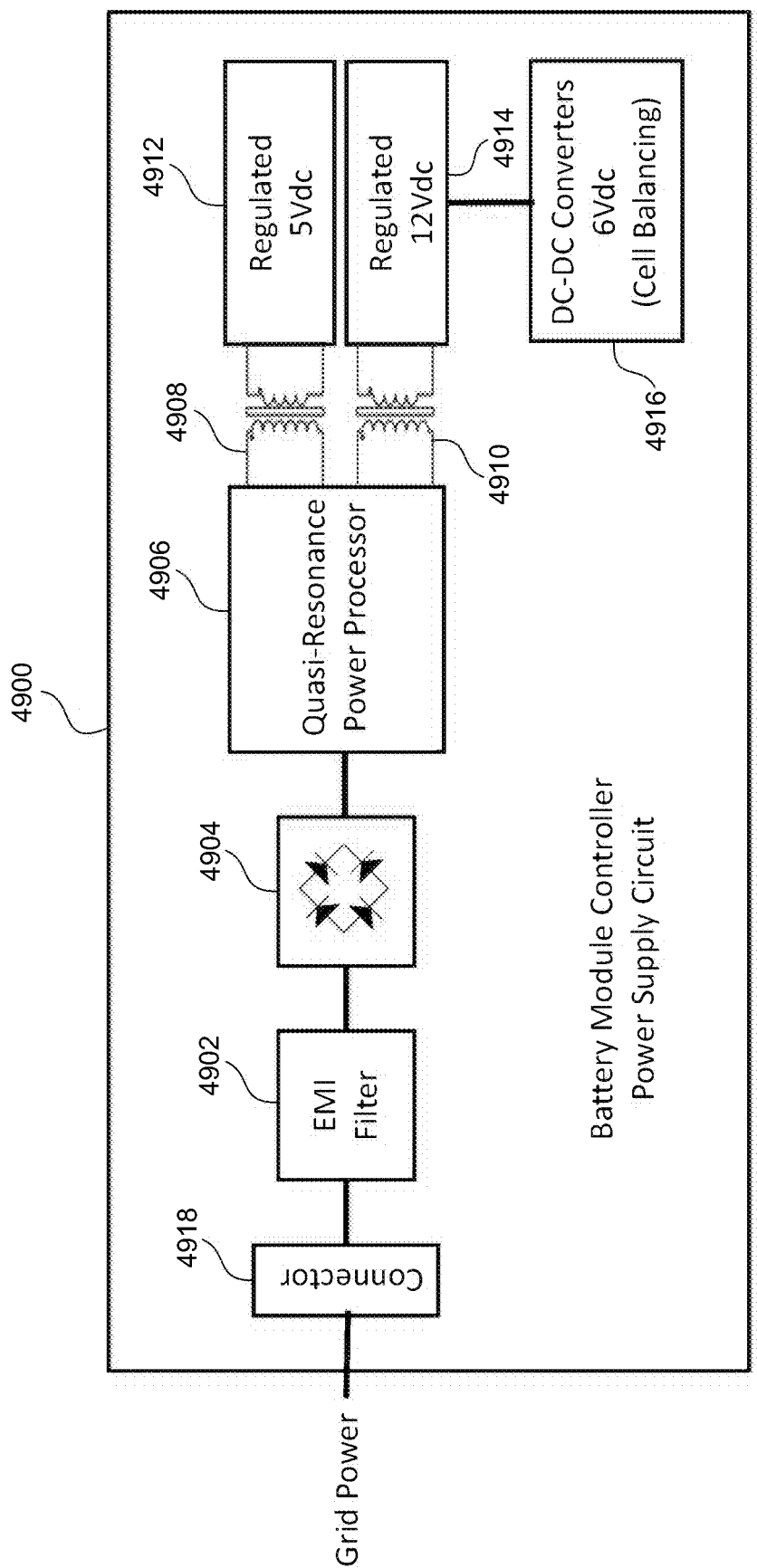
FIG. 49 illustrates an example power supply of a battery module controller according to an embodiment of the present invention.

FIG. 49 illustrates an example power supply 4900 that can be used with battery module controllers according to an embodiment of the present invention. As shown in FIG. 49, power supply 4900 includes an electromagnetic interference (EMI) filter 4902, a rectifier 4904, a quasi-resonance power processor 4906, isolation transformers 4908 and 4910, a regulated 5V power circuit, a regulated 12V power circuit, and one or more DC-to-DC 6V power converter circuits used for battery cell balancing. In embodiments, isolation transformers 4908 and 4910 can be multiple windings on the same transformer core. Power supply 4900 is connected to grid power using a connector 4918. In one embodiment, quasi-resonance power processor 4906 is implemented using an Infineon Technologies 5QR1680AG integrated circuit chip.

Figure 50:
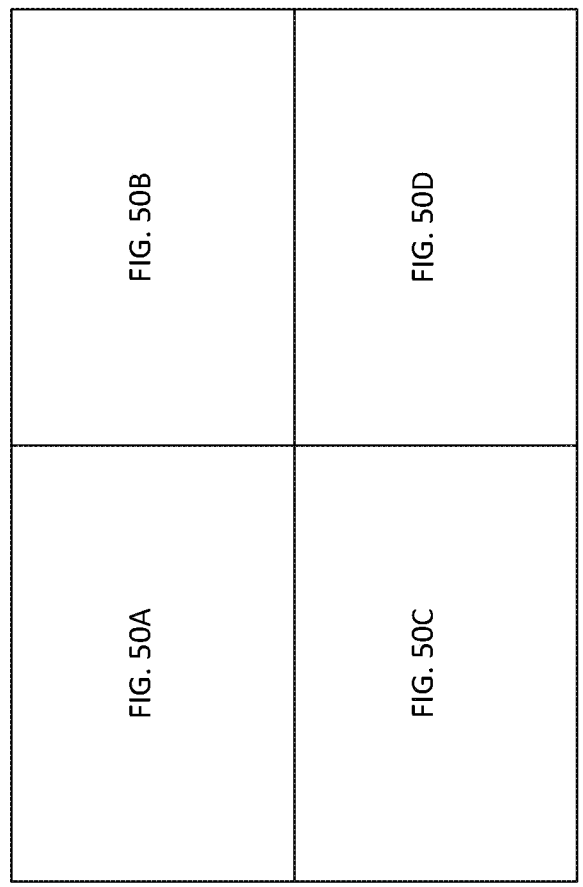
FIG. 50 (separated into the partial views shown in FIGS. 50A-50D) illustrates an example power supply of a battery module controller according to an embodiment of the present invention.
Figure 50A:
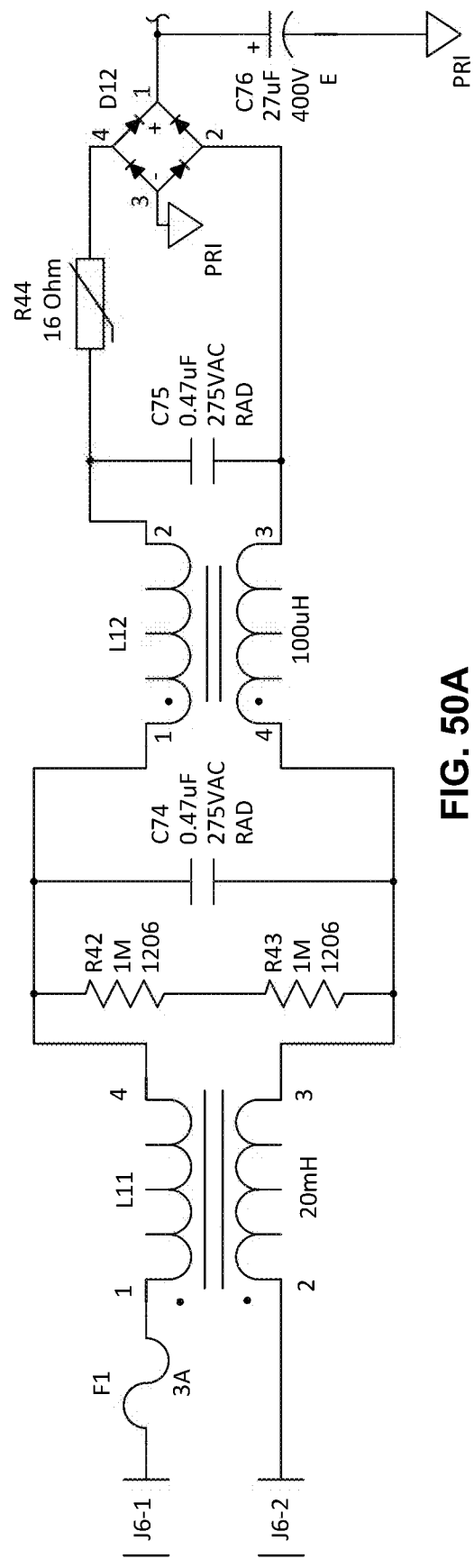
Figure 50B:
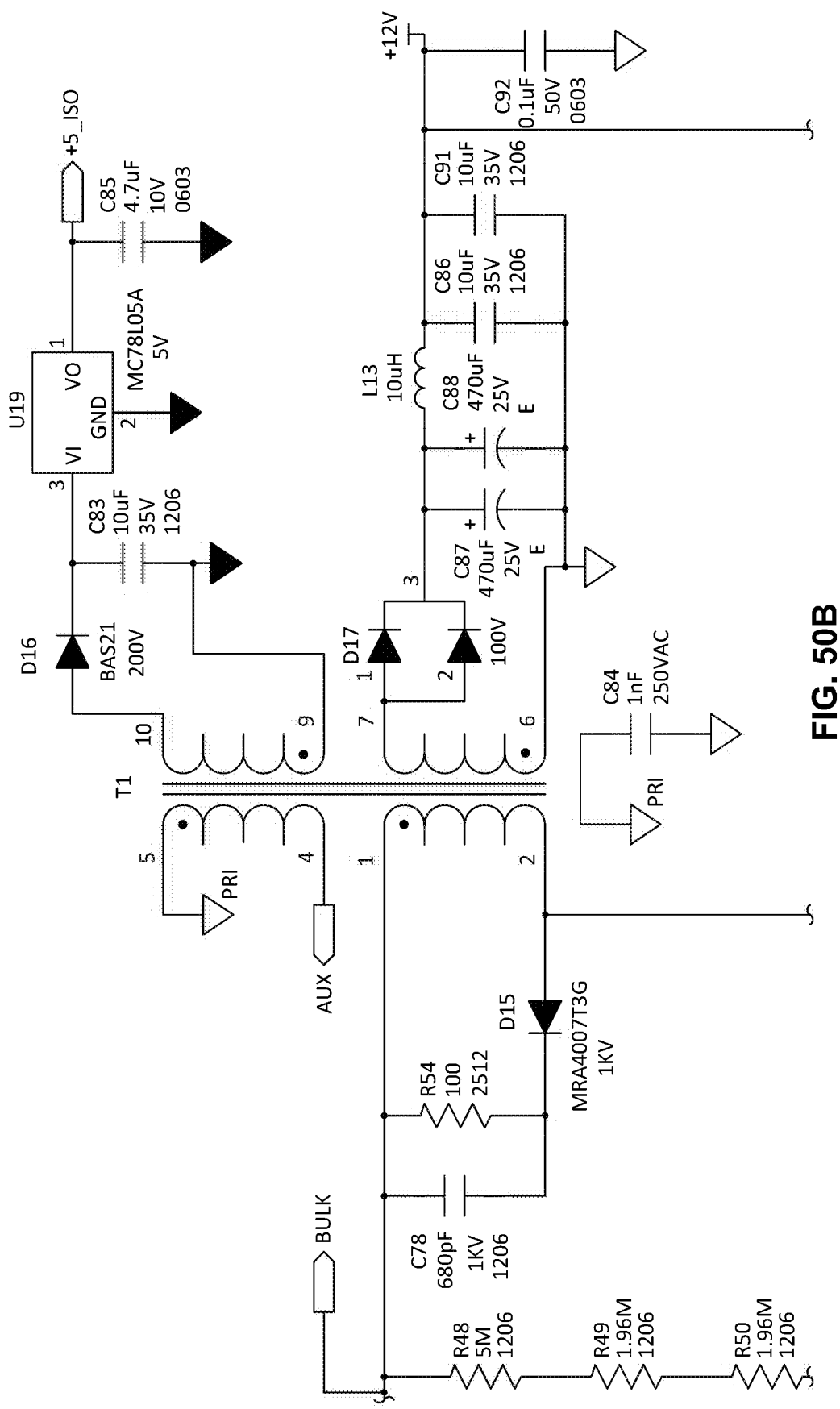
Figure 50C:
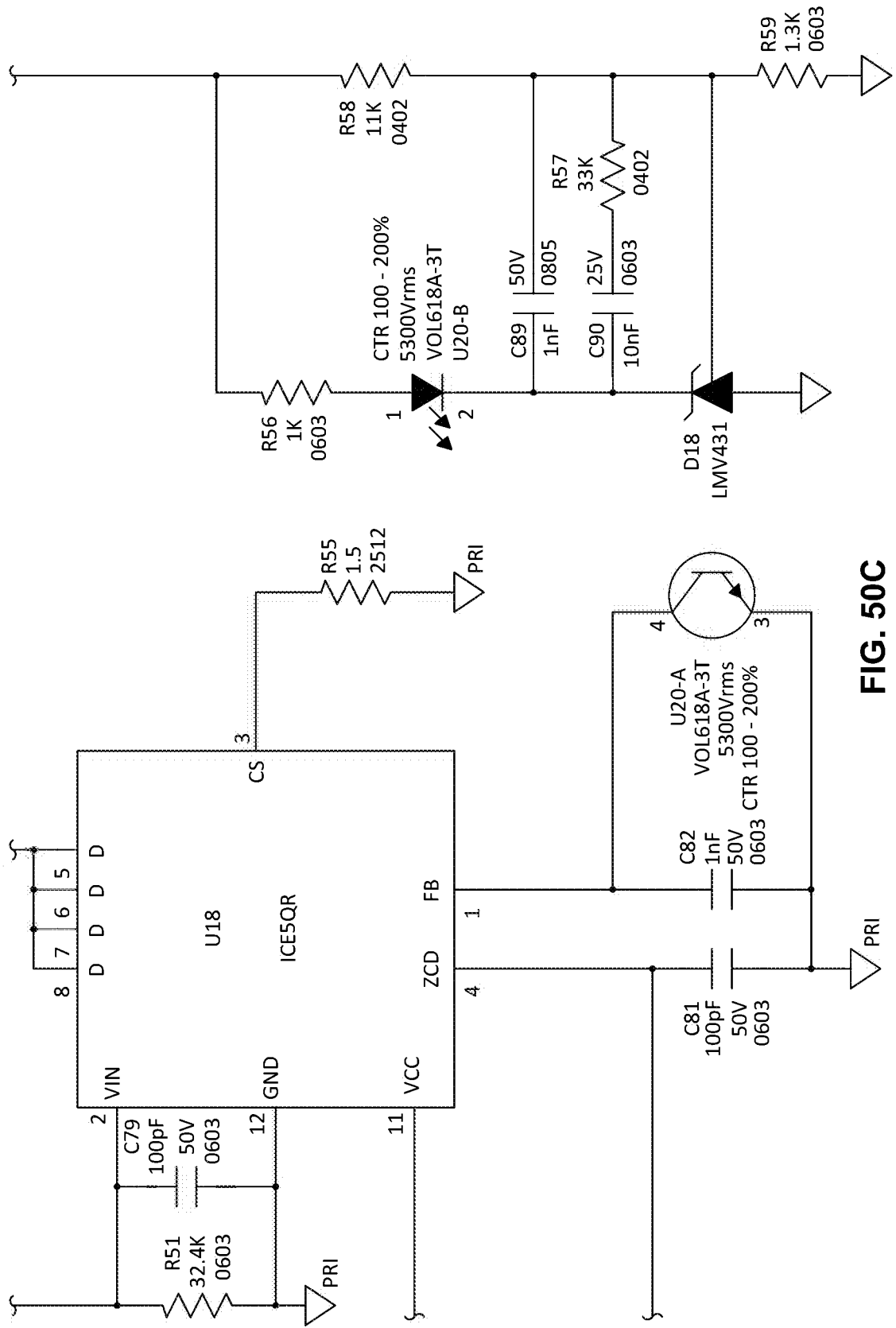
Figure 50D:
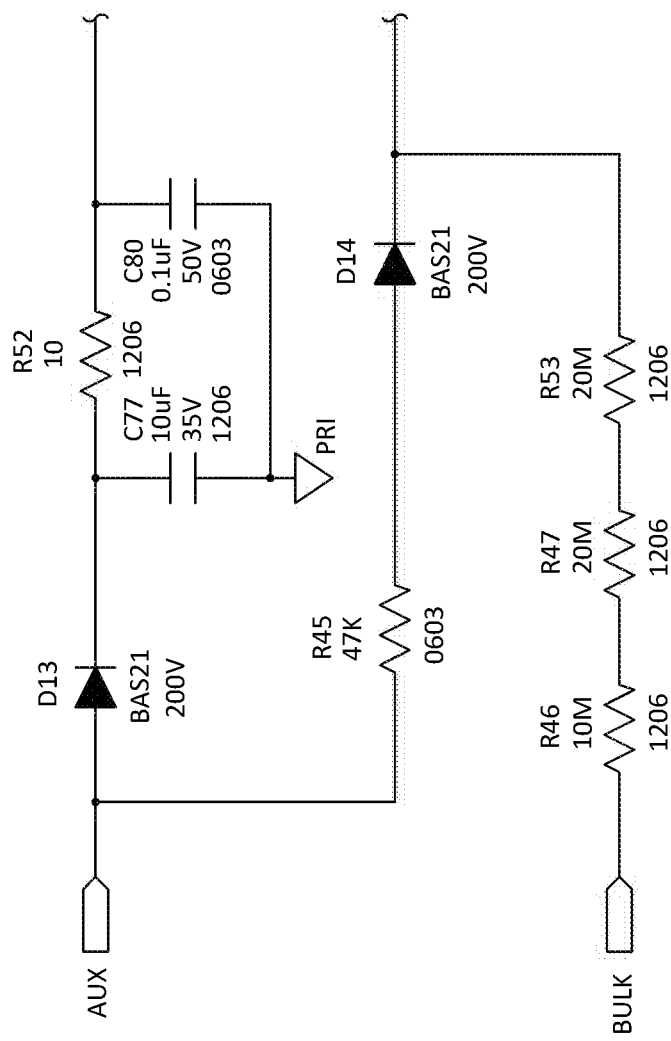

FIG. 50, which is separated into the partial views shown in FIGS. 50A-50D, is a detailed circuit diagram for power supply 4900 according to an embodiment of the present invention. As shown in FIG. 50, power supply 4900 includes a universal 100V-240V, 50 Hz/60 Hz input with circuits to limit EMI and inrush current. It also includes an off-line quasi-resonant switch mode power supply. AC power is supplied to a connector and passes through a fuse and the EMI filter. The input voltage is then rectified and stored on a capacitor. The power supply controller causes energy to be stored as magnetic flux in the transformer where it is intermittently removed by two isolated output diodes. In an embodiment, the power supply circuit produces +5V and +12V that are dielectrically isolated from each other as well as the input. An optocoupler is used to sense and regulate the output voltage.

Figure 51:
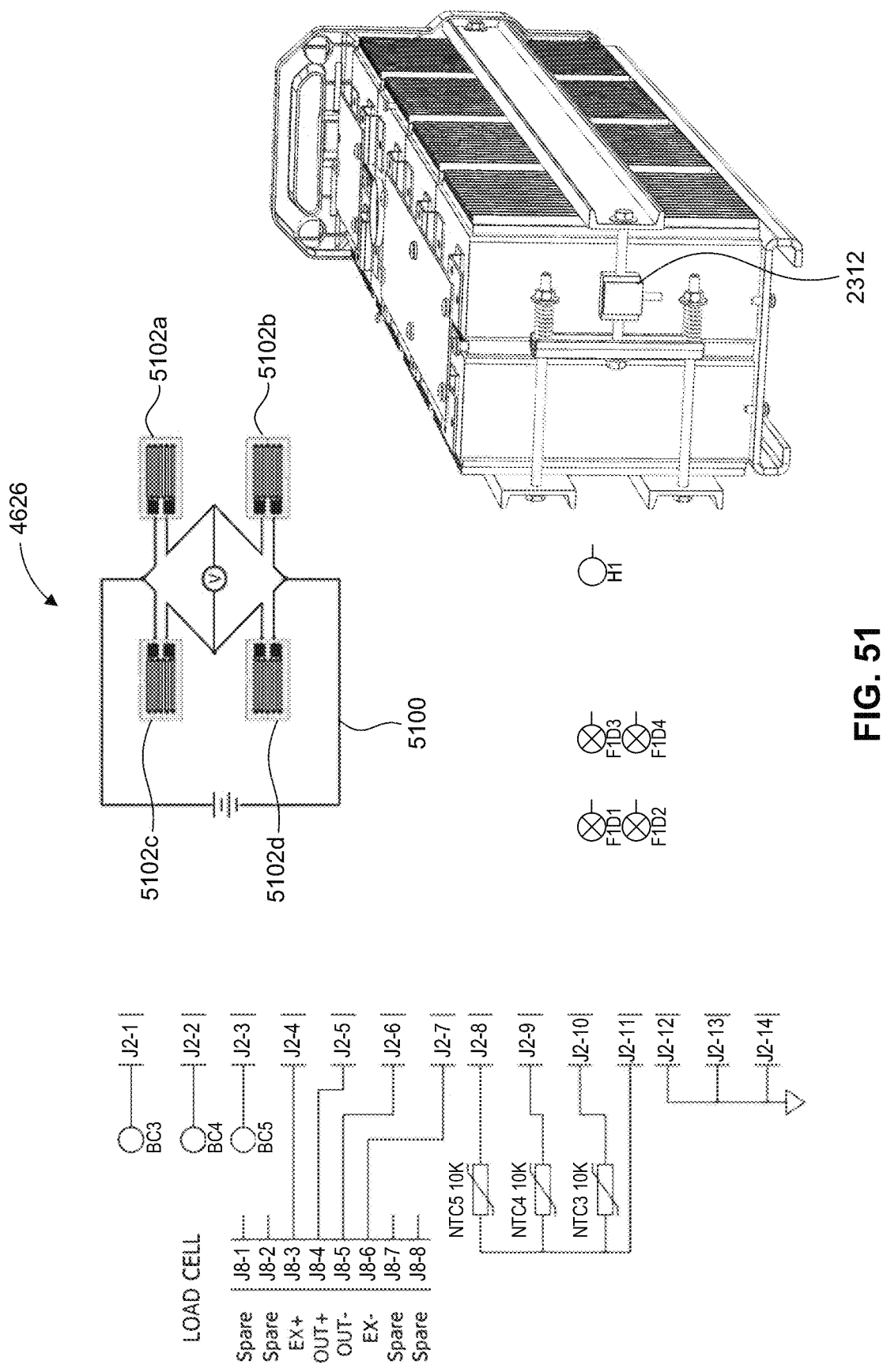
FIG. 51 illustrates features of a battery module according to an embodiment of the present invention.

FIG. 51 further illustrates an embodiment of cell pressure monitor(s) 4626 according to an embodiment of the present invention. As shown in FIG. 51, cell pressure monitor 4626 uses a load cell 2312 having a Wheatstone bridge circuit 5100 with four strain gauges 5102a-d. The operation of this load cell and Wheatstone bridge circuit is described above with reference to FIGS. 23-26.

Figure 52:
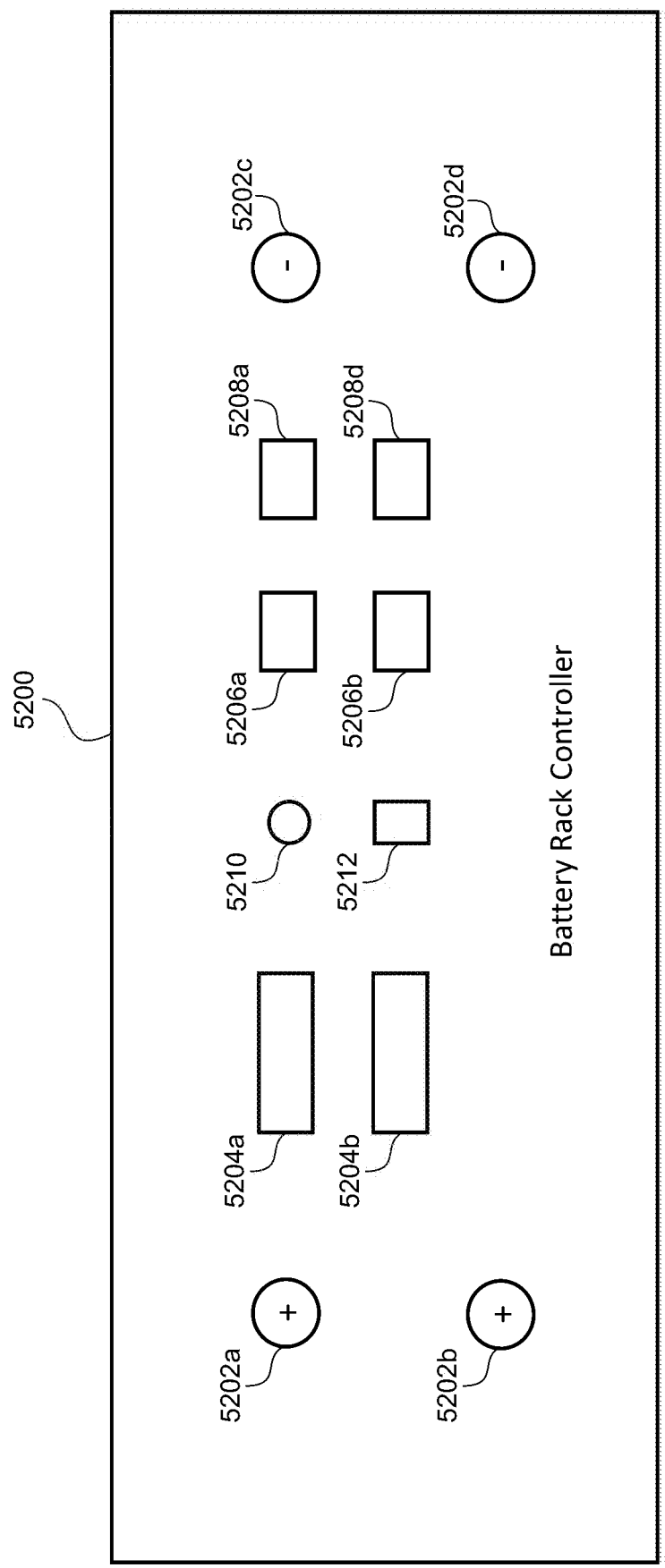
FIG. 52 illustrates an example battery rack controller according to an embodiment of the present invention.

FIG. 52 illustrates an example battery rack controller 5200 according to an embodiment of the present invention. As shown in FIG. 52, battery rack controller 5200 includes four DC power connectors 5202a-d, two AC power connectors 5204a-b, two system level communications connectors 5206a-b, two battery module communications connectors 5208a-b, a status indicator 5210, and a power switch 5212. Battery rack controller 5200 can controller a plurality of battery modules, for example, battery modules 100, as shown in FIGS. 55 and 57A-C below.

The DC power connectors 5202a-d are used to connect the battery modules of the battery rack to a DC bus of a battery energy storage system. In an embodiment, DC power connectors 5202a and 5202c connect battery rack controller 5200 to the energy storage system DC bus. Power connectors 5202b and 5202d connect battery rack controller 5200 to the battery modules that make up the battery rack. AC grid power is provided to battery rack controller 5200 using AC power connector 5204a. This power is then provided to the battery modules using AC power connector 5204b.

System level communications connectors 5206a-b are used to communicate to a higher-level energy storage system controller. In an embodiment, these communications are conducted using TCP/IP communications. Battery module communications connectors 5208a-b are used to communicate with the battery modules of the battery rack. In an embodiment, these communications are conducted using CANBus communications. In one embodiment, CANopen communications are used.

In embodiments of battery rack controller 5200, when powered-on, status indicator 5210 shows the status of the battery rack, for example, by a green light indicating everything is operating correctly, or by a yellow or a red light indicating that the battery rack has a minor or a major operating issue. Power switch 5212 is used to turn-on and turn-off power to battery rack controller 5200.

Figure 53:
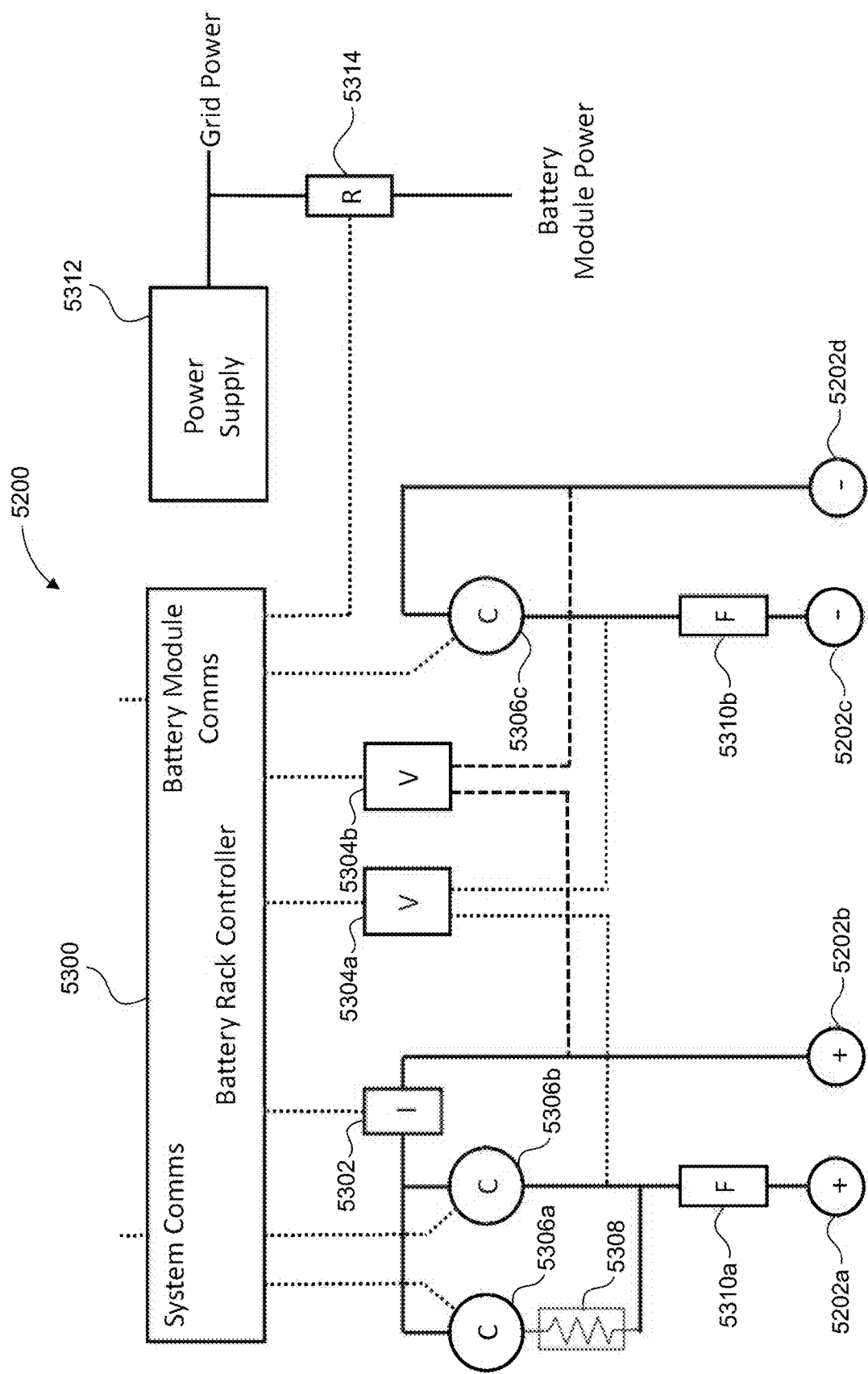
FIG. 53 illustrates an example battery rack controller according to an embodiment of the present invention.

FIG. 53 further illustrates battery rack controller 5200 according to an embodiment of the present invention. As shown in FIG. 53, battery rack controller 5200 includes a battery rack controller circuit board 5300, a current meter 5302, two voltage meters 5304a-b, three contactors 5306a-c, a power resistor 5308, and two fuses 5310a-b. Battery rack controller circuit board 5300 includes a microcontroller unit that runs firmware and/or software that implements the functions of battery rack controller 5200. These functions include measuring the battery rack current, battery rack voltage, and communication data with the battery module controllers and the battery energy storage system controller. In operation, battery rack controller circuit board 5300 opens and closes contactors 5306 to connect the battery modules to the battery system DC bus. Contactor 5306a and power resistor 5308 are used for pre-charging and matching the voltage of the battery rack to the DC system bus before contactor 5306b is closed. If during operation an abnormal current or abnormal voltage is detected by current meter 5302 or one of the two voltage meters 5304a-b, then battery rack controller circuit board 5300 opens the contactors 5306 to isolate the battery rack from the DC system bus until the abnormal condition is corrected. Fuses 5310a-b are included in case of a short circuit or other overcurrent issue. In embodiments, fuses 5310 are very fast acting fuses.

As shown in FIG. 53, battery rack controller 5200 includes a power supply to power the components of battery rack controller 5200. The power for this power supply is grid power. A relay 5314, controller by battery rack controller circuit board 5300 controls the supply of the grid power to the battery modules of the battery rack. In an embodiment, the opening and closing of relay 5314 can be used if needed to reset the battery module controller of the battery modules that make up the battery rack.

Figure 54B:
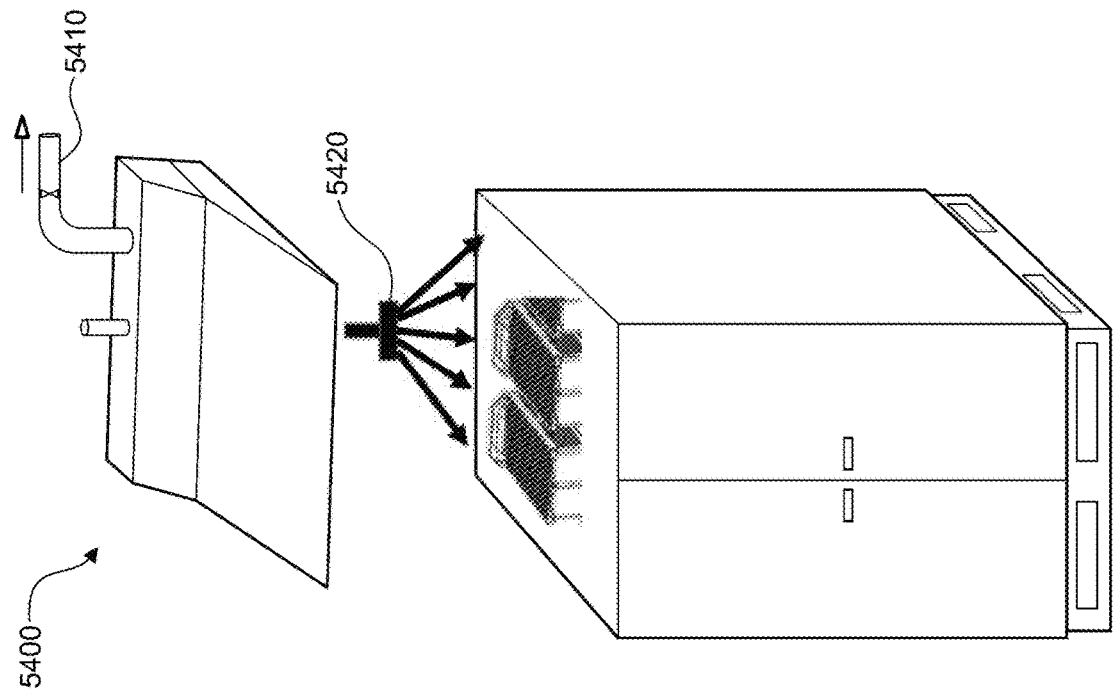
FIGS. 54A-B illustrate an example battery rack according to an embodiment of the present invention.
Figure 54A:
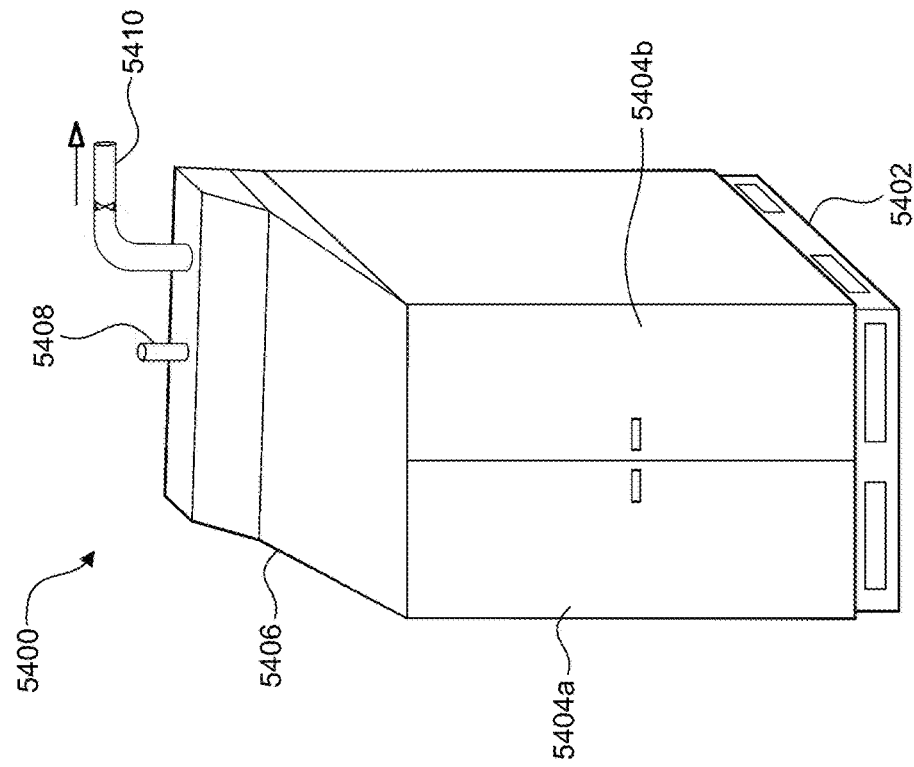

FIGS. 54A-B illustrate an example battery rack 5400 according to an embodiment of the present invention. As shown in FIG. 54A, battery rack 5400 includes a base 5402, doors 5404a-b, a hood 5406, a water suppression system 5408, and exhaust ducting 5410. Base 5402 can be used to move and position battery rack 5400, for example, using a forklift truck. The doors 5404a-b allow people to access the battery modules and battery module controller housed inside the battery rack enclosure. Hood 5406 provides space at the top of the battery rack for the fire suppression system sprinkler head(s). Exhaust ducting 5410 is used to draw air through the battery rack and cool the battery modules. It also is used to direct heat and any gases, for example, in the event that a battery cell vents, outside of the container or room in which the battery rack is located. In embodiments, the fan(s) for moving air through the battery rack are located in the exhaust ducting 5410, which makes replacing a fan easy and which is a better design than including many small fans inside the enclosure as a part, for example, of the battery modules.

As shown in FIG. 54B, one or more sprinkler heads 5420 are located inside battery rack 5400. In the event of a fire, the sprinkler heads activate and spray water directly inside battery rack 5400. This water is collected by the top tray of the battery modules, and the water is then directed to flow down through the center plates of the battery modules and over the side plates of the battery module to extinguish the fire and cool surrounding battery modules, so the fire does not spread to other modules and so the module having the issue does not catch on fire a second time. If a battery were to vent and possibly catch on fire, the heat and gases would be removed from the battery rack via exhaust ducting 5410.

Figure 55:
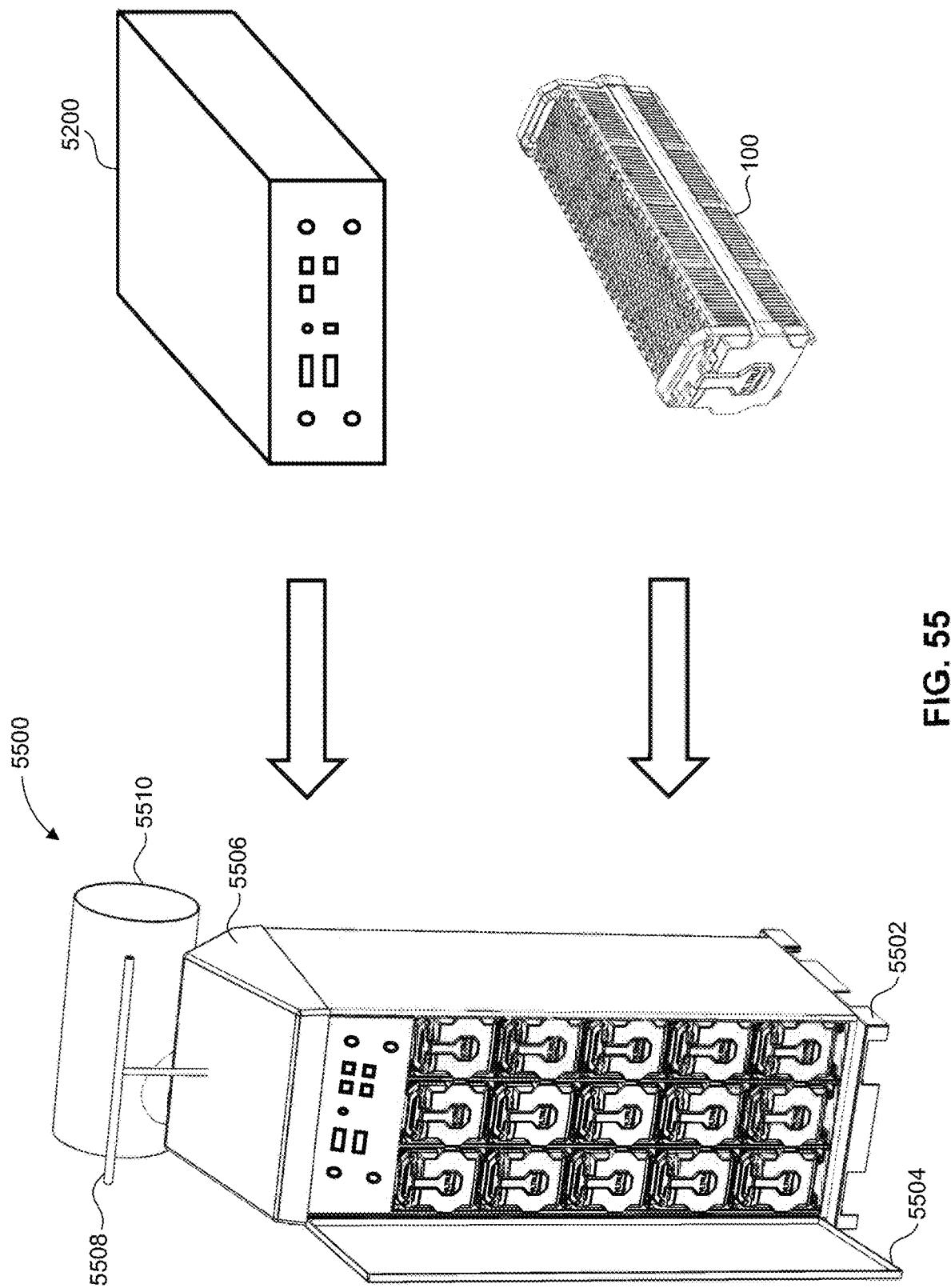
FIG. 55 illustrates an example battery rack according to an embodiment of the present invention.

FIG. 55 illustrates an example battery rack 5500 according to an embodiment of the present invention. As shown in FIG. 55, battery rack 5500 includes a base 5502, a door 5404, a hood 5506, a water suppression system 5508, and exhaust ducting 5510. Base 5502 can be used to move and position battery rack 5500, for example, using a forklift truck. The door 5504 allows people to access the battery modules 100 and battery module controller 5200 housed inside the battery rack enclosure. Hood 5506 provides space at the top of the battery rack for the fire suppression system sprinkler head(s). Exhaust ducting 5510 is used to draw air through the battery rack and cool the battery modules. It also is used to direct heat and any gases, for example, in the event that a battery cell vents, outside of the container or room in which the battery rack is located. In embodiments, the fan(s) for moving air through the battery rack are located in the exhaust ducting 5510, which makes replacing a fan easy and which is a better design than including many small fans inside the enclosure as a part, for example, of the battery modules 100.

Battery rack 5500, as well as other battery racks described herein, allows water from a commercial fire sprinkler system (for example, see FIG. 58), provided by one or more sprinkler heads located inside the top of the battery rack, to flow down like a cascading waterfall over the battery modules 100 to provide cooling and fire suppression. Water flows down on the tops of the battery module, where it is collected/gathered by a plastic top having a berm located on the top of the battery modules. This water flows down through the middle plate and over the side plates or heat sinks of each of the battery modules or battery cell assemblies and cools the battery cells. As the water exits the middle plate, it is collected/gathered by the battery module below and can then flow through this battery module's middle plate and over the side plates as described herein.

Figure 56A:
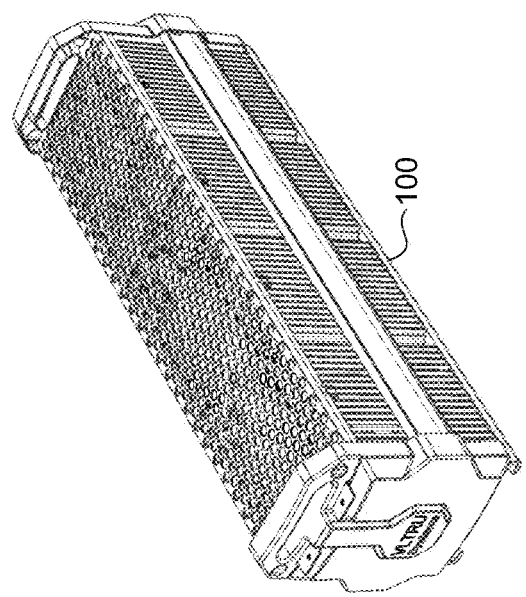
FIGS. 56A-B illustrate an example battery rack according to an embodiment of the present invention.
Figure 56A:
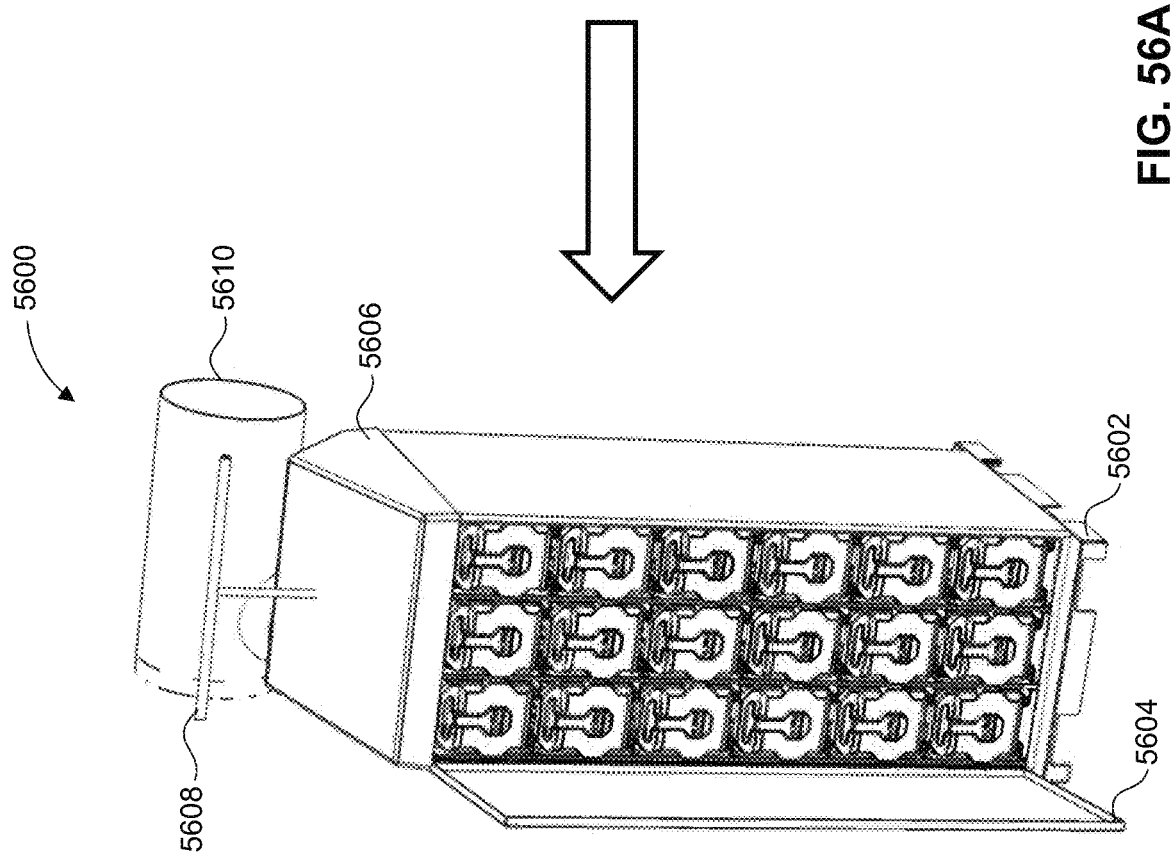
Figure 56B:
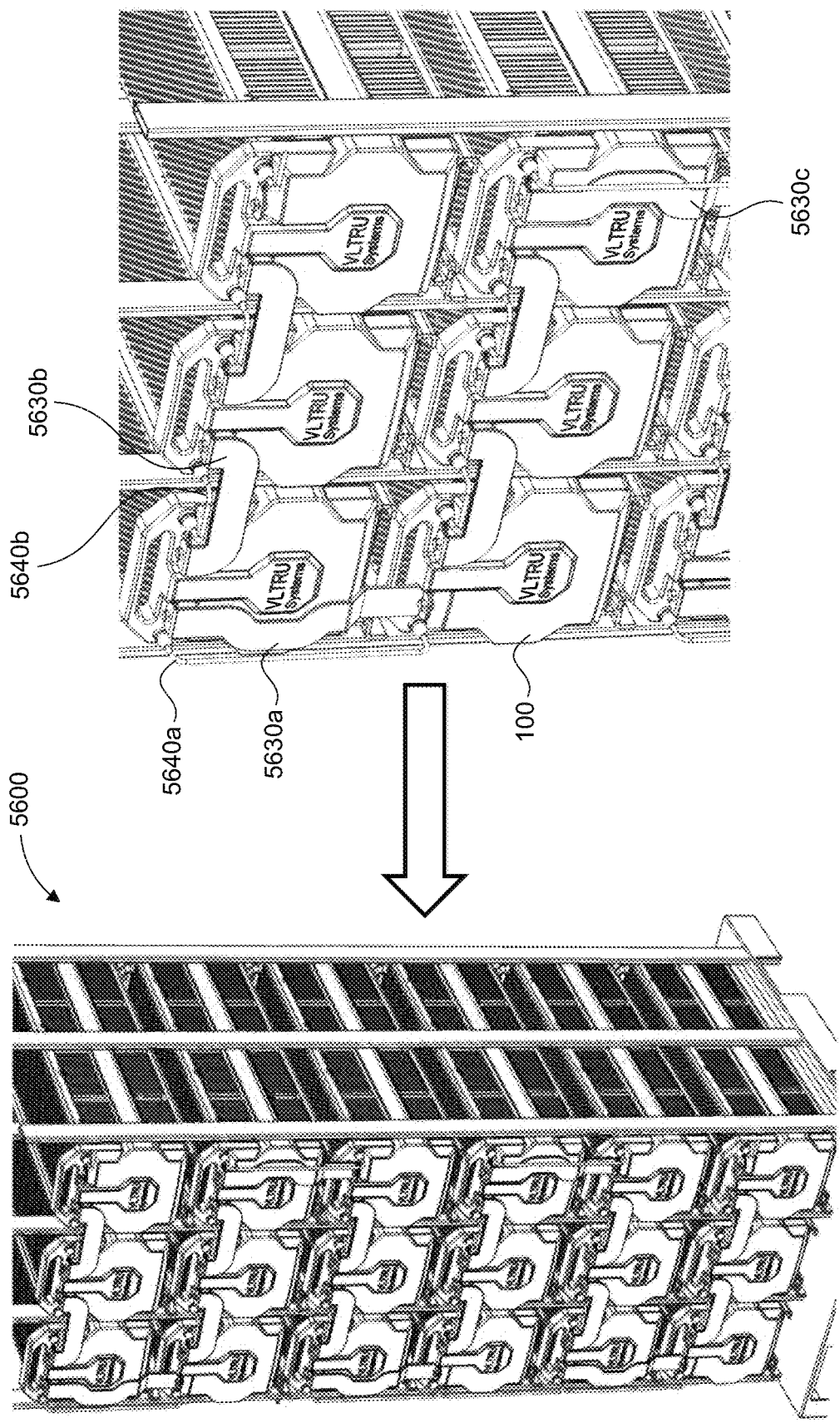

FIGS. 56A-B illustrate an example battery rack 5600 according to an embodiment of the present invention. As shown in FIG. 56A, battery rack 5600 includes a base 5602, a door 5604, a hood 5606, a water suppression system 5608, and exhaust ducting 5610. Base 5602 can be used to move and position battery rack 5600, for example, using a forklift truck. The door 5604 allows people to access the battery modules 100 housed inside the battery rack enclosure. Hood 5606 provides space at the top of the battery rack for the fire suppression system sprinkler head(s). Exhaust ducting 5610 is used to draw air through the battery rack and cool the battery modules. It also is used to direct heat and any gases, for example, in the event that a battery cell vents, outside of the container or room in which the battery rack is located. In embodiments, the fan(s) for moving air through the battery rack are located in the exhaust ducting 5610.

FIG. 56B is a more detail drawing of battery rack 5600. In FIG. 56B, one can more clearly see the battery modules 100, and the busbars 5630a-c and cables 5640a-b used to connect the battery modules 100 together to form the battery rack.

Figure 57B:
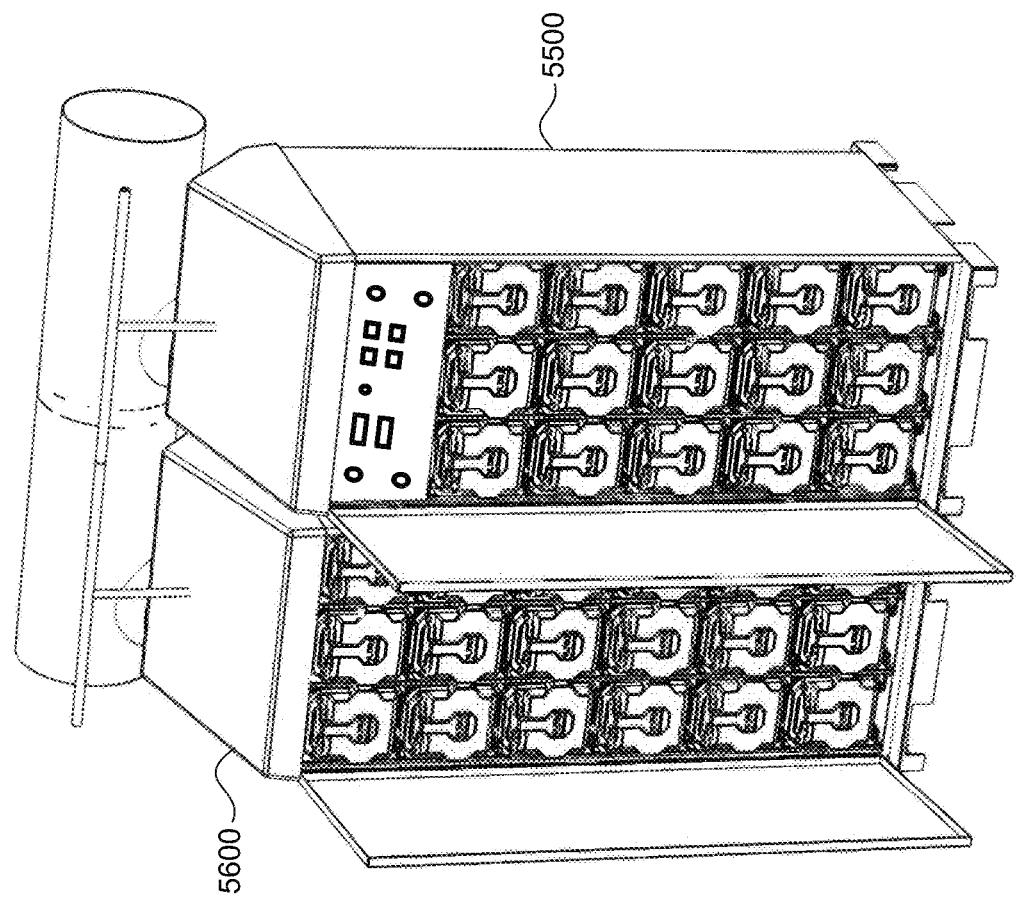
FIGS. 57A-C illustrate example battery racks according to embodiments of the present invention.
Figure 57A:
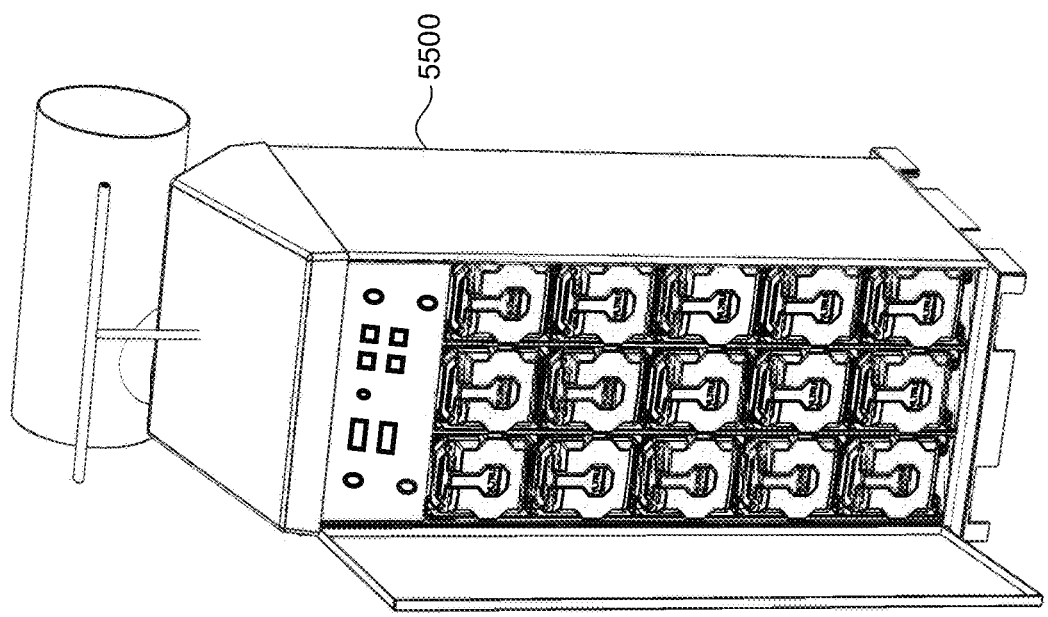
Figure 57C:
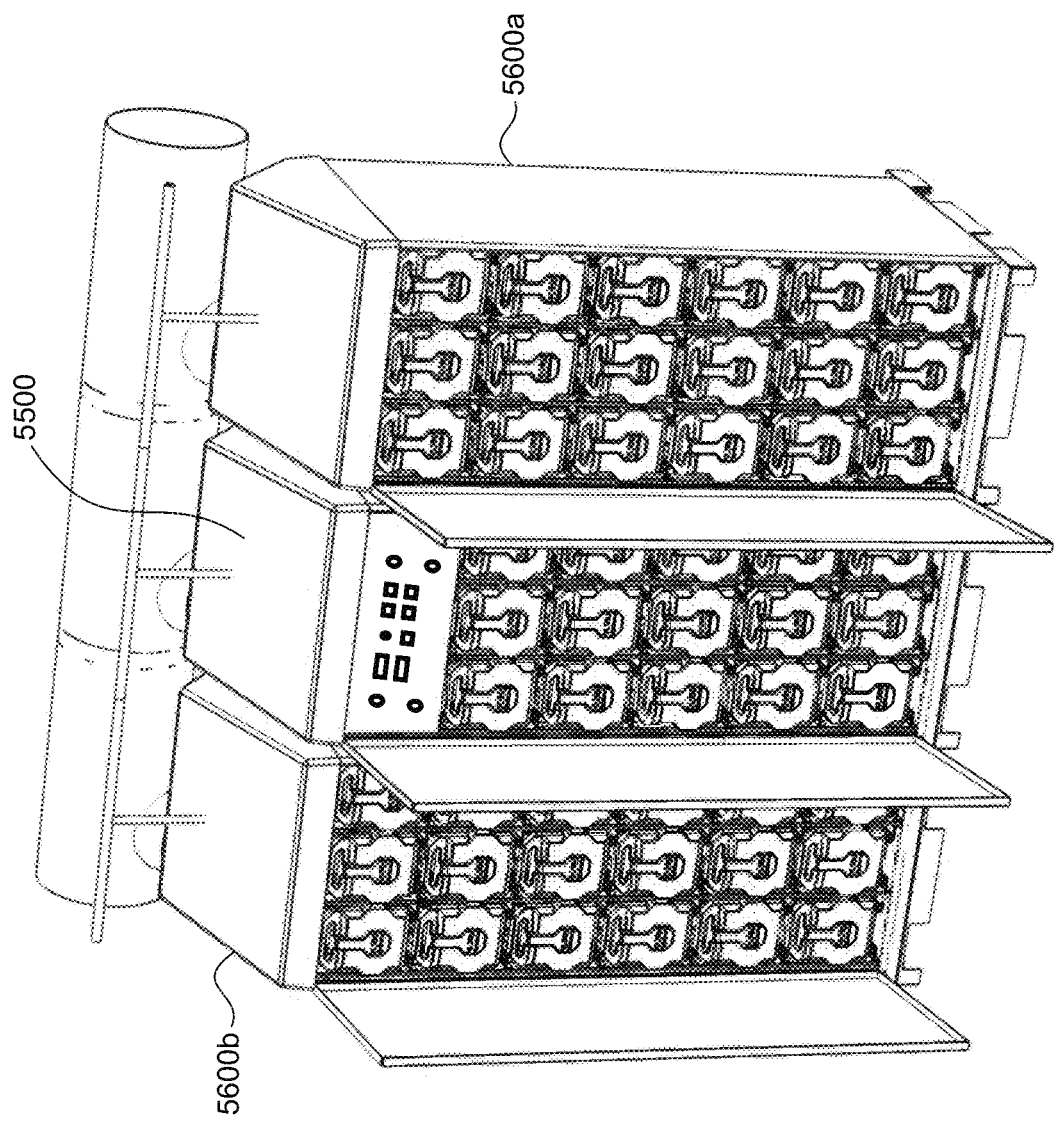

FIGS. 57A-C illustrate example battery rack products or units according to embodiments of the present invention. FIG. 57A shows a battery rack 5500 that can be used as a part of a battery energy storage system. In embodiments, this battery rack includes 15 battery modules 100 according to the present invention and forms a nominal 440V battery energy storage system. FIG. 57B shows a battery rack product that comprises one battery rack 5500 and one battery rack 5600 that can be used as a part of a battery energy storage system. In embodiments, this battery rack product includes 33 battery modules 100 according to the present invention and forms a nominal 1000V battery energy storage system. FIG. 57C shows a battery rack product that comprises one battery rack 5500 and two battery racks 5600 that can be used as a part of a battery energy storage system. In embodiments, this battery rack product includes 51 battery modules 100 according to the present invention and forms a nominal 1500V battery energy storage system. In practice, battery energy storage system can be very large and be formed from operating many of these battery rack products together in parallel.

Figure 58:
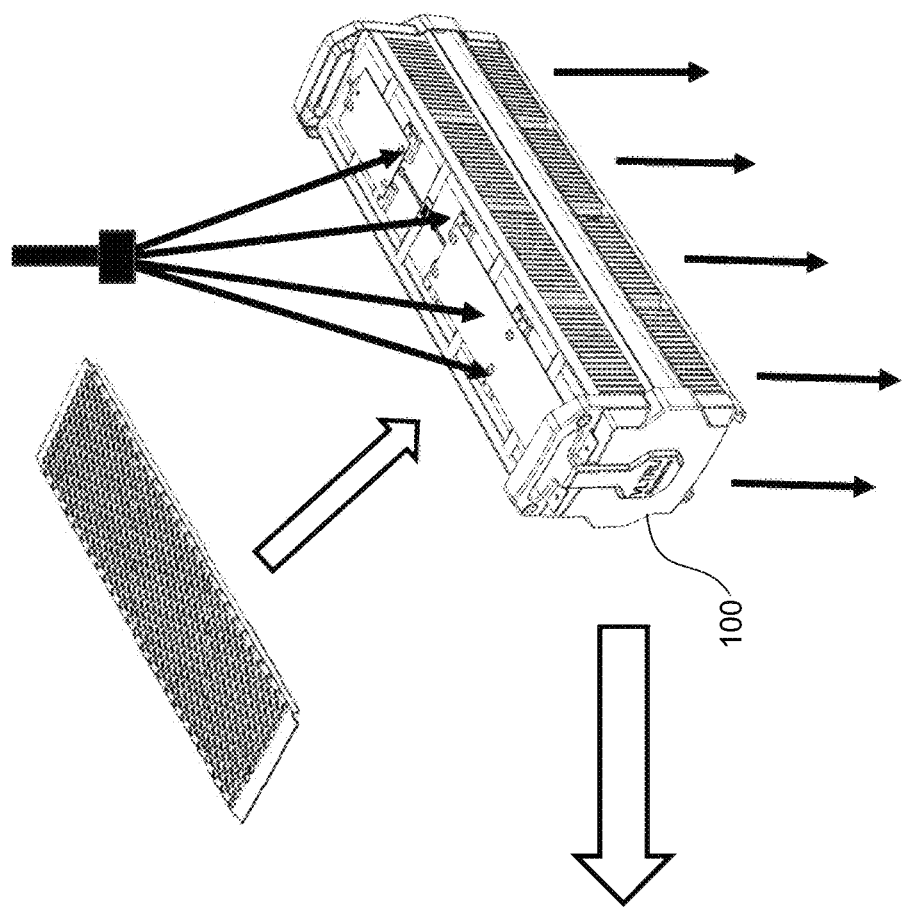
FIG. 58 illustrates a fire suppression system for a battery rack according to an embodiment of the present invention.
Figure 58:
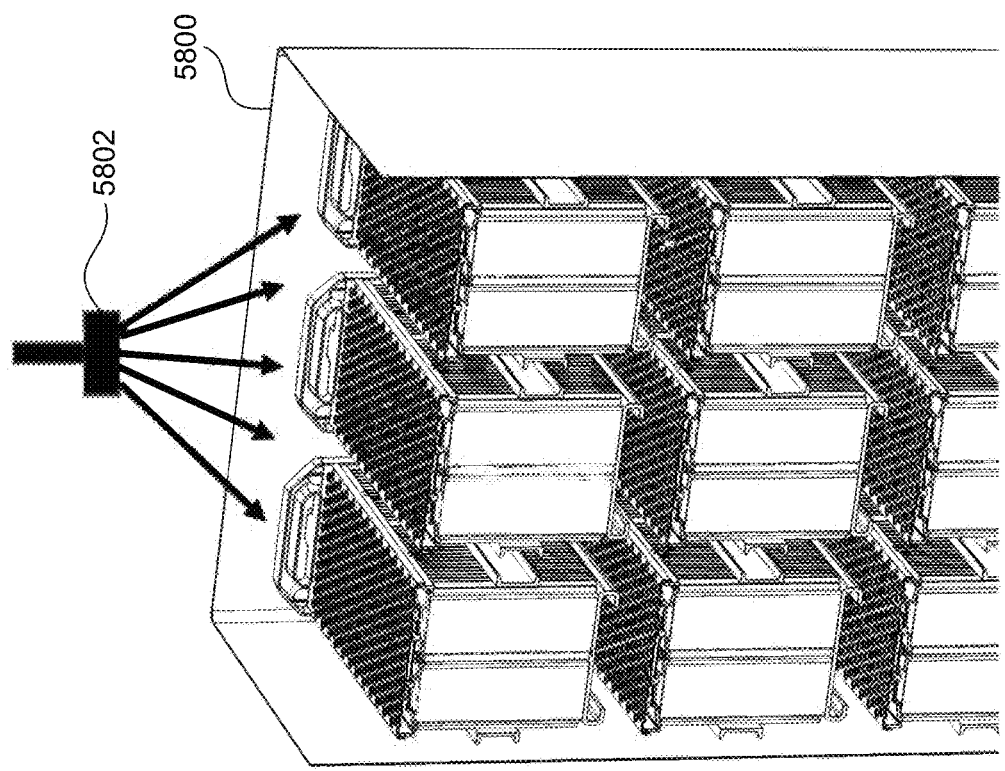

FIG. 58 further illustrates an example fire suppression system for a battery rack according to an embodiment of the present invention. As shown in FIG. 58, a battery rack 5800 has a water fire suppression system with a sprinkler head 5802 that allows water from a commercial fire sprinkler system to flow down like a cascading waterfall over the battery modules 100 inside the battery rack enclosure to provide cooling and fire suppression. Water flows down on the tops of the battery modules 100, where it is collected/gathered by a plastic top having a berm located on the top of the battery modules. This water flows down through the middle plate and over the side plates or heat sinks of each of the battery modules or battery cell assemblies and cools the battery cells. As the water exits the middle plate, it is collected/gathered by another battery module 100 below and can then flow through this battery module's middle plate and over the side plates as described herein.

Figure 59B:
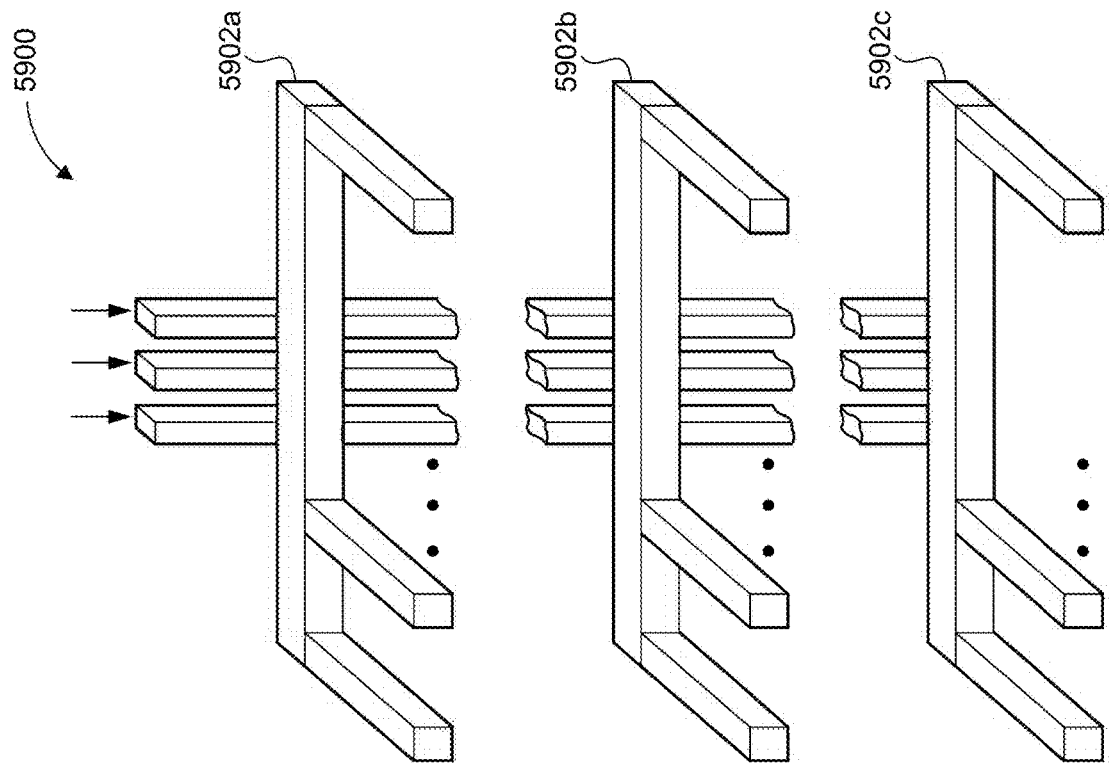
FIGS. 59A-B illustrate a fire suppression system for a battery rack according to an embodiment of the present invention.
Figure 59A:
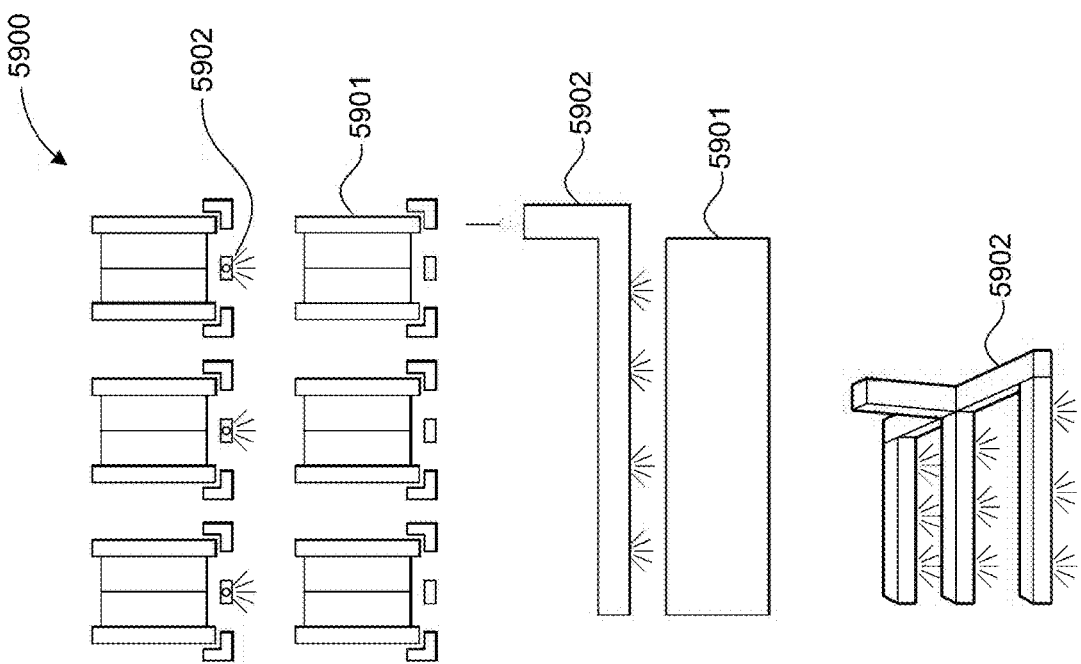

FIGS. 59A-B illustrate a fire suppression system 5900 for a battery rack according to an embodiment of the present invention. As shown in FIGS. 59A-B, fire suppression system 5900 includes one or more water distribution headers 5902 that direct water onto the battery modules 5901 housed in a battery rack. The water distribution headers 5902 spay water directly onto the battery modules 5901 as shown in FIG. 59A. In the event of a fire, the water extinguishes the fire and cool surrounding battery modules, so the fire does not spread to other modules and so the module having the issue does not catch on fire a second time.

Figure 60:
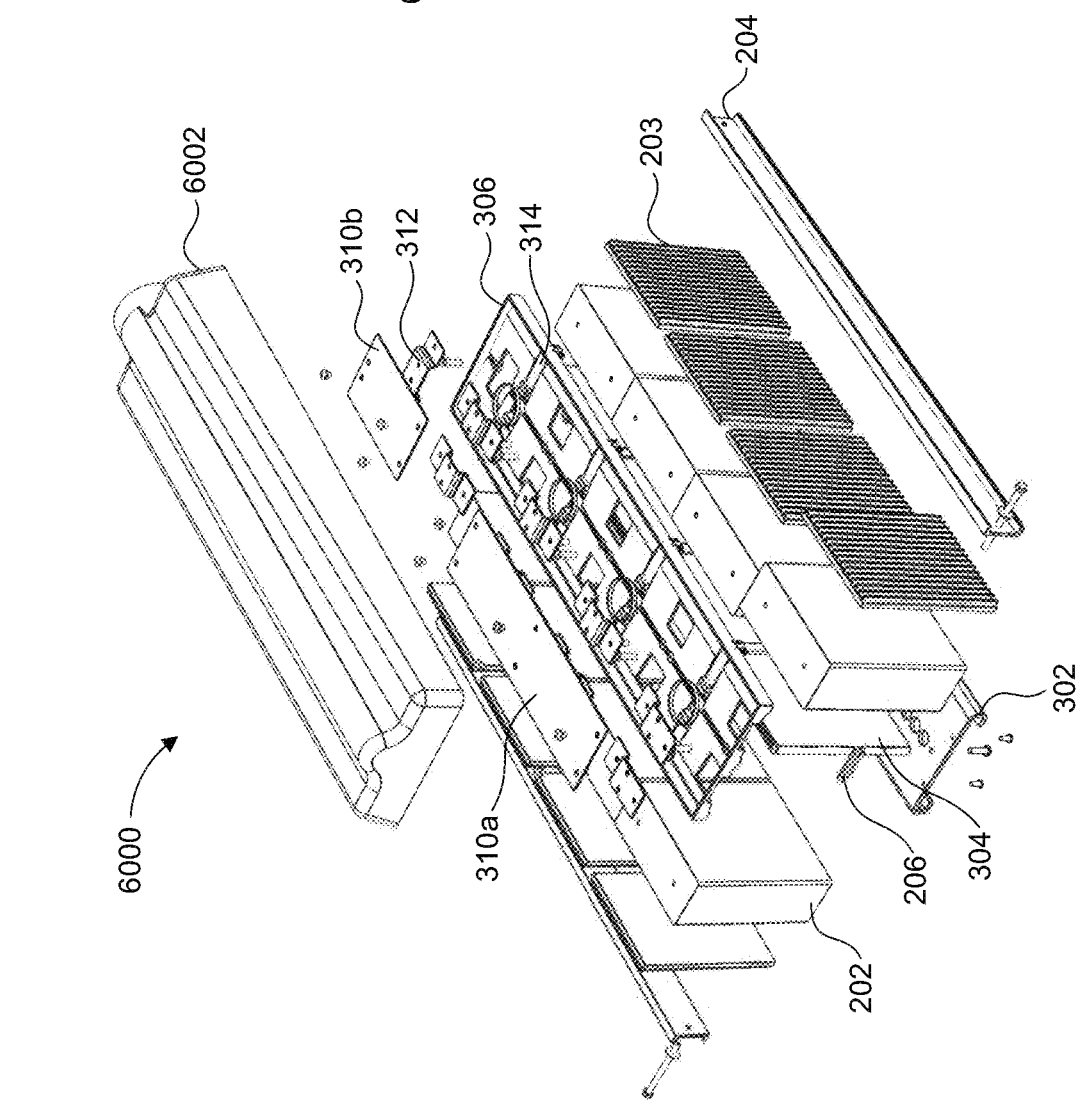
FIG. 60 illustrates an example battery module according to an embodiment of the present invention.

FIG. 60 illustrates an example battery module 6000 according to an embodiment of the present invention. FIG. 60 is an exploded view of battery module 6000 so that the components of battery module 6000 can be seen. As shown in FIG. 60, battery module 6000 includes battery cells 202, side plates 203, side bars 204, a bottom plate 302, center plates 304, top tray 306, and a cover 6002. Also included in battery module 6000 are battery module controller circuit boards 310*a* and 310*b*, busbars 312, and sensors 314.

In an embodiment, battery module 6000 includes eight battery cells 202. Battery cells 202 are used for storing electrical energy. The eight battery cells 202 are connected in series using busbars 312. A predetermined amount of pressure is applied to battery cells 202 using side plates 203, center plates 304, side bars 204, and springs 206. Side plates 203 and center plates 304 also provide cooling for battery cells 202. Top tray 306 fits on top of battery cells 202 and provides several functions including providing a protective space for sensors 314 and battery module controller circuit boards 310*a* and 310*b*. Other functions of top tray 306 are described herein. Cover 6002 fits on top of top tray 306. Battery module controller circuit boards, described in more detail above, provide battery management functions for battery module 6000 such as, for example, monitoring the voltage, temperature, and pressure of battery cells 202.

Figure 61:
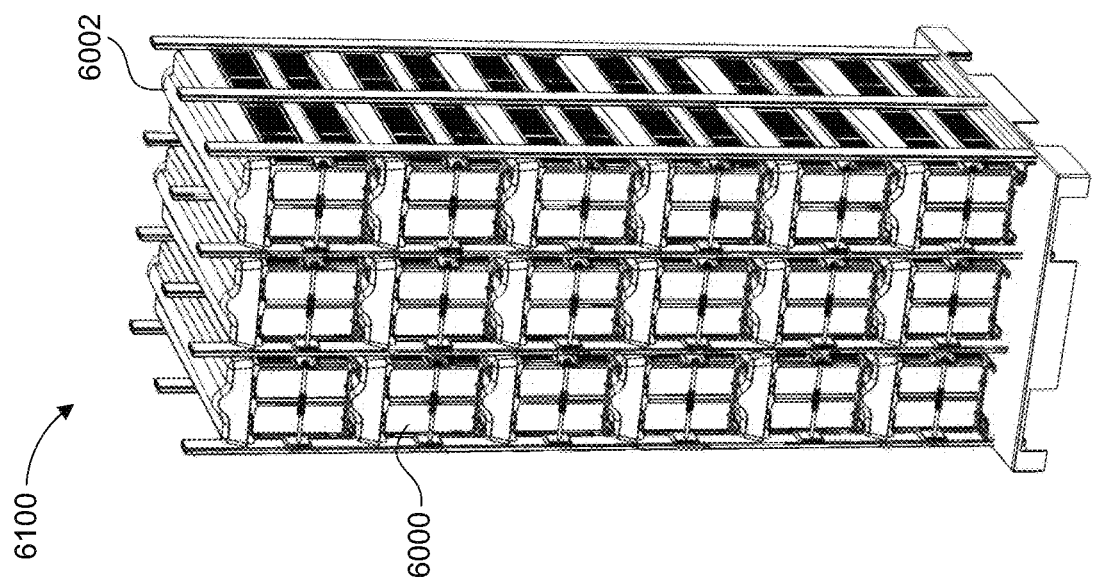
FIG. 61 illustrates an example battery rack according to an embodiment of the present invention.

FIG. 61 illustrates an example battery rack 6100 according to an embodiment of the present invention that houses battery modules 6000. As shown, the battery modules 6000 include a cover 6002 to facilitate air flow to a cooling air collection system. The battery rack further includes a water distribution system affixed to the back of the battery rack, depicted between the battery modules and the cooling air collection system as shown in FIGS. 62A-B.

Figure 62B:
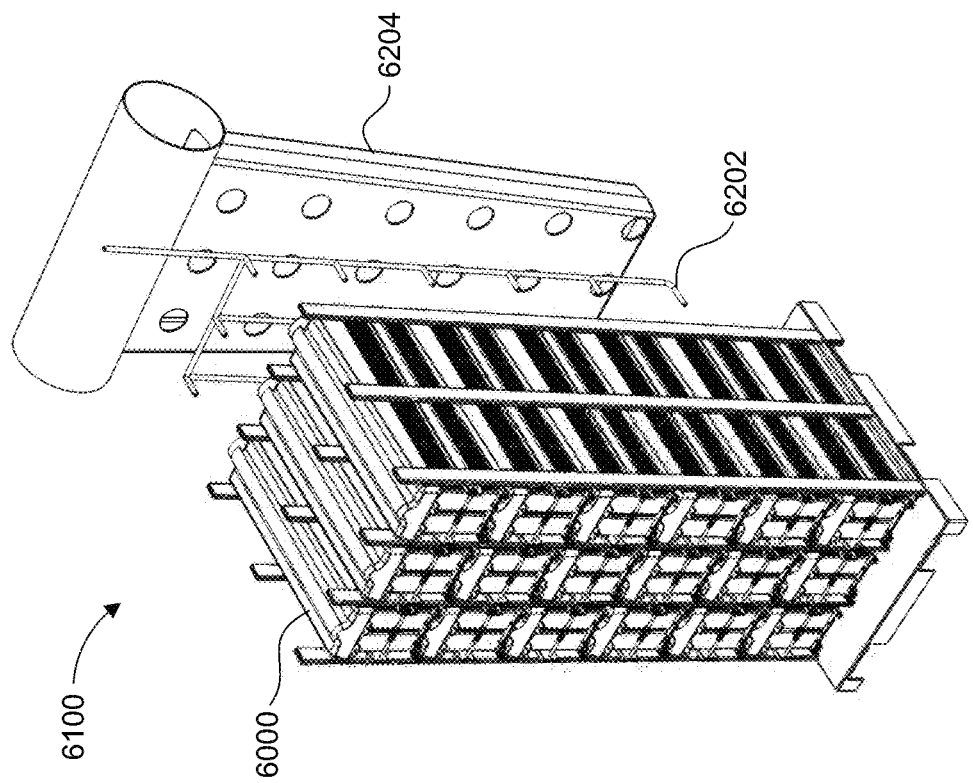
FIGS. 62A-B illustrate an example battery rack according to an embodiment of the present invention.
Figure 62A:
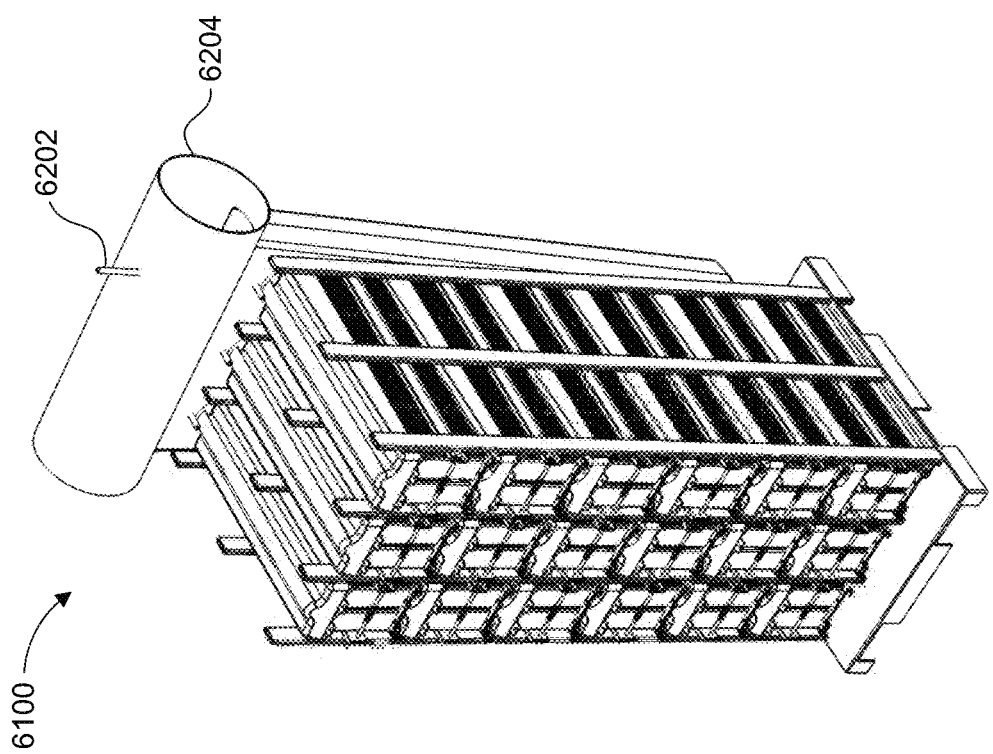

FIGS. 62A-B further illustrate example battery rack 6100 according to an embodiment of the present invention. As shown in FIGS. 62A-B, battery rack 6100 includes a fire suppression system 6202 and exhaust ducting 6204. Fire suppression system 6202 includes water distribution headers that direct water onto the battery modules 6000 housed in the battery rack. The water distribution headers spay water directly onto the battery modules 6000. In the event of a fire, the water extinguishes the fire and cool surrounding battery modules, so the fire does not spread to other modules and so the module having the issue does not catch on fire a second time. Exhaust ducting 6204 is used to draw air through the battery rack and cool the battery modules. It also is used to direct heat and any gases, for example, in the event that a battery cell vents, outside of the container or room in which the battery rack is located. In embodiments, the fan(s) for moving air through the battery rack are located in the exhaust ducting 6204.

Figure 63B:
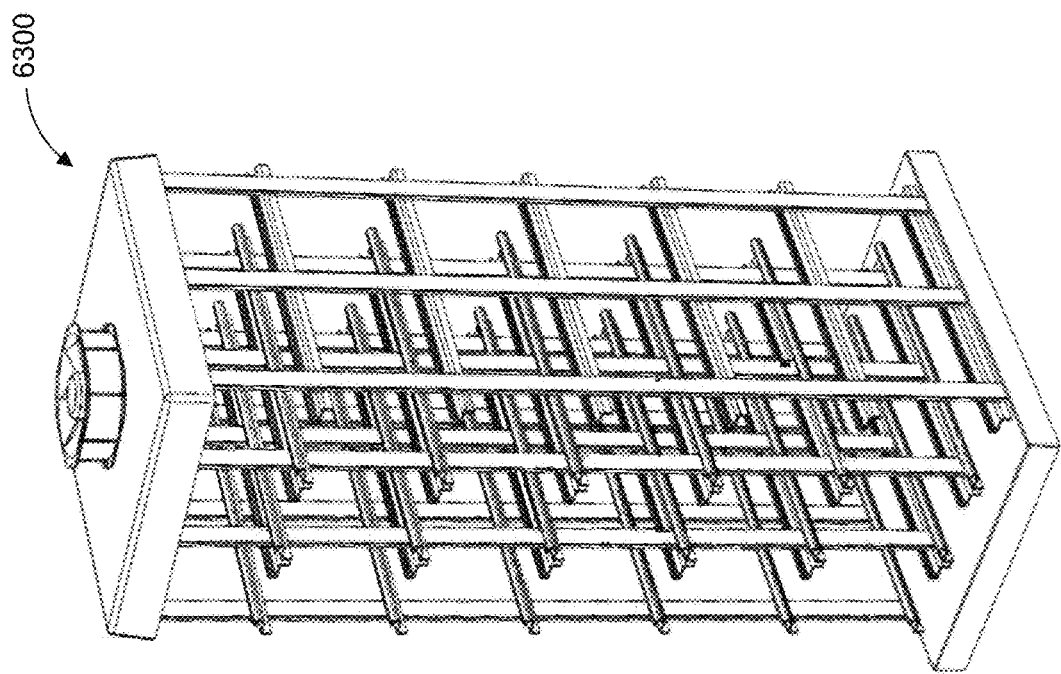
FIGS. 63A-B illustrate an example battery rack according to an embodiment of the present invention.
Figure 63A:
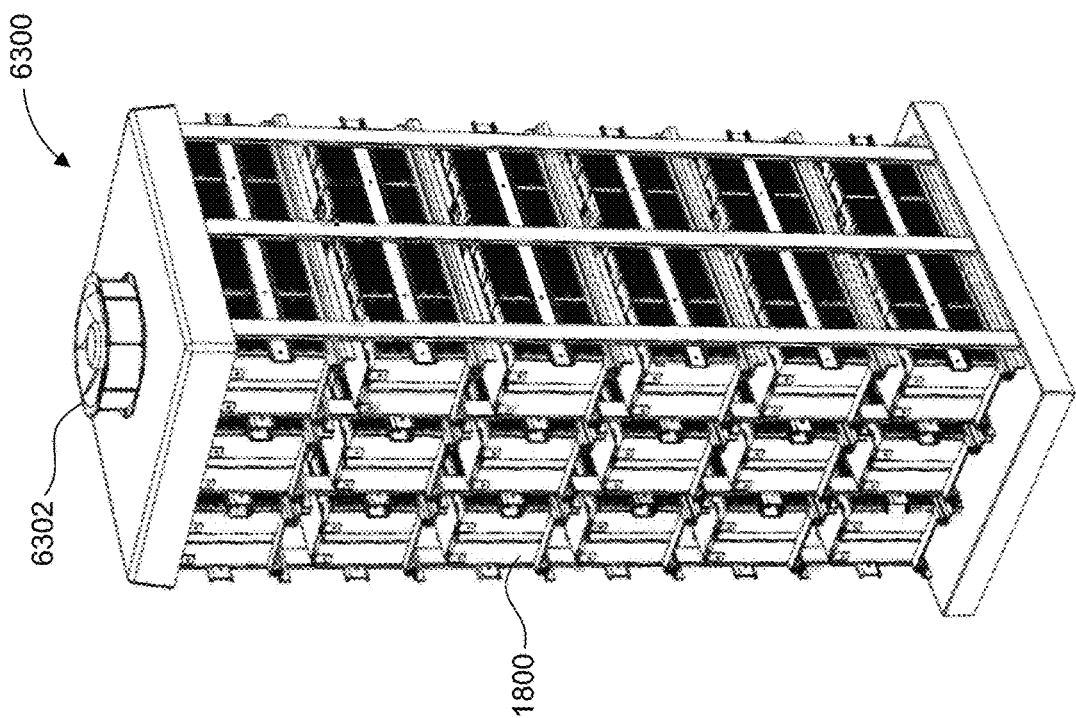

FIGS. 63A-B illustrate an example battery rack 6300 according to an embodiment of the present invention for housing, for example, battery modules 1800. Battery rack 6300 allows air to enter the bottom of the rack and rise to the top of the rack to provide cooling air during operation of the batteries. A fan 6302 is located at the top of the battery rack.

Figure 64:
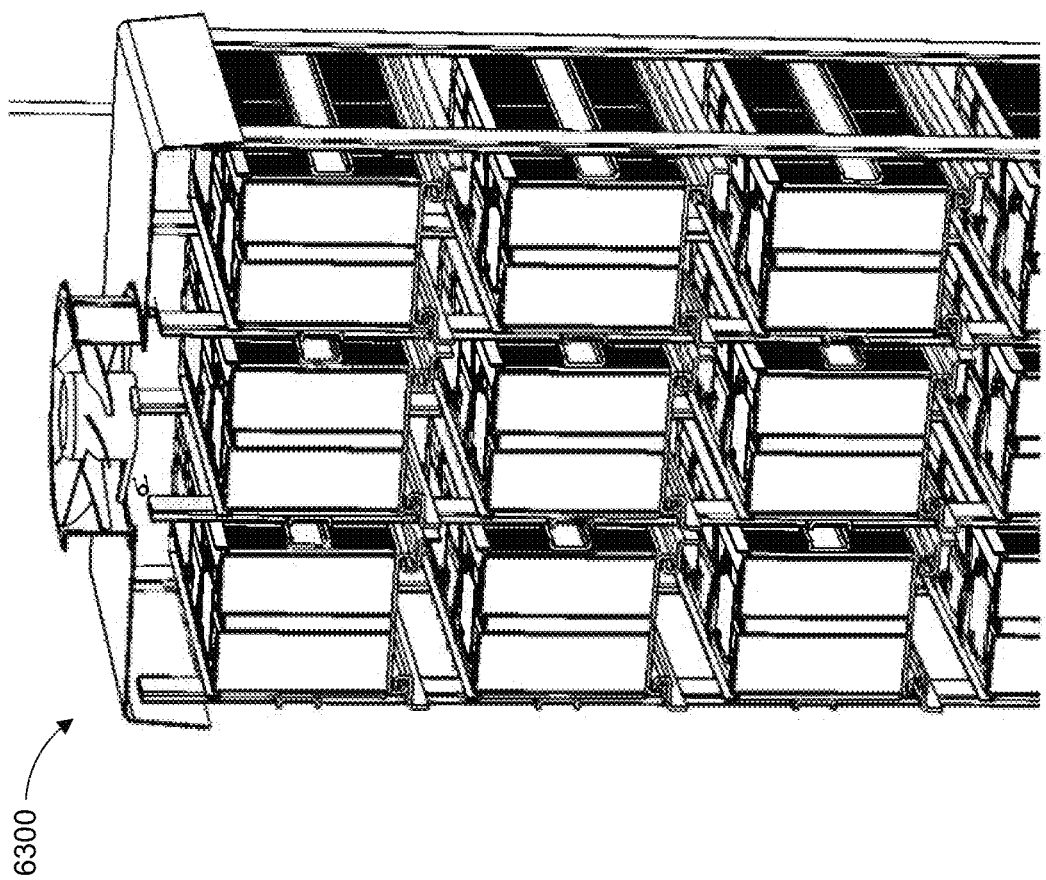
FIG. 64 illustrates an example battery rack according to an embodiment of the present invention.

FIG. 64 further illustrates example battery rack 6300 according to an embodiment of the present invention.

Figure 65:
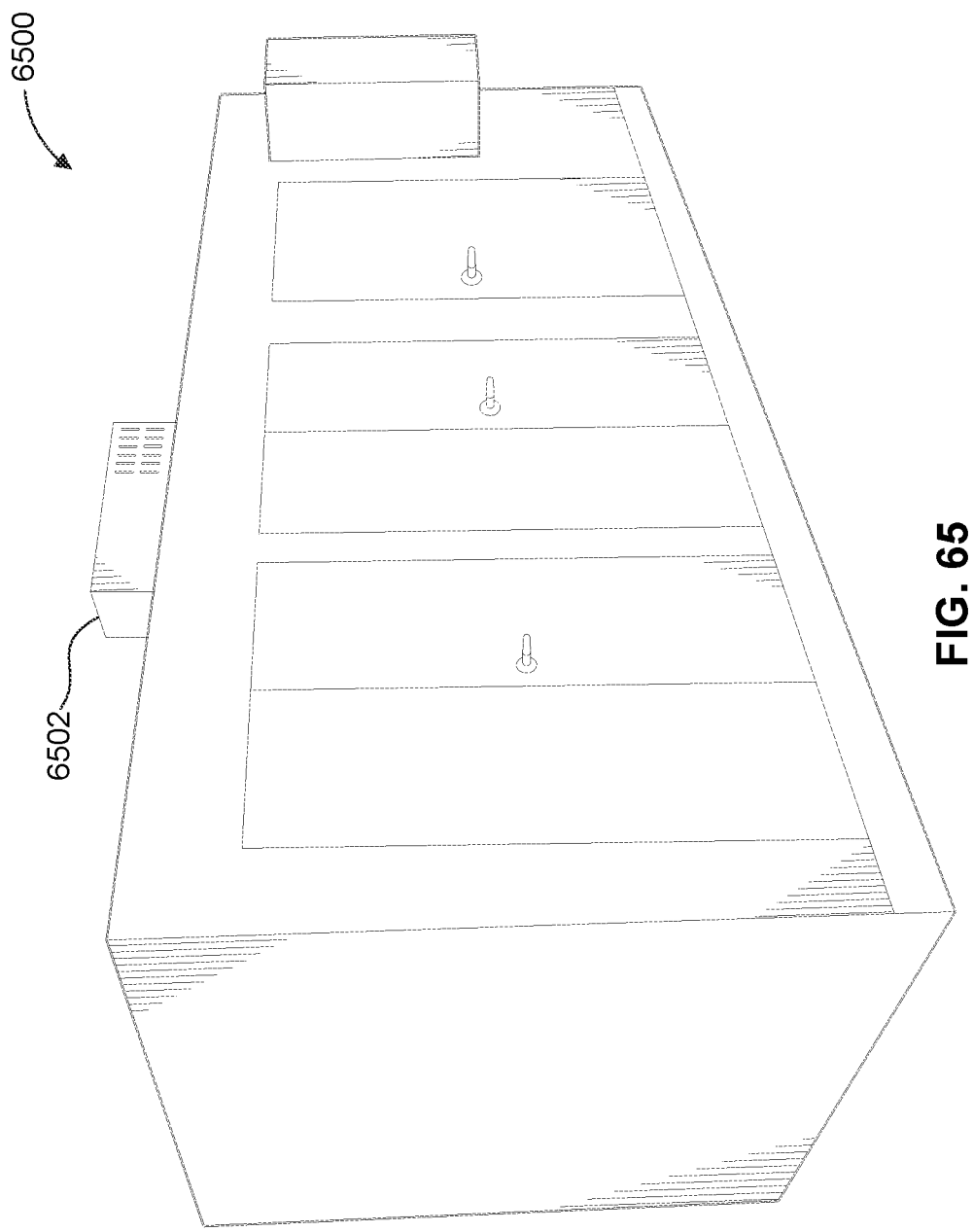
FIG. 65 illustrate an example container system for housing battery racks according to the present invention that form a battery energy storage system.

FIG. 65 illustrates an example container system 6500 for housing battery racks according to the present invention that form a battery energy storage system. The container system houses multiple battery racks and protects the battery racks from the environment. In embodiments, container system 6500 includes an HVAC unit 6502.

Figure 66:
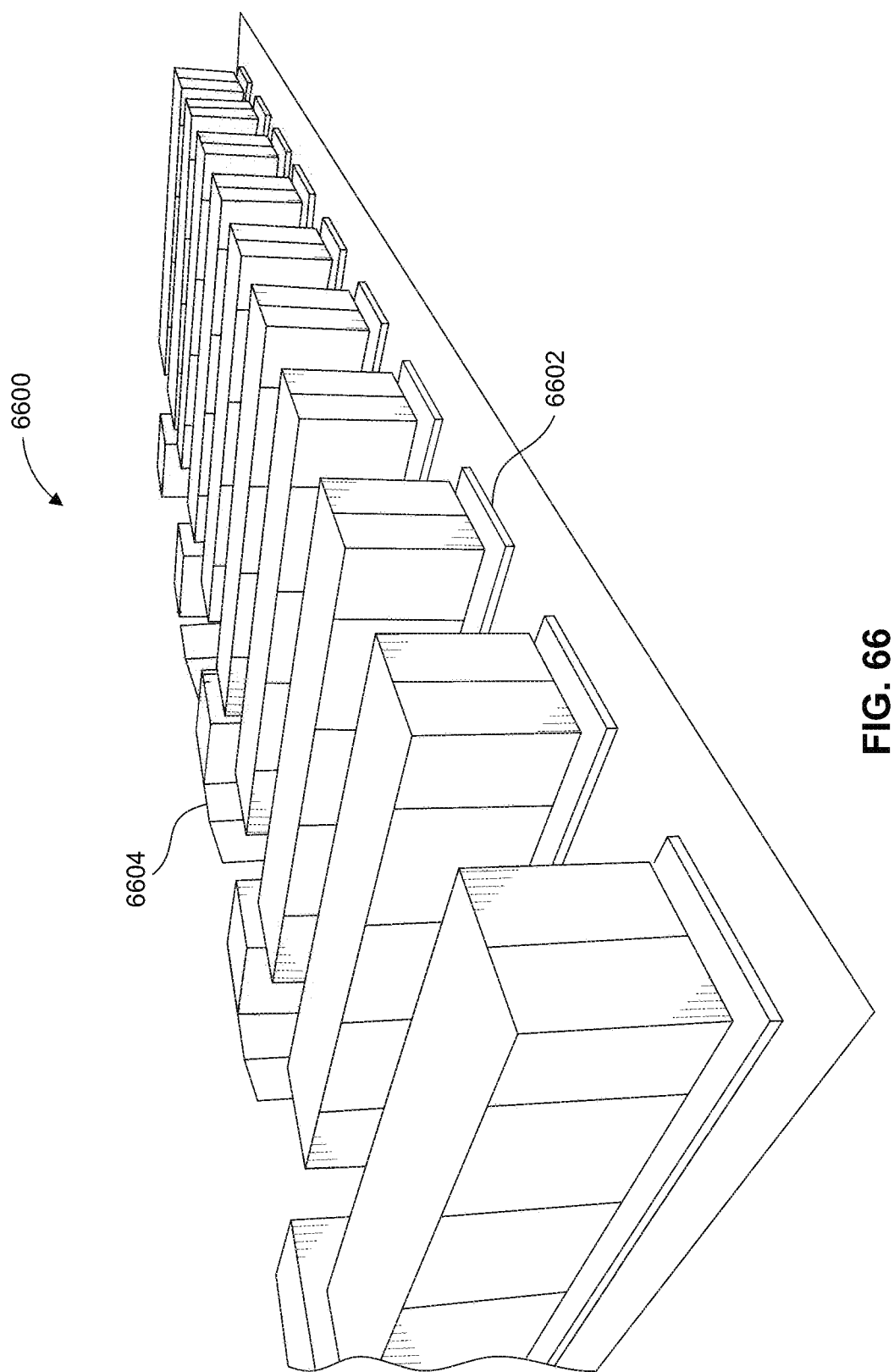
FIG. 66 illustrates multiple containers housing battery racks according to the present invention that form a battery energy storage system.

FIG. 66 illustrates multiple containers 6602 housing battery racks according to the present invention that form a battery energy storage system 6600. In addition to the containers 6602, the battery energy storage system 6600 also includes multiple bi-direction power converters 6604 for charging and discharging the battery racks housed in containers 6602.

Figure 67:
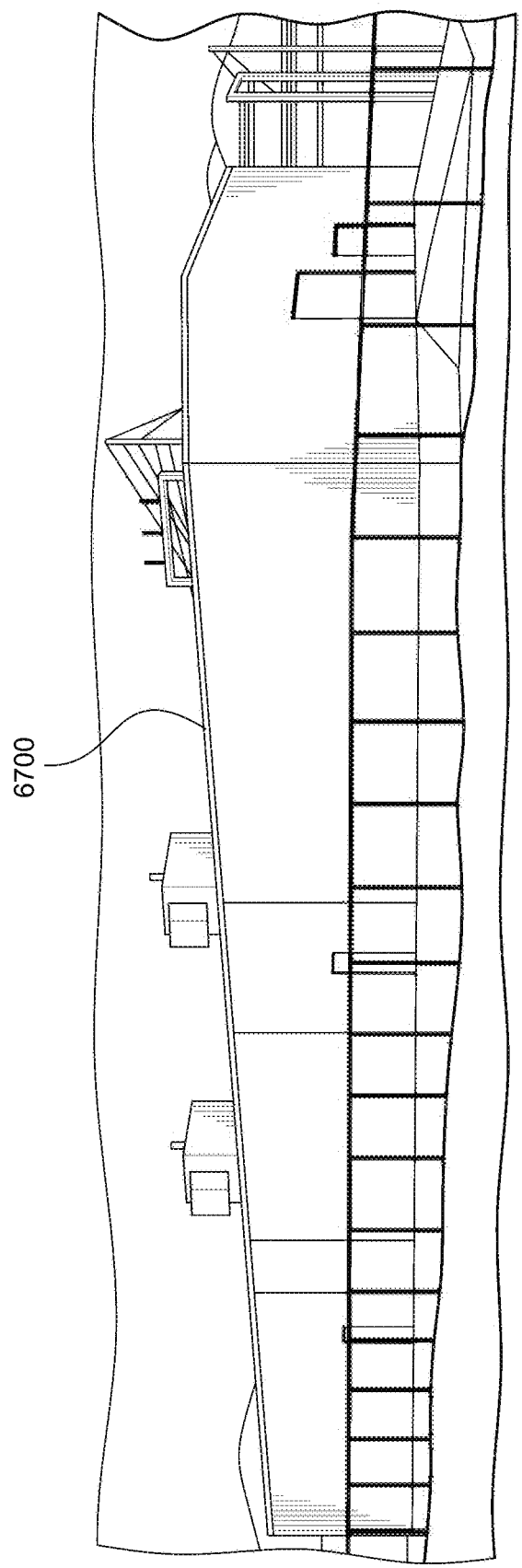
FIG. 67 illustrates a building that houses battery racks according to the present invention that form a battery energy storage system.

FIG. 67 illustrates a building 6700 that houses many battery racks according to the present invention that form a battery energy storage system.

Those skilled in the relevant art(s) will readily appreciate that various adaptations and modifications of the exemplary embodiments described above can be achieved without departing from the scope and spirit of the present disclosure. Therefore, it is to be understood that, within the scope of the appended claims, the teachings of the disclosure may be practiced other than as specifically described herein.

What is claimed:
1. A battery module, comprising:
a plurality of battery cells; and
a top tray positioned above the plurality of battery cells, the top tray including a plurality of holes and being configured to collect water,
wherein the plurality of holes is configured and arranged on the top tray to direct the water collected by the top tray downward to direct the water toward the plurality of battery cells, the plurality of holes comprising a first hole along a first longitudinal axis along a first edge line of a bottom of the top tray, a second hole along a second longitudinal axis along a centerline of the bottom of the top tray, and a third hole along a third longitudinal axis along a second edge line of the bottom of the top tray,
wherein the first hole is configured and arranged to direct the water collected by the top tray downwards over a first side plate that is positioned along the first edge line of the bottom of the top tray,
wherein the second hole is configured and arranged to direct the water collected by the top tray to flow down through a center plate that separates the plurality of battery cells along the centerline of the bottom of the top tray, and
wherein the third hole is configured and arranged to direct the water collected by the top tray downwards over a second side plate that is positioned along the second edge line of the bottom of the top tray.

2. The battery module of claim 1, wherein the plurality of holes is configured and arranged to direct the water collected by the top tray across the plurality of battery cells to cool the plurality of battery cells and to begin extinguishing a battery fire.

3. The battery module of claim 1, wherein a sprinkler head is configured to connect to a fire suppression system of a building.

4. The battery module of claim 1, wherein a sprinkler head is configured to connect to a pipe that is used by firefighters to pump water into the battery module.

5. The battery module of claim 1, wherein the first side plate or the second side plate is configured to move in response to expanding or compressing of at least one battery cell from among the plurality of battery cells.

6. The battery module of claim 1, wherein the center plate is configured and arranged to separate the plurality of battery cells into a first row of battery cells from among the plurality of battery cells and a second row of battery cells from among the plurality of battery cells.

7. The battery module of claim 1, wherein the top tray comprises a sensor that is built into the top tray, the sensor being configured to detect movement of the plurality of battery cells due to swelling of one or more battery cells from among the plurality of battery cells.

8. A battery rack, comprising:
   a plurality of battery modules, each battery module from among the plurality of battery modules comprising:
      a plurality of battery cells; and
      a top tray positioned above the plurality of battery cells, the top tray including a plurality of holes and being configured to collect water sprayed by a sprinkler head in response to a battery fire,
   wherein the plurality of holes is configured and arranged on the top tray to direct the water collected by the top tray downward to direct the water toward the plurality of battery cells, the plurality of holes comprising a first hole along a first longitudinal axis along a first edge line of a bottom of the top tray, a second hole along a second longitudinal axis along a centerline of the bottom of the top tray, and a third hole along a third longitudinal axis along a second edge line of the bottom of the top tray,
   wherein the first hole is configured and arranged to direct the water collected by the top tray downwards over a first side plate that is positioned along the first edge line of the bottom of the top tray,
   wherein the second hole is configured and arranged to direct the water collected by the top tray to flow down through a center plate that separates the plurality of battery cells along the centerline of the bottom of the top tray, and
   wherein the third hole is configured and arranged to direct the water collected by the top tray downwards over a second side plate that is positioned along the second edge line of the bottom of the top tray.

9. The battery rack of claim 8, wherein the top tray comprises a sensor that is built into the top tray, the sensor being configured to detect movement of the plurality of battery cells due to swelling of one or more battery cells from among the plurality of battery cells.

* * * * *